US008937759B2

(12) United States Patent
Holmes

(10) Patent No.: US 8,937,759 B2
(45) Date of Patent: *Jan. 20, 2015

(54) OPTICAL PROCESSING

(71) Applicant: Thomas Swan & Co. Ltd., Consett (GB)

(72) Inventor: Melanie Holmes, Woodbridge (GB)

(73) Assignee: Thomas Swan & Co. Ltd., Co. Durham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,926

(22) Filed: Nov. 15, 2012

(65) Prior Publication Data

US 2013/0070320 A1 Mar. 21, 2013

Related U.S. Application Data

(60) Continuation of application No. 12/710,913, filed on Feb. 23, 2010, now Pat. No. 8,335,033, which is a
(Continued)

(30) Foreign Application Priority Data

Sep. 3, 2001 (GB) .................................. 0121308.1

(51) Int. Cl.
*G02F 1/01* (2006.01)
*G03H 1/08* (2006.01)
(Continued)

(52) U.S. Cl.
CPC .. *G03H 1/08* (2013.01); *G02F 1/01* (2013.01); *G03H 1/04* (2013.01); *G03H 1/0866* (2013.01);
(Continued)

(58) Field of Classification Search
CPC ........... G02F 1/00; G02F 1/01; G02F 1/0102; G02F 1/0105; G02F 1/133; G02F 1/1335; G02F 1/133553; G02F 1/29; G02F 2001/291; G02F 2201/30; G02F 2201/34; G02F 2203/12; G02F 2203/28; G02F 2203/50; G03H 1/00; G03H 1/04; G03H 1/08; G03H 1/0866; G03H 1/0891; G03H 2001/0224; G03H 2001/0228; G03H 2001/0415; G02B 5/04; G02B 5/18; G02B 27/44
USPC ........... 359/3, 9, 11, 237–239, 279, 556, 559, 359/566, 24, 29; 385/133, 146, 147, 901; 398/49, 79; 362/26, 602; 369/103; 356/326, 328

See application file for complete search history.

(56) References Cited

U.S. PATENT DOCUMENTS 3,773,401 A  11/1973  Douklias et al.
3,917,380 A  11/1975  Kato et al.
(Continued)

FOREIGN PATENT DOCUMENTS

EP    0878729 A2    11/1998
EP    0878729 A3    3/1999
(Continued)

OTHER PUBLICATIONS

Yamazaki, H., et al., "4×4 Free Space Optical Switching Using Real-Time Binary Phase-Only Holograms Generated by a Liquid-Crystal Display," *Optical Society of America*, 16(18):1415-1417 (1991).
(Continued)

*Primary Examiner* — Loha Ben
(74) *Attorney, Agent, or Firm* — Hamilton, Brook, Smith & Reynolds, P.C.

(57) ABSTRACT

A modular routing node includes a single input port and a plurality of output ports. The modular routing node is arranged to produce a plurality of different deflections and uses small adjustments to compensate for wavelength differences and alignment tolerances in an optical system. An optical device is arranged to receive a multiplex of many optical signals at different wavelengths, to separate the optical signals into at least two groups, and to process at least one of the groups adaptively.

40 Claims, 36 Drawing Sheets

Related U.S. Application Data continuation of application No. 11/978,258, filed on Oct. 29, 2007, now Pat. No. 8,089,683, which is a continuation of application No. 11/515,389, filed on Sep. 1, 2006, now Pat. No. 7,612,930, which is a division of application No. 10/487,810, filed as application No. PCT/GB02/04011 on Sep. 2, 2002, now Pat. No. 7,145,710.

(51) Int. Cl.
  *G03H 1/04* (2006.01)
  *G02F 1/1335* (2006.01)
  *G02F 1/29* (2006.01)
  *G02B 5/32* (2006.01)
  *G02F 1/31* (2006.01)
  *G03H 1/00* (2006.01)
  *G03H 1/02* (2006.01)
  *H04J 14/08* (2006.01)
  *H04Q 11/00* (2006.01)
  *G02F 1/1334* (2006.01)
  *G02B 6/26* (2006.01)
  *G02B 6/293* (2006.01)
  *G02B 6/35* (2006.01)
  *G03H 1/22* (2006.01)
  *G03H 1/26* (2006.01)
  *H04J 14/02* (2006.01)

(52) U.S. Cl.
  CPC ........... *G03H 1/0891* (2013.01); G02F 1/1335 (2013.01); G02F 1/29 (2013.01); *G02F 1/13342* (2013.01); *G02F 2001/291* (2013.01); *G02F 2201/30* (2013.01); *G02F 2201/34* (2013.01); *G02F 2203/12* (2013.01); *G02F 2203/50* (2013.01); *G02F 2203/28* (2013.01); G02B 5/32 (2013.01); *G02B 6/266* (2013.01); *G02B 6/29311* (2013.01); *G02B 6/29314* (2013.01); *G02B 6/29391* (2013.01); *G02B 6/3512* (2013.01); *G02B 6/3534* (2013.01); G02B 6/3548 (2013.01); G02B 6/3556 (2013.01); G02F 1/31 (2013.01); G03H 1/0005 (2013.01); G03H 1/02 (2013.01); *G03H 1/2294* (2013.01); *G03H 2001/0224* (2013.01); *G03H 2001/0491* (2013.01); *G03H 2001/261* (2013.01); *G03H 2222/32* (2013.01); *G03H 2225/32* (2013.01); *G03H 2225/52* (2013.01); *G03H 2226/02* (2013.01); *H04J 14/021* (2013.01); H04J 14/0212 (2013.01); *H04J 14/0213* (2013.01); *H04J 14/0217* (2013.01); *H04J 14/0219* (2013.01); *H04J 14/022* (2013.01); H04J 14/08 (2013.01); H04Q 11/0005 (2013.01); *H04Q 2011/0028* (2013.01); *H04Q 2011/0039* (2013.01); *G03H 1/2286* (2013.01); *G03H 2222/13* (2013.01); *G03H 2223/23* (2013.01)
  USPC .................. 359/279; 359/9; 398/49; 398/81

(56) References Cited

U.S. PATENT DOCUMENTS

| | | | |
|---|---|---|---|
| 3,975,082 A | 8/1976 | Winzer | |
| 4,317,610 A | 3/1982 | Breglia et al. | |
| 4,758,090 A | 7/1988 | Schuma | |
| 4,952,010 A | 8/1990 | Healey et al. | |
| 4,964,701 A | 10/1990 | Dorschner et al. | |
| 5,018,835 A | 5/1991 | Dorschner | |
| 5,040,864 A | 8/1991 | Hong | |
| 5,107,359 A | 4/1992 | Ohuchida | |
| 5,121,231 A | 6/1992 | Jenkins et al. | |
| 5,126,869 A | 6/1992 | Lipchak et al. | |
| 5,140,448 A | 8/1992 | Bone et al. | |
| 5,153,751 A | 10/1992 | Ishikawa et al. | |
| 5,159,473 A | 10/1992 | Feldman | |
| 5,222,071 A * | 6/1993 | Pezeshki et al. | 372/26 |
| 5,230,005 A * | 7/1993 | Rubino et al. | 372/20 |
| 5,285,308 A | 2/1994 | Jenkins et al. | |
| 5,293,038 A | 3/1994 | Kadowaki et al. | |
| 5,311,360 A | 5/1994 | Bloom et al. | |
| 5,315,423 A | 5/1994 | Hong | |
| 5,325,224 A | 6/1994 | Lang et al. | |
| 5,329,384 A | 7/1994 | Setani et al. | |
| 5,414,540 A | 5/1995 | Patel et al. | |
| 5,416,616 A | 5/1995 | Jenkins et al. | |
| 5,424,866 A | 6/1995 | Kikinis | |
| 5,428,466 A | 6/1995 | Rejman-Greene et al. | |
| 5,436,760 A | 7/1995 | Nakabayashi | |
| 5,438,449 A | 8/1995 | Chabot et al. | |
| 5,440,654 A | 8/1995 | Lambert | |
| 5,461,475 A | 10/1995 | Lerner et al. | |
| 5,495,356 A | 2/1996 | Sharony et al. | |
| 5,515,354 A | 5/1996 | Miyake et al. | |
| 5,526,171 A | 6/1996 | Warren | |
| 5,539,543 A | 7/1996 | Liu et al. | |
| 5,548,418 A | 8/1996 | Gaynor et al. | |
| 5,552,916 A | 9/1996 | O'Callaghan et al. | |
| 5,576,873 A | 11/1996 | Crossland et al. | |
| 5,589,955 A | 12/1996 | Amako et al. | |
| 5,629,802 A | 5/1997 | Clark | |
| 5,661,577 A | 8/1997 | Jenkins et al. | |
| 5,661,591 A | 8/1997 | Lin et al. | |
| 5,757,536 A | 5/1998 | Rico et al. | |
| 5,802,222 A | 9/1998 | Rasch et al. | |
| 5,832,155 A | 11/1998 | Rasch et al. | |
| 5,856,048 A | 1/1999 | Tahara et al. | |
| 5,912,751 A | 6/1999 | Ford et al. | |
| 5,917,625 A | 6/1999 | Ogusu et al. | |
| 5,930,012 A | 7/1999 | Mears et al. | |
| 5,938,309 A | 8/1999 | Taylor | |
| 5,953,143 A | 9/1999 | Sharony et al. | |
| 5,959,747 A | 9/1999 | Psaltis et al. | |
| 5,960,133 A | 9/1999 | Tomlinson | |
| 5,963,682 A | 10/1999 | Dorschner et al. | |
| 5,986,782 A | 11/1999 | Alexander et al. | |
| 5,995,251 A | 11/1999 | Hesselink et al. | |
| 6,072,608 A | 6/2000 | Psaltis et al. | |
| 6,084,694 A | 7/2000 | Milton et al. | |
| 6,097,859 A | 8/2000 | Solgaard et al. | |
| 6,115,123 A | 9/2000 | Stappaerts et al. | |
| 6,130,872 A | 10/2000 | Sugiura et al. | |
| 6,141,361 A | 10/2000 | Mears et al. | |
| 6,175,432 B1 | 1/2001 | Wu et al. | |
| 6,195,184 B1 | 2/2001 | Chao et al. | |
| 6,222,954 B1 | 4/2001 | Riza | |
| 6,243,176 B1 | 6/2001 | Ishikawa et al. | |
| 6,263,123 B1 | 7/2001 | Bishop et al. | |
| 6,263,127 B1 | 7/2001 | Dragone et al. | |
| 6,275,623 B1 * | 8/2001 | Brophy et al. | 385/14 |
| 6,317,231 B1 | 11/2001 | Al-Salameh et al. | |
| 6,327,019 B1 | 12/2001 | Patel et al. | |
| 6,342,960 B1 | 1/2002 | McCullough | |
| 6,374,008 B2 | 4/2002 | Solgaard et al. | |
| 6,415,070 B1 | 7/2002 | Munoz-Bustamante et al. | |
| 6,430,328 B1 | 8/2002 | Culver et al. | |
| 6,445,470 B1 | 9/2002 | Jenkins et al. | |
| 6,456,419 B1 | 9/2002 | Winker et al. | |
| 6,504,976 B1 | 1/2003 | Polynkin et al. | |
| 6,507,685 B1 | 1/2003 | Polynkin et al. | |
| 6,529,307 B1 | 3/2003 | Peng et al. | |
| 6,542,268 B1 | 4/2003 | Rotolo et al. | |
| 6,549,691 B1 | 4/2003 | Street et al. | |
| 6,549,692 B1 | 4/2003 | Harel et al. | |
| 6,549,699 B2 | 4/2003 | Belser et al. | |
| 6,549,865 B2 | 4/2003 | Tomlinson | |
| 6,559,986 B1 | 5/2003 | Sauer et al. | |
| 6,570,681 B1 | 5/2003 | Favalora et al. | |
| 6,574,026 B2 | 6/2003 | Jin et al. | |
| 6,577,417 B1 | 6/2003 | Khoury | |
| 6,583,901 B1 | 6/2003 | Hung | |
| 6,594,082 B1 | 7/2003 | Li et al. | |

(56) References Cited

U.S. PATENT DOCUMENTS

| | | | |
|---|---|---|---|
| 6,603,894 B1 | 8/2003 | Pu | |
| 6,614,572 B2 | 9/2003 | Kelley et al. | |
| 6,614,953 B2 | 9/2003 | Strasser et al. | |
| 6,625,346 B2 | 9/2003 | Wilde | |
| 6,633,693 B1 | 10/2003 | Peale et al. | |
| 6,654,516 B2 | 11/2003 | So | |
| 6,657,770 B2 | 12/2003 | Marom et al. | |
| 6,661,948 B2 | 12/2003 | Wilde | |
| 6,687,431 B2 | 2/2004 | Chen et al. | |
| 6,690,850 B1 | 2/2004 | Greywall | |
| 6,707,959 B2 | 3/2004 | Ducellier et al. | |
| 6,710,292 B2 | 3/2004 | Fukuchi et al. | |
| 6,711,316 B2 | 3/2004 | Ducellier | |
| 6,714,309 B2 | 3/2004 | May | |
| 6,738,337 B2* | 5/2004 | Wu et al. | 369/103 |
| 6,738,540 B2 | 5/2004 | Marom | |
| 6,747,774 B2 | 6/2004 | Kelly et al. | |
| 6,760,511 B2 | 7/2004 | Garrett et al. | |
| 6,762,873 B1 | 7/2004 | Coker et al. | |
| 6,765,635 B1 | 7/2004 | Kelley et al. | |
| 6,781,691 B2 | 8/2004 | MacKinnon et al. | |
| 6,782,205 B2 | 8/2004 | Trisnadi et al. | |
| 6,795,182 B2 | 9/2004 | Rakuljic et al. | |
| 6,801,310 B2 | 10/2004 | Kewitsch et al. | |
| 6,804,412 B1 | 10/2004 | Wilkinson | |
| 6,804,428 B1 | 10/2004 | Garrett et al. | |
| 6,809,853 B2 | 10/2004 | Culver | |
| 6,813,408 B2 | 11/2004 | Bortolini | |
| 6,816,640 B2 | 11/2004 | Tew | |
| 6,826,330 B1 | 11/2004 | Godil et al. | |
| 6,839,136 B2 | 1/2005 | Mikes | |
| 6,842,549 B2 | 1/2005 | So | |
| 6,845,195 B2 | 1/2005 | Tedesco | |
| 6,864,944 B1 | 3/2005 | Scattergood et al. | |
| 6,865,346 B1 | 3/2005 | Miller et al. | |
| 6,867,888 B2 | 3/2005 | Sutherland et al. | |
| 6,873,447 B2 | 3/2005 | Buzzetta | |
| 6,879,426 B1 | 4/2005 | Weiner | |
| 6,891,676 B2* | 5/2005 | Ford et al. | 359/572 |
| 6,920,261 B2 | 7/2005 | Inada et al. | |
| 6,922,513 B2 | 7/2005 | Holmes | |
| 6,950,609 B2 | 9/2005 | Marom | |
| 6,954,252 B1 | 10/2005 | Crossland et al. | |
| 6,956,687 B2 | 10/2005 | Moon et al. | |
| 6,958,841 B2 | 10/2005 | Rancuret et al. | |
| 6,975,786 B1 | 12/2005 | Warr et al. | |
| 6,990,268 B2 | 1/2006 | Weverka | |
| 7,019,883 B2 | 3/2006 | Moon et al. | |
| 7,039,259 B2 | 5/2006 | Corem et al. | |
| 7,079,723 B2 | 7/2006 | Bortolini et al. | |
| 7,092,599 B2 | 8/2006 | Frisken | |
| 7,106,966 B1 | 9/2006 | Lalonde et al. | |
| 7,113,702 B2 | 9/2006 | Yamada et al. | |
| 7,127,168 B2 | 10/2006 | Kani et al. | |
| 7,145,710 B2 | 12/2006 | Holmes | |
| 7,151,601 B2 | 12/2006 | MacKinnon et al. | |
| 7,177,081 B2 | 2/2007 | Tomita et al. | |
| 7,177,496 B1 | 2/2007 | Polynkin et al. | |
| 7,230,746 B2 | 6/2007 | Cameron et al. | |
| 7,298,540 B2 | 11/2007 | Peng et al. | |
| 7,397,980 B2 | 7/2008 | Frisken | |
| 7,417,706 B2 | 8/2008 | Holmes | |
| 7,436,588 B2 | 10/2008 | Rothenberg et al. | |
| 7,442,909 B2 | 10/2008 | Holmes | |
| 7,457,547 B2 | 11/2008 | Frisken et al. | |
| 7,468,840 B2 | 12/2008 | Cohen et al. | |
| 7,536,108 B2 | 5/2009 | Hirano et al. | |
| 7,612,930 B2 | 11/2009 | Holmes | |
| 7,664,395 B2* | 2/2010 | Holmes | 398/49 |
| 7,796,319 B2 | 9/2010 | MacKinnon et al. | |
| 7,847,227 B2 | 12/2010 | Holmes | |
| 8,089,683 B2 | 1/2012 | Holmes | |
| 8,335,033 B2* | 12/2012 | Holmes | 359/279 |
| 2001/0050787 A1 | 12/2001 | Crossland et al. | |
| 2002/0060760 A1 | 5/2002 | Weiner | |
| 2002/0079432 A1 | 6/2002 | Lee et al. | |
| 2002/0081070 A1 | 6/2002 | Tew | |
| 2002/0090878 A1 | 7/2002 | Holmes | |
| 2002/0181910 A1 | 12/2002 | Holmes | |
| 2003/0142378 A1 | 7/2003 | Mears et al. | |
| 2003/0184843 A1 | 10/2003 | Moon et al. | |
| 2004/0126120 A1 | 7/2004 | Cohen et al. | |
| 2004/0135965 A1 | 7/2004 | Holmes | |
| 2005/0018259 A1 | 1/2005 | Holmes | |
| 2005/0219457 A1 | 10/2005 | Crossland et al. | |
| 2005/0270616 A1 | 12/2005 | Weiner | |
| 2006/0209250 A1 | 9/2006 | Holmes | |
| 2007/0035803 A1 | 2/2007 | Holmes | |
| 2007/0052694 A1 | 3/2007 | Holmes | |
| 2007/0076163 A1 | 4/2007 | Crossland et al. | |
| 2007/0268537 A1 | 11/2007 | Holmes | |
| 2008/0145053 A1 | 6/2008 | Holmes | |
| 2008/0265150 A1 | 10/2008 | Holmes | |
| 2010/0209109 A1 | 8/2010 | Holmes | |
| 2013/0070320 A1 | 3/2013 | Holmes | |

FOREIGN PATENT DOCUMENTS

| | | |
|---|---|---|
| EP | 1 050 775 A1 | 11/2000 |
| EP | 1 207 418 A1 | 5/2002 |
| EP | 1 053 501 B1 | 7/2003 |
| GB | 9923428.8 | 10/1999 |
| JP | 54-005454 | 1/1979 |
| JP | 57-026720 | 2/1982 |
| JP | 62-025709 | 2/1987 |
| JP | 63-148725 | 6/1988 |
| JP | 02-143203 | 1/1990 |
| JP | 03-179332 | 5/1991 |
| JP | 04-221927 | 12/1992 |
| JP | 09-189809 | 7/1997 |
| JP | 09-096841 | 8/1997 |
| JP | 09-281917 | 10/1997 |
| WO | WO 96-09727 | 3/1996 |
| WO | WO 96-10776 | 4/1996 |
| WO | WO 98-06192 | 2/1998 |
| WO | WO 99-39240 | 8/1999 |
| WO | WO 01/25840 A1 | 4/2001 |
| WO | WO 01 25840 A1 | 4/2001 |
| WO | WO 01/25848 A2 | 4/2001 |
| WO | WO 01 25848 A2 | 4/2001 |
| WO | WO 01/25848 A3 | 4/2001 |
| WO | WO 01/40832 A2 | 6/2001 |
| WO | WO 01/40832 A3 | 6/2001 |
| WO | WO 01-90823 | 11/2001 |
| WO | WO 01 90823 A1 | 11/2001 |
| WO | WO 02/079870 A2 | 10/2002 |
| WO | WO 02 079870 A2 | 10/2002 |
| WO | WO 02 101451 A1 | 12/2002 |
| WO | WO 03087902 | 10/2003 |
| WO | WO 03098856 | 11/2003 |

OTHER PUBLICATIONS

Mears, R. J., et al., "Telecommunications Applications of Ferroelectric Liquid-Crystal Smart Pixels," IEEE Journal of Selected Topics in Quantum Electronics, vol. 2, No. 1, Apr. 1996, pp. 35-46.

Mears, R. J., et al., "WDM Channel Management Using Programmable Holographic Elements," IEE Colloquim on Multiwavelength Optical Networks: Devices, Systems and Network Implementations, IEE, London, GB, Jun. 18, 1998, pp. 11-1-11-6.

Pan, Ci-Ling, et al., "Tunable Semiconductor Laser with Liquid Crystal Pixel Mirror in Grating-Loaded External Cavity," Electronics Letters, IEE Stevenage, GB, vol. 35, No. 17, Aug. 19, 1999, pp. 1472-1473.

Marom, D.M., et al., "Wavelength-Selective 1×4 Switch for 128 WDM Channels at 50 Ghz Spacing," *OFC Postdeadline Paper*, pp. FB7-1-FB7-3 (2002).

Yamazaki, H., and Yamaguchi, M., "4×4 Free-Space Optical Switching Using Real-Time Binary Phase-Only Holograms Generated by a Liquid-Crystal Display," Optics Letters, vol. 16, No. 18, pp. 1415-1417, Sep. 15, 1991.

(56) References Cited

OTHER PUBLICATIONS

Holmes, M.J. et al., "Low Crosstalk Devices for Wavelength-Routed Networks," *IEEE Colloquium on Guided Wave Optical Signal Processing*, pp. 1-10 (Jun. 8, 1995).
Rhee, J.-K. et al., "Variable Passband Optical Add-Drop Multiplexer Using Wavelength Selective Switch," *Proc. 27th Eur. Conf. on Opt. Comm. (ECOC'01—Amersterdam)*, pp. 550-551 (Sep. 30, 2001 through Oct. 4, 2001).
Marom, D.M., et al., "Wavelength-Selective 1×4 Switch for 128 WDM Channels at 50 Ghz Spacing," *OFC Postdeadline Paper*, pp. FB7-1-FB7-3 (Mar. 2002).
Parker, et al., "Dynamic Digital Holographic Wavelength Filtering," *Journal of Lightwave Technology*, vol. 16, No. 7 (Jul. 1998).
Complaint filed on Feb. 26, 2013 in the matter of *Thomas Swan & Co. Ltd. v. Finisar Corporation*, Civil Action No. 2:13-cv-178, pending in U.S. District Court for the Eastern District of Texas, Marshall Division.
Answer filed on May 29, 2013 in the matter of *Thomas Swan & Co. Ltd. v. Finisar Corporation*, Civil Action No. 2:13-cv-178, pending in U.S. District Court for the Eastern District of Texas, Marshall Division.
Timofeev, F.N. et al., "1.5um free-space grating multi/demultiplexer and routing switch," IEE, Electronics Letters (Jul. 4, 1996).
Cohen, Adam D. et al., "100-GHz-Resolution Dynamic Holographic Channel Management for WDM," IEEE, Photonics Technology Letters (Jul. 1999).
Yamazaki, Hirofumi et al., "1X1104 holographic switching with a ferroelectric liquid-crystal spatial light modulator," OSA, Optics Letters (1995).
Travers, Christine M. et al., "4x4 ATM Crossbar using N4 Global FSOI," IEEE, LEOS Summer Topical Meetings (Jul. 1998).
Wolffer, N. et al., "8x8 holographic single mode fiber switch based on electrically addressed nematic liquid crystal deflectors," SPIE, Optics in Computing (May 24, 2000).
Kirk, A.G. et al., "A Compact and Scalable Free-Space Optical Crossbar," Holographic Systems, Components and Applications (Sep. 1991).
Underwood, I. et al., "A high performance spatial light modulator," SPIE, Devices for Optical Processing (1991).
O'Brien, D.C. et al., "A holographically routed optical crossbar theory and simulation," Optical Computing and Processing (1991).
Yamamoto, Tsuyoshi et al., "A multi-channel free-space optical switch using liquid crystal polarization control devices," SPIE, Photonic Switching (1992).
Latham, S.G. et al., "A Programmable Optical Interconnection System Using an Amorphous Silicon Ferroelectric Spatial Light Modulator," IEEE, Optical Connection and Switching Networks for Communication and Computing (May 14, 1990).
Lee, Hyuk, "Acoustoelectrooptic multichannel spectrum analyzer," Optical Society of America (Dec. 1, 1986).
Parker, M. C. et al., "Active holographic spectral equalization and channel management for WDM," OSA/OFC (1997).
Cohen, A.D. et al., "Active management of 100-GHz-spaced WDM channels," OSA/OFC (Feb. 21, 1999).
Shirai, T. et al., "Adaptive wave-front correction by means of all-optical feedback interferometry," OSA, Optics Letters (Jun. 1, 2000).
McKnight, Douglas J., "An Electronically Addressed Spatial Light Modulator," Univ. of Edinburgh (1989).
Underwood, I., "An nMOS Addressed Liquid Crystal Spatial Light Modulator," Univ. of Edinburgh (1987).
Wu, Ming, "An overview of micromachining for optical communications," OFC, Technical Digest (1997).
Cohen, A.D. et al., "Applications of FLC SLM Dynamic Holograms to WDM Network Components," OPA, Ferroelectrics (1998).
Davis, Jeffrey et al., "Anamorphic optical systems using programmable spatial light modulators," OSA, Applied Optics (1992).
Crossland, W.A. et al., "Beam Steering Optical Switches using LCOS: The 'ROSES' Demonstrator," IEEE (Jul. 2000).

Tee, Clarence A. T. H. et al., "Binary phase modulation using electrically addressed transmissive and silicon backplane spatial light modulators," SPIE (Sep. 1, 2000).
Matic, Roy M., "Blazed phase liquid crystal beam steering," SPIE (1994).
Ramaswami, R. et al., Chapter 3, Components, Optical Networks, Morgan Kaufman Publishers (1998).
Livescu, Gabriela, "Channel monitoring in WDM networks; a system perspective," OSA-IPR (1998).
Barrett, C.P. et al., "Components for the implementation of free-space optical crossbars," Optical Society of America (1996).
Lamers, Kristina Lee, "Components of an Improved Design Process for Micro-Electro-Mechanical Systems," ProQuest LLC (Sep. 1, 2008).
Coleman, Christopher Lamar, "Computer Generated Holograms for Free-Space Optical Interconnects," UMI (1998).
O'Brien, D.C. et al., "Computer Generated holograms optimised for illumination with partially coherent light using Silicon Backplane Spatial Light Modulators as the recording device," SPIE, Optics for Computers (1991).
Johansson, Mathias et al., "Computer-controlled, adaptive beam steering, implemented in a FLC-SLM free-space optical switch," OSA-DOMO (Jun. 18, 2000).
Walker, A.C. et al., "Construction of a Matrix-Matrix Crossbar Optical Interconnect Employing Diffractive Fan-Out and Fan-In Elements," Holographic Systems, Components and Applications (Sep. 1993).
Berthele, Patrick et al., "Design and characterization of a liquid-crystal spatial light modulator for a polarization-insensitive optical space switch," Optical Society of America, Applied Optics (1998).
Chu, H. H., "Design Issues in Compact Optical Switches Using Spatial Light Modulators," The Institution of Electrical Engineers (1998).
Parker, M. C. et al., "Digital Holographic Tuning Mechanism for WDM," IEEE (1996).
Parker, M. C. et al., "Digitally Tunable Wavelength Filter and Laser," IEEE, Photonics Technology Letters (Aug. 1996).
Cohen, Adam D. et al., "Dynamic Holographic Eight-channel Spectral Equaliser for WDM," IEEE, LEOS Summer Topical Meeting on WDM Components Technology (Aug. 13, 1997).
O'Brien, D.C. et al., "Dynamic holographic interconnects that use ferroelectric liquid-crystal spatial light modulators," OSA, Applied Optics (May 10, 1994).
Parker, M. C. et al., "Dynamic Holographic Spectral Equalization for WDM," IEEE, Photonics Technology Letters (Apr. 1997).
Cohen, Adam D. et al., "Dynamic holographic telecommunications components based on spatial light modulation with pixelated x2 polymers in a Fabry-Perot cavity," Society of Photo-Optical Instrumentation Engineers (Mar. 2000).
Tan, Kim L. et al., "Dynamic holography for optical interconnections. I. Noise floor of lowcross-talk holographic switches," OSA (Jan. 2001).
Tan, Kim L. et al., "Dynamic holography for optical interconnections. II. Routing holograms with predictable location and intensity of each diffraction Order," OSA (Jan. 2001).
Ford, J.E. et al., "Dynamic Spectral Equalization Using Micro-Opto-Mechanics," IEEE, Photonics Technology Letters (Oct. 1998).
Klaus, Werner et al., "Efficient beam deflector with a blazed liquid crystal phase grating," Optical Computing, Technical Digest (Apr. 21, 1996).
Agranat, Aharon, "Electroholographic Wavelength Selective Crossconnect," IEEE (Jul. 1999).
Weiner, A. M. et al., "Electronically Programmable Femtosecond Pulse Shaping Using a Multielement Phase Modulator," Springer-Verlag Berlin, Heidelberg (1990).
Stalder, M. et al., "Electrically switchable diffractive optical element for image processing," OSA, Optics Letters (Jan. 1, 1994).
Pan, Ru-Pin et al., "Electronically Tunable Single and Multiple Wavelength Broad-Area Semiconductor Laser By Using a Liquid Crystal Pixel Mirror," IEEE (Nov. 2000).
Davis, Jeffrey et al., "Encoding complex diffractive optical elements onto a phase-only liquid-crystal spatial light modulator," SPIE, Optical Engineering (Feb. 2001).

(56) References Cited

OTHER PUBLICATIONS

Collings, N. et al., "Evolutionary development of advanced liquid crystal spatial light modulators," Applied Optics (Nov. 15, 1989).
Yamazaki, Hirofumi et al., "Experiments on a multichannel holographic optical switch with the use of a liquid-crystal display," OSA, Optics Letters (Sep. 1, 1992).
Riza, Nabeel A. et al., "Fault-tolerant dense multiwavelength add-drop filter with a two-dimensional digital micromirror device," Optical Society of America (1998).
Paige, E. G. S. et al., "Feedback generated holograms," Electronics Letters (Jul. 7, 1994).
Weiner, A.M., "Femtosecond pulse shaping using spatial light modulators," American Institute of Physics, Review of Scientific Instruments (May 2000).
Sumriddetchkajorn, Sarun, "Fiber-Optic Beam Control Systems Using Microelectromechanical Systems (MEMS)," UMI, ProQuest Dissertations (2000).
Dias, Antonio R. et al., "Fiber-optic crossbar switch with broadcast capability," Optical Engineering (Nov. 1988).
Juday, Richard D. et al., "Full face, full complex characterization of a reflective SLM," SPIE, Optical Pattern Recognition (Mar. 31, 2000).
Wilkinson, T. D. et al., "High Tilt Angle FLC SLM for Optical Interconnects," IEEE The Institute of Electrical Engineers (2000).
Scarr, R. W. A. et al., "Highly parallel optics in ATM switching networks," IEEE, Proc.-Optoelectron. (Apr. 1997).
Weiner, A. M. et al., "High-resolution femtosecond pulse shaping," J. Opt. Society of America (Aug. 1988).
Carranza, C. de Castro et al., "Holographic grating with two spatial frequencies for the simultaneous study of two spectral profiles," Optical Society of America (1992).
Yamazaki, Hirofumi et al., "Holographic optical switching using a ferroelectric liquid crystal spatial light modulator," SPIE, Photonic Switching (1992).
Crossland, W. A. et al., "Holographic Optical Switching: The 'ROSES' Demonstrator," IEEE, Journal of Lightwave Technology (Dec. 2000).
Natarajan, L. V. et al., "Holographic PDLCs for optical beam modulation, deflection, and dynamic filter applications," SPIE (1998).
Wolffer, N. et al., "Holographic switching between single mode fibers based on electrically addressed nematic liquid crystal gratings with high deflection accuracy," Elsevier Science, Optics Communication (Feb. 1, 1999).
Boysel, R. M. et al., "Integration of Deformable Mirror Devices with optical fibers and waveguides," Integrated Optics and Microstructures (1992).
Yamazaki, Hirofumi et al., "Large-scale holographic switch with a ferroelectric liquid-crystal spatial light modulator," IEEE (1997).
Patel, J. S. et al., "Liquid Crystal and Grating-Based Multiple-Wavelength Cross-Connect Switch," IEEE, Photonics Technology Letters (1995).
Riza, Nabeel A., "Liquid Crystal Electro-Optical Switching Approaches," OSA-IPR (Jul. 12, 2000).
Wang, Xu et al., "Liquid crystal on silicon beam deflector," SPIE, Conference on Diffractive and Holographic Technologies (1999).
Crossland, W. A. et al., "Liquid crystal polarization independent beam steering switches for operation at 1.5 microns," IEEE (Nov. 2000).
Crossland, W. A. et al., "Liquid Crystal Spatial Light Modulators for Optical Interconnects and Space Switching," IEEE (1990).
Seekola D. L. et al., "Liquid Crystal Technology Development for Telecommunication Applications," SPIE, Liquid Crystals (Oct. 24, 2000).
Love, Gordon, "Liquid-crystal phase modulator for unpolarized light," Optical Society of America, Applied Optics (May 1, 1993).
Pan, Ru-Pin, et al., "Liquid-crystal-based tunable optical filtering devices for DWDM," SPIE, Active and Passive Optical Components for WDM Communication (Jul. 30, 2001).
Liu, A. Q. et al., "Microelectromechanical fiber optical switches," SPIE, Conference on Advanced Photonic Sensors and Apps (Dec. 1999).
Burns, David M., "Microelectromechanical Optical Beam Steering Systems," UMI, ProQuest Dissertations (Dec. 1997).
Lin, Lih Y. et al., "Micro-Electro-Mechanical Systems (MEMS) for WDM Optical-Crossconnect Networks," IEEE (1999).
Pu, Chuan et al., "Micro-Machined Optical Add-Drop Multiplexer with Client Configurability," IEEE (Aug. 2000).
Riza, Nabeel A. et al., "Micromechanics-based wavelength-sensitive photonic beam control architectures and applications," Optical Society of America (Feb. 20, 2000).
Gilleo, Ken, "MOEMS the Word," Circuits Assembly (Nov. 2000).
Riza, Nabeel A. et al., "Multi-Wavelength 2x2 Switch Structure using Mirror Array," IEEE (1999).
Pan, J. J. et al., "New 1xN fiber coupler employing diffractive optical element," Lasers and Electro-Optics, CLEO '99 (May 25, 1999).
Mears, Robert J. et al. "OADM and WDM channel management using programmable holographic filters," OSA-IPR (1999).
Shirai, Seiiti et al., "Optical beam shifter module with high extinction ration for 1024-input-port optical switching network," SPIE, Photonic Switching (1992).
Jackman, Neil A. et al., "Optical Cross Connects for Optical Networking," Lucent Technologies Inc., Bell Labs Tech. Journal (1999).
O'Brien, D. C. et al., "Optical Crossbar Switching Using Dynamic Holograms Written to Ferroelectric Liquid Crystal Spatial Light Modulators," IEEE, Optical Switching (1993).
Neff, John A., "Optical Interconnects Based on Two-Dimensional VCSEL Arrays," IEEE (1994).
McManamon, Paul F. et al., "Optical Phased Array Technology," IEEE (Feb. 1996).
Vinouze, B. et al., "Optical switches for cross-connects using high efficiency nematic liquid crystal gratings," SPIE, Conference on Optoelectronic Interconnects VI (1999).
Lin, Shivan Huei et al., "Optical Wavelength Add-Drop Multiplexer using Localized Volume Holographic Gratings," OSA-OC (Jan. 9, 2001).
White, H. J. et al., "Optically connected parallel machine; Design, performance and application," IEEE, Proc.-Optoelectron. (Jun. 1999).
Wang, Yalou et al., "Modelling Optically Interconnected Packet Switches," SPIE, Terabit Optical Networking (Oct. 5, 2000).
Warr, S. T. et al., "Optically transparent digitally tunable wavelength filter," Electronics Letters (Jan. 19, 1995).
Walker, Steven J. et al., "Optics & MEMS," Naval Research Laboratory (1999).
Collings, N. et al., "Packet switching network based on optical fan-in," SPIE, Optics in Computing (May 24, 2000).
Holton, Carvel E. et al., "Patterned Alignment, Liquid Crystal Diffractive Spatial Light Modulators & Devices," SPIE, Liquid Crystal SLMs (Apr. 20, 1998).
Bergeron, Alain et al., "Phase calibration and applications of a liquid-crystal spatial light modulator," Optical Society of America (Aug. 10, 1995).
Tee, Clarence A. T. H. et al., "Phase modulation using the silicon backplane spatial light modulator and transmissive glass," SPIE, Optical Computing and Interconnects (Oct. 1, 1999).
Heritage, J. P. et al., "Picosecond pulse shaping by spectral phase and amplitude manipulation," Optical Society of America (1985).
Hattori, Kuninori et al., "PLC-Based Optical Add/Drop Switch with Automatic Level Control," IEEE, Lightwave Technology Journal (Dec. 1999).
Warr, S. T. et al., "Polarisation insensitive operation of ferreoelectric liquid crystal devices," IEE, Electronics Letters (Mar. 6, 1995).
Shirasaki, M. et al., "Polarization-independent grating type optical spectrum analyzer with fiber interface," OSA/OFC (1991).
Hinton, H. Scott, "Progress in Smart Pixel Technologies," IEEE, Journal of Selected Topics in Quantum Electronics (Apr. 1996).
Barnes, T. H. et al., "Reconfigurable Holographic Optical Interconnections Using a Phase-Only Newmatic Liquid Crystal Spatial Light Modulators," Heriot-Watt University (1991).
Lofving, Bjorn, "Self-adjusting dynamic binary phase holograms," Optical Society of America (Apr. 10, 1997).

(56) References Cited

OTHER PUBLICATIONS

White, H. et al., "SLM-Based Optical Crossbars Based on the Matrix-Matrix Principle," IEEE, Optical Switching (1993).

Marques, A. et al., "Simultaneous encoding of amplitude apodizers and Fresnel lenses in spatial light modulators," SPIE, 4th Iberoamerican Meeting on Optics (Aug. 14, 2001).

Crossland, W. A. et al., "Some Applications of Optical Networks in the Architecture of Electronic Computers," IEEE, Optical Connection and Switching Networks for Communication and Computing (May 14, 1990).

Burdge, Geoffrey et al., "Spatial Light Modulators," Optical Society of America (Mar. 1, 1997).

Turnbach, S. et al., "Special Technology Area Review on Micro-Opto-Electro-Mechanical-Systems (MOEMS)," Dept. of Defense (Dec. 1, 1997).

Krishnamoorthy, U. et al., "Surface-micromachined mirrors for scalable fiber optic switching applications," SPIE, MOEMS and Miniaturized Systems (Aug. 22, 2000).

Weiner, A. M. et al., "Synthesis of phase-coherent, picosecond optical square pulses," Optical Society of America (Mar. 1, 1986).

Birch, M. J. et al., "The Design of Scaleable Optical Crossbar Structures Using FELV/VLSI Technology and Free Space Optics," Kings College (No date).

Giles, Randy C. et al., "The Wavelength Add-Drop Multiplexer for Lightwave Communication Networks," Lucent Technologies Inc. (1999).

Dames, Mark P. et al., "Three-stage high-performance optoelectronic asynchronous transfer mode switch; design and performance," SPIE, Optical Engineering (1996).

Patel, J. S. et al., "Tunable Polarization Diversity Liquid-Crystal Wavelength Filter," IEEE Photonics Technology Letters (Aug. 1991).

Pan, Ci-Ling et al., "Tunable semiconductor laser with liquid crystal pixel mirror in grating-loaded external cavity," IEEE, Electronics Letters (Jul. 6, 1999).

Wilmsen, Carl et al., "VCSEL Based High Performance ATM Switch," Vertical-Cavity Lasers, Technologies for a Global Information Infrastructure (Aug. 13, 1997).

Wilmsen, Carl et al., "Vertical cavity surface emitting laser based optoelectronic asynchronous transfer mode switch," SPIE Optical Engineering (Jul. 1, 1999).

Love, Gordon, "Wave-front correction and production of Zernike modes with a liquid-crystal spatial light modulator," Optical Society of America (Mar. 1, 1997).

Ford, Joseph E. et al., "Wavelength Add/Drop Switching Using Tilting Micromirrors," IEEE, Journal of Lightwave Tech. (May 1, 1999).

Riza, Nabeel A. et al., "Wavelength Sensitive Photonic Modules for Signal Conditioning," Photonoics Info Processing Systems Laboratory UCF (Apr. 1, 2000).

Pan, Ru-Pin et al., "Wavelength tuning and multiple wavelength generation using a reflection-type liquid crystal spatial light modulator," SPIE, Spatial Light Modulators: Technology and Applications (Nov. 8, 2001).

Yamazaki, Hirofumi, et al., "4X4 free-space optical switching using real-time binary phase only holograms generated by a liquid-crystal display," OSA, Optics Letters, (Sep. 15, 1991).

Ulrich, D. et al., "A Diffraction Based Polarisation Independent Lightvalve," IEE, (2000).

Parker, Michael C. et al., "A novel active holographic arrayed waveguide grating for WDM Subsystems," (2000).

Stanley et al., "A novel electro-optic modulator system for the production of dynamic images from Giga-pixel computer generated holograms," SPIE (2000).

Latham, et al., "A Reconfigurable 2-D Optical Interconnect System Using a Liquid Crystal Spatial Light Modulator," IEE (1988).

Koulaxouzidis, "A shear and vertical stress sensor for physiological measurements," IEEE (2000).

Xu H., et al., "A simple method for optically enhancing the small electro-optical effects of fast switching electroclinic liquid crystals," Applied Physics Letters (1999).

Johansson, Mathias et al., "Adaptive beam steering implemented in a ferroelectric liquid-crystal spatial-lightmodulator free-space, fiber-optic," Applied Optics (Aug. 10, 2002).

"Adaptive Spectral Attenuator Using Fourier Synthesis," CiDRA, 6028397 (Apr. 11, 2001).

Underwood, et al., "Antiferroelectric Liquid Crystal on Silicon," IEEE (2000).

Parker, "Applications of Active Arrayed-Waveguide Gratings in Dynamic WDM Networking and Routing," JOLT (Dec. 2000).

Wilkinson et al., "Applications of Ferroelectric Liquid Crystal LCOS Devices Ferroelectrics", Gordon & Breach Science Publishers (2002).

Ahderom, S., "Applications of Liquid Crystal Spatial Light Modulators in Communications," Optical IEEE (Jul. 2002).

Parker, M.C. et al., "Arrayed-Wavedguide grating passband by Flattening by Combined Phasing Amplitude Apodisation," ECOC '98 (1998).

Lofving, Bjorn et al., "Beam Steering with two ferroelectric liquid-crystal spatial light modulators," Optics Letters (Oct. 1, 1998).

Roberts, Nicholas, "Binary phase gratings for hexagonal array generation," OptComm (1992).

Hirabayashi, Katsuhiko et al., "Board-to-board free-space optical interconnections passing through boards for a bookself-assembled terabit-per second-class ATM switch," OSA, Applied Optics (May 10, 1998).

Yim, L.W.K. et al., "Comparison of operation parameters between binary and analogue switching pixellated light valves," IEE, Proc.-Optoelectron. (Aug. 1998).

Manolis, I. G., et al., "Control of the Electro-Optic Bistability of Some Ferroelectric Liquid Crystals Useful for Binary Phase Optical Mod," OPA (2000).

Holmes, M.J. et al., "Crosstalk Calculations for Semiconductor Laser Optical Aplifires," J Opt Comm, (1988).

Tee C.A., et al., "Design of a free space optical switch demonstrator for a VCSEL-based photonic packet switch," OSA/OC (2000).

Parker, Michael C. et al., "Design of Arrayed-Waveguide Gratings Using Hybrid Fourier-Fesnel Transform Techniques," IEEE (1999).

Holmes, M.J. et al., "Design of non-linear optical fibres," OSA, Technical Digest Series vol. 15, (1993).

Koulaxouzidis, "Development of a fibre Bragg grating sensor for in-shoe shear stress measurement: design and preliminary results," SPIE (2000).

Holmes, M.J. et al., "Development of Radiation-Mode Filters for WDM," IEE (1998).

Wilkinson, T.D. et al., "Dynamic asymmetric binary holograms using a ferroelectric liquid crystal spatial light modulator," Optics Communications (1994).

O'Brien, Dominic C., "Dynamic Holograms for Optical Interconnection," Thesis, King's College (1993).

Parker, Michael C., "Dynamic Holograms for Wavelength Division Multiplexing," Thesis, Sidney Sussex College (1996).

Tan, Kim L. et al., "Dynamic Holography Using Ferroelectric Liquid Crystal on Silicon Spatial Light Modulators Thesis," University of Cambridge (1999).

U.S. Appl. No. 60/310,991, filed Aug. 9, 2001, entitled "Dynamically Reconfigurable Optical Smart Node," by Paul Szczepanek, et al.

Manolis, "Electrically Addressed Liquid Crystal Phase Gratings for Optical Switches, Thesis," Kings College (Jun. 6, 2002).

Underwood, M. et al., "Evaluation of an nMOS VLSI array for an adaptive liquid-crystal spatial light modulator," IEE, Pt. J (1986).

Cohen, A. D. et al., "Fast polymer spatial light modulators for dynamic holographic WDM Network Components," SPIE (1998).

Xu H., et al., "Fast Switching Electroclinic Mixtures Based on a Series of Chloroester Homolgues," OPA (1999).

Wilkinson, T.D. et al., "Ferroelectric Liquid Crystal on Silicon Spatial Light Modulator Designed for High Yield and Low Cost Fabrication: The Fast Bitplane SLM," OPA, Ferroelectrics (1998).

Katsuhiko Hirabayashi, et al., "Free-space optical interconnetions with liquid-crystal-microprism arrays," Applied Optics (May 10, 1995).

Warr, "Free-Space Switching for Optical Fibre Networks, Thesis," Christ's College (1996).

(56) References Cited

OTHER PUBLICATIONS

Parker, M.C. et al., "High Usage Optical Access Architecture Featuring Coarse Space-Wavelength Routing," ECOC '98 (1998).
Holmes, M.J. et al., "Highly Nonlinear Optical Fiber for All Optical Processing Applications," IEEE, Photonics Technology Letters (1995).
Wilkinson, T.D. et al., "Holographic Crossbar Switch Using Asymmeetric Binary Holograms," Cambridge (1994).
Yiptong, A. et al., "Holographic Equalisation using active Arrayed Waveguide Gratings," IEEE (1998).
Yiptong, A. et al., "Holographic Equalisation using active Arrayed Waveguide Gratings," IEEE (1999).
Obrien, D.C. et al., "Holographically Routed Optical Crossbar using Ferroelectric Liquid-Crystal Over Silicon Spatial Light Modulator," SSLM OPA, Ferroelectrics (1996).
Kondis, John et al., "Liquid Crystals in Bulk Optics-Based DWDM Optical Switches and Spectral Equalizers," IEEE, Lasers and Electro-Optics Society (2001).
Holmes, W. J. et al., "Low Crosstalk Devices for Wavelength Routed Networks Holmes," IEE (1995).
Holmes, M.J., "Matching Fibres for Low Loss Coupling Into Fibre Amplifiers," Electronics Letters (Dec. 6, 1990).
Chan, et al., "Miniature Information Display Systems," (Mar. 17, 2000).
Wang, Yalou et al., "Modelling for Optically Interconnected Packet Switches," SPIE, Terabit Optical Networking: Architecture, Control, and Management Issues, 44, (2000).
Wilkinson, T.D. et al., "New Applications for Ferroelectric Liquid Crystals," Liquid Crystals Today (Dec. 1994).
Holmes, M.J. et al., "New Guassian-Based Approximation for Modelling Non-Linear Effects in Optical Fibers," IEE, Journal of Lightwave Technology (Feb. 2, 1994).
Crossland, W.A. et al., "Nondisplay Applications of Liquid Crystals, Handbook of Liquid Crystals," Wiley (1998).
Holmes, Melanie et al., "Novel Fibre Design for Narrow-Band Symmetric Response Sidetap Filters with Suppressed Leaky Mode Resonance," (Sep. 30, 1999).
Chu, "Optical Beam-Steering Switches, Thesis," Kings College (Dec. 2001).
Wilkinson, et al., "Optical Comparator based on FLC LCOS tech," Cambridge University (2000).
Durrani, Khurram et al., "Optical Crosstalk accumulation in WDM Networks," IEE (1998).
Yu, T.C.B et al., "Optical Learning in a Smart Spatical Light Modulator," Cambridge (1994).
Williams, D.L. et al., Optical mode locking of an EDFL at 10GHz by using 20 m of highly nonlinear silica-base fiber OSA, OFC Technical Digest (1995).
Williams, D.L. et al., "Optical modelocking at 10GHz using a highly nonlinear germanosilicate optical fibre," Electronics Letters (Jul. 20, 1995).
Wilkinson, "Optical Routing with Liquid Crystal Arrays," SPIE (2001).
Crossland, W.A. et al., "Optically Transparent Switching in Telecommunications using Ferroelectric liquic crystals over silicon VLSI circuits," IEEE, LEOS (1996).
Holmes, M.J., "Optimisation of Refractive Index Profile for high gain Fibre Amplifiers," Electronics Letters (Oct. 25, 1990).
Holmes, "Optimization of DWM Demultiplexers," 1994.
Tooley, et al., "Optoelectronics Crossbar for Avionics Star," IEE (2000).
Krishnamoorthy, "Optoelectronic-VLSI; direct attachment of photonic devices to Silicon VLSI circuits," Lucent Technologies (Mar. 17, 2000).
Wilkinson et al., "Opto-RAM A device for high bit rate packet switching," OSA-SLM (1999).
Fracasso, "Performance assessment of a liquid crystal multichannel photonic space-switch," OSA (2001).
Holmes, Melanie et al., "Physical Properties of Optical Fiber Sidetap Grating Filters; Free-Space Model," IEEE Journal of Selected Topics in Quantum Electronics (1999).
Warr, Stephen et al., "Polarisation Insensitive Diffractive FLC Systems," OPA, Ferroelectrics (1996).
Chu, "Polarisation-induced beating in Spatial Light Modulator based Optical Switches," Kings College (2000).
Davey, A.B. et al., "Potential and Limitation of the Electroclinic Effect in Device Applications," Ferroelectrics, Gordon & Breach Science Publishers (1991).
O'Brien, D.C. et al., "Programmable Computer Generated Holograms with Large Space Bandwidth Product," Cambridge (1993).
Parker, M.C. et al., "Programmable Holographic Elements for WDM," IEE (1997).
Gourlay, J. et al., "Real-time binary phase holograms on a reflective ferroelectric liquid-crystal spatial light modulator," Applied Optics (1994).
Manolis, I. G., et al., "Reconfigurable Multi-level Holograms Phase Holograms for Optical Switches," IEEE Photonics Technology Letters (2002).
Parker, M.C. et al., "Reduced Wavelength-Count Vector Addressed Multi-Stage Access Network Based on Phased Array Optical Routers," CWC—Practical Applications of Coherent Sources (1998).
Durrani, et al., "Relaxed space switch crosstalk requirements: Crosstalk Requirements in the Presence of Laser Wavelength Referencing Error and Drift," OSA/OFC (2000).
Holmes, M.J. et al., "Sidetap Optical Fibre Grating Filters," OSA, Trends in Optics and Photonics (1996).
Georgiou et al., "Simulation of the Functionality of Liquid Crystal Phase Holograms for Application in Optical Telecommunication Networks," IEEE (2002).
Marques, A. et al., "Simultaneous encoding of amplitude apodizers and Fresnel lenses in spatial light modulators," SPIE, $4^{th}$ Iberoamerican Meeting on Optics (2001).
Fancey, et al., "Smart-Pixel based Free-Space Optoelectronic Interconnect to Demonstrate Terabit-s Regime IO to Silicon," CMOS IEE (2000).
Parker, M.C. et al., "Space-wavelength-routed ATM access architecture based on cascaded programmable arrayed-waveguide gratings," CLEO '98, Thursday Afternoon (1998).
Wilkinson, "Spatial light modulator designed for high-speed binary phase modulation," OSA-SLM (1999).
Cohen, A.D., "Spatial Light Modulator Technologies for WDM," Thesis, Pembroke College (1998).
Crossland, W.A., et al., "Spatial-Light-Modulator Based Routing Switches," Inst. Phys. Conf., IOP Publishing (1995).
Davey, R.P. et al., "Subpicosecond pulse generation from al.3mm DFB laser gain-switched at 1 GHz," Electronics Letters (Feb. 15, 1996).
Mears, Robert J. et al., "Telecommunications Applications of Ferroelectric Liquid-Crystal Smart Pixels," IEEE (1996).
Tan, Kim L. et al., "The Design and Fabrication of a Silicon Backplane Spatial Light Modulator for Silicon-transparent 1.5 mm IR Quarternary Operation," OECC '98, Technical Digest (1998).
White, H.J. et al., "The OCPM Demonstration System," OSA, Photonics in Switching (Mar. 15, 1995).
Holmes, M.J. et al., "Ultra Narrow-Band Optical Fibre Sidetap Filters," ECOC '98 (1998).
Davey, "Ultrashort pulse generation and processing at 1.3 mm for ultra high speed photonic," networks IEE (1999).
Rhee, et al., "Variable Passband Optical Add-Drop Multiplexer Using Wavelength Selective Switch," ECOC01 (2001).
Underwood, et al., "VLSI Design and Fabrication for Liquid Crystal on Silicon," IEE (2000).
Parker, M.C. et al., "Wavelength-Tolerant Optical Access Architectures Featuring N-Dimensional Addressing Cascaded Arrayed Waveguide Gratings," IEEE, Journal of Lightwave Technology (1998).
Mears, Robert J. et al., "WDM Channel Management Using Programmable Holographic Elements," IEE, Multiwavelength Optical Networks: Devices, Systems and Network Implementations (1998).

(56) References Cited

OTHER PUBLICATIONS

Durrani, et al., "WDM Network Modeling; Probability Analysis of Optical Crosstalk Accumulation and Network Performance Confidence Limits," JOLT (2000).
Parker, Michael C. et al., "Dynamic Digital Holographic Wavelength Filtering," IEEE, Journal of Lightwave Technology (1998).
Leyva, D. Gil, et al., "Free Space Optical Interconnect Using an FLC for Active Beam Steering and Wave Front Correction," Proceedings of SPIE, vol. 5453 (2004).
U.S. Appl. No. 60/311,002, filed Aug. 8, 2001, entitled "Dynamic Optical Filter Having an Array of Micromirrors," by James R. Dunphy, et al.
U.S. Appl. No. 60/281,079, filed Apr. 3, 2001, entitled "Reconfigurable Pixelated Optical Filter," by John A Moon, et al.
W.J. Tomlinson, et al., "Technologies and Architectures for Multiwavelength Optical Cross-Connects," *LEOS*, vol. 1, *IEEE*, pp. 53-54 (1995).
"Array," Chambers Science and Technology Dictionary, (1988).
"Wave Plate," *McGraw-Hill Dictionary of Scientific and Technical Terms, Fourth Edition*, (1989).
"Arbitrary," *Webster's New Universal Unabridged Dictionary*, Deluxe Second Edition, (1983).
Petition for *Inter Partes* Review of U.S. Patent No. 8,335,033, *Finisar Corporation, Petitioner* v. *Thomas Swan & Co. Ltd*, Patent Owner, in *Inter Partes* Review Case No. IPR2014-00465, consisting of 58 pages.
Petition for *Inter Partes* Review of U.S. Patent No. 7,664,395, *Finisar Corporation, Petitioner* v. *Thomas Swan & Co. Ltd*, Patent Owner, in *Inter Partes* Review Case No. IPR2014-00461, consisting of 64 pages.
Petition for *Inter Partes* Review of U.S. Patent No. 8,089,683, *Finisar Corporation, Petitioner* v. *Thomas Swan & Co. Ltd*, Patent Owner, in *Inter Partes* Review Case No. IPR2014-00462, consisting of 31 pages.
Petition for *Inter Partes* Review of U.S. Patent No. 7,145,710, *Finisar Corporation, Petitioner* v. *Thomas Swan & Co. Ltd*, Patent Owner, in *Inter Partes* Review Case No. IPR2014-00460, consisting of 65 pages.
Parker, M.C., et al., "Tunable Holographic Wavelength Filter," pp. 1-4, Cambridge University (1995), produced in *Thomas Swan & Co., Ltd.* v. *Finisar Corp. & Fujitsu Network Communications, Inc.*, No. 2: 13-cv-178 (*E.D. Texas*), Bates # Parker-TS_0000198—PARKER-TS_0000202, 5 pages.
"Polarisation Insensitive Continuous-Phase Modulation Using Ferroelectric Liquid Crystal," p. 1-2, (1995), produced in *Thomas Swan & Co., Ltd.* v. *Finisar Corp. & Fujitsu Network Communications, Inc.*, No. 2: 13-cv-178 (*E.D. Texas*), Bates # Parker-TS_0000227—Parker-TS_0000228, 2 pages.
Thompson, G.H.B., "Effect of Injected Carriers on Dielectric Constant of Semiconductor," *Physics of Semiconductor Laser Devices*, pp. 535-537 (1980), produced in *Thomas Swan & Co., Ltd.* v. *Finisar Corp. & Fujitsu Network Communications, Inc.*, No. 2: 13-cv-178 (*E.D. Texas*), Bates # Parker-TS_0000682—Parker-TS_0000683, 2 pages.
Zhang, L.M., et al., "Dynamic response of colliding-pulse mode-locked quantum-well lasers," *Quantum Electronics, IEEE Journal of*, vol. 31, No. 2, pp. 240, 243 (1995), produced in *Thomas Swan & Co., Ltd.* v. *Finisar Corp. & Fujitsu Network Communications, Inc.*, No. 2: 13-cv-178 (*E.D. Texas*), Bates # Parker-TS_0000684—Parker-TS_0000685, 2 pages.
Parker, M, "Optoelectronics Project Lent Term 1991 Report," *Sidney Sussex College, Cambridge*, consisting of 18 pages (1991), produced in *Thomas Swan & Co., Ltd.* v. *Finisar Corp. & Fujitsu Network Communications, Inc.*, No. 2: 13-cv-178 (*E.D. Texas*), Bates # Parker-TS_0000856 — Parker-TS_0000873, 18 pages.
Parker, "Binary-Phase Holograms as a Sum of Orthogonal Base Vectors," consisting of 19 pages (1993), produced in *Thomas Swan & Co., Ltd.* v. *Finisar Corp. & Fujitsu Network Communications, Inc.*, No. 2: 13-cv-178 (*E.D. Texas*), Bates # Parker-TS_0001510 — PARKER-TS_0001528, 19 pages.
Wilkinson, T.D., "Phase Modulation Using Spatial Light Modulators," pp. 1-7 (1993), produced in *Thomas Swan & Co., Ltd.* v. *Finisar Corp. & Fujitsu Network Communications, Inc.*, No. 2: 13- cv-178 (*E.D. Texas*), Bates # Parker-_0001389 — Parker-TS_0001395, 7 pages.
Parker, M., "Optical Switching in Telecommunications Networks," *Cambridge University*, consisting of 74 pages (1993), produced in *Thomas Swan & Co., Ltd.* v. *Finisar Corp. & Fujitsu Network Communications, Inc.*, No. 2:13-cv-178 (*E.D. Texas*), Bates # Parker-TS_0001420 — Parker-TS_0001493, 74 pages.
Slack, J. K., et al., "Multiplexing/Demultiplexing Architectures for WDM Optical Communications," Kings College, pp. 1-32 (1995), produced in *Thomas Swan & Co., Ltd.* v. *Finisar Corp. & Fujitsu Network Communications, Inc.*, No. 2: 13-cv-1 78 (*E.D. Texas*), Bates # Parker-TS_0001530 — Parker-TS_0001561, 32 pages.
Devaney, J., "Scientists Explore the Outer Limits," *Analyisis, FibreSystems Europe*, pp. 17-18 (2002), produced in *Thomas Swan & Co., Ltd.* v. *Finisar Corp. & Fujitsu Network Communications, Inc.*, No. 2: 13-cv- 178 (*E.D. Texas*), Bates # Parker-TS_0001806 — PARKER-TS_0001807, 2 pages.
Parker, M., "Optical Switching in Telecommunications Networks," $1^{st}$ Year PhD Report, Cambridge University Engineering Department, consisting of 8 pages (1993), produced in *Thomas Swan & Co., Ltd.* v. *Finisar Corp. & Fujitsu Network Communications, Inc.*, No. 2: 13-cv-178 (*E.D. Texas*), Bates # PARKER00005—PARKER00012, 8 pages.
Warr, S. T., et al., "Optically Transparent Wavelength Selective Switch," *In Confidence, Draft 2.2*, consisting of 11 pages (1994), produced in *Thomas Swan & Co., Ltd.* v. *Finisar Corp. & Fujitsu Network Communications, Inc.*, No. 2: 13-cv-178 (*E.D. Texas*), Bates # WARR00103—WARR00113, 11 pages.
Warr, S T., et al., "High Capacity Optical Hybrid Communication Switch," *In Confidence, Draft 2.2*, consisting of 14 pages (1994), produced in *Thomas Swan & Co., Ltd.* v. *Finisar Corp. & Fujitsu Network Communications, Inc.*, No. 2:13-cv-178 (*E.D. Texas*), Bates # WARR00693—WARR00706, 14 pages.
Wilkinson, T.D., et al., "Breaking Symmetry in the Binary Phase Only Matched Filter," *Optics Communications 115*, pp. 26-28 (1995), produced in *Thomas Swan & Co., Ltd.* v. *Finisar Corp. & Fujitsu Network Communications, Inc.*, No. 2: 13-cv-178 (*E.D. Texas*), Bates # WARR00780—WARR00785, 6 pages.
Corrected Petition for *Inter Partes* Review of U.S. Patent No. 8,089,683, *Fujitsu Network Communications, Inc., Petitioner* v. *Thomas Swan & Co. Ltd*, Patent Owner, in *Inter Partes* Review Case No. IPR2014-01382, consisting of 67 pages (Sep. 4, 2014).
Corrected Petition for *Inter Partes* Review of U.S. Patent No. 7,664,395, *Fujitsu Network Communications, Inc., Petitioner* v. *Thomas Swan & Co. Ltd*, Patent Owner, in *Inter Partes* Review Case No. IPR2014-01384, consisting of 57 pages (Sep. 4, 2014).
Corrected Petition for *Inter Partes* Review of U.S. Patent No. 7,145,710, *Fujitsu Network Communications, Inc., Petitioner* v. *Thomas Swan & Co. Ltd*, Patent Owner, in *Inter Partes* Review Case No. IPR2014-01383, consisting of 64 pages (Sep. 4, 2014).
Petition for *Inter Partes* Review of U.S. Patent No. 8,335,033, *Fujitsu Network Communications, Inc., Petitioner* v. *Thomas Swan & Co. Ltd*, Patent Owner, in *Inter Partes* Review Case No. Unassigned, consisting of 66 pages (Aug. 26, 2014).
Preliminary Response for U.S. Patent No. 8,089,683, *Finisar Corp., Petitioner* v. *Thomas Swan & Co. Ltd*, Patent Owner, in Case No. IPR2014-00462, consisting of 57 pages (Jun. 6, 2014).
Preliminary Response for U.S. Patent No. 7,664,395, *Finisar Corp., Petitioner* v. *Thomas Swan & Co. Ltd*, Patent Owner, in Case No. IPR2014-00461, consisting of 67 pages (Jun. 6, 2014).
Preliminary Response for U.S. Patent No. 7,145,710, *Finisar Corp., Petitioner* v. *Thomas Swan & Co. Ltd*, Patent Owner, in Case No. IPR2014-00460, consisting of 46 pages Jun. 9, 2014).
Preliminary Response for U.S. Patent No. 8,335,033, *Finisar Corp., Petitioner* v. *Thomas Swan & Co. Ltd*, Patent Owner, in Case No. IPR2014-00465, consisting of 66 pages (Jun. 6, 2014).
Decision for U.S. Patent No. 8,089,683 B2, *Finisar Corp., Petitioner* v. *Thomas Swan & Co. Ltd*, Patent Owner, in Case No. IPR2014-00462, consisting of 24 pages (Aug. 21, 2014).

(56) References Cited

OTHER PUBLICATIONS

Decision for U.S. Patent No. 7,664,395 B2, *Finisar Corp., Petitioner v. Thomas Swan & Co. Ltd*, Patent Owner, in Case No. IPR2014-00461, consisting of 36 pages (Aug. 21, 2014).
Decision for U.S. Patent No. 7,145,710 B2, *Finisar Corp., Petitioner v. Thomas Swan & Co. Ltd*, Patent Owner, in Case No. IPR2014-00460, consisting of 36 pages (Aug. 21, 2014).
Decision for U.S. Patent No. 8,335,033 B2, *Finisar Corp., Petitioner v. Thomas Swan & Co. Ltd*, Patent Owner, in Case No. IPR2014-00465, consisting of 30 pages (Aug. 21, 2014).
Drabik, T. J., "Optoelectronic Integrated Systems Based on Free-Space Interconnects with an Arbitrary Degree of Space Variance," *Proceedings of the IEEE*, vol. 82, No. 11, pp. 1595-1622 (1994).
Drabik, T. J., et al., "2D Silicon/Ferroelectric Liquid Crystal Spatial Light Modulators," *IEEE Micro*, vol. 15, No. 4, pp. 67-76, (1995).
Goodman, J. W., "Introduction to Fourier Optics," *Second Edition, McGraw-Hill* (1996).
Cotter, L. K, et al., "Ferroelectric-Liquid-Crystal/Silicon-Integrated Circuit Spatial Light Modulator," *Optics Letters*, vol. 15, No. 5, pp. 291-293, (1990.
Fouquet, J.E., et al, "A Compact Scalable Cross-Connect Switch Using Total Internal Reflection Due to Thermally-Generated Bubbles," in *Tech. Dig. IEEE LEOS Annual Meeting*, Orlando, FL, pp. 169-170 (1998).
A. Husain, "MEMS-Based Photonic Switching in Communications Networks," in *Tech. Dig. OSA Conference on Optical Fiber Communication*, pp. WX1-1-WX1-3 (2001).
H. Laor, "Construction and performance of a 576x576 single-stage OXC," in *Tech. Dig. LEOS '99* (vol. 2), pp. 481-482 (1999).
Lee, S.-S., "Surface-Micromachined Free-Space Fiber Optic Switches With Integrated Microactuators for Optical Fiber Communications Systems," in *Tech. Dig. 1997 International Conference on Solid-State Sensors and Actuators*, Chicago, pp. 85-88 (1997).
Lin, L.Y., "Free-Space Micromachined Optical Switches for Optical Networking," *IEEE Journal of Selected Topics In Quantum Electronics*, vol. 5, No. 1, pp. 4-9, (1999).
Makihara, M., et al., "Strictly Non-Blocking NxN Thermo-Capillarity Optical Matrix Switch using Silica-based Waveguide," in *Tech. Dig. OSA Conference on Optical Fiber Communication*, pp. TuM2-1-TuM2-4 (2000).
R. Ryf, "1296-port MEMS Transparent Optical Crossconnect with 2.07 Petabit/s Switch Capacity," in *Tech. Dig. OSA Conference on Optical Fiber Communication*, pp. PD28-1-D28-3 (2001).
G. Tricoles, "Computer Generated Holograms: an Historical Review," *Applied Optics*, vol. 26, No. 20, pp. 4351-4360, (1987).
Bengtsson, J., "Design of Fan-Out Kinoforms in the Entire Scalar Diffraction Regime with an Optical-Rotation-Angle Method," *Applied Optics*, vol. 36, No. 32, pp. 8435-8444, (1997).
Amako, J., et al., "Kinoform Using an Electrically Controlled Birefringent Liquid-Crystal Spatial Light Modulator," *Applied Optics*, vol. 30, No. 32, pp. 4622-4628, (1991).
"Why Use LCoS in a Wavelength Selective Switch?," [online] Retrieved from the Internet URL: http://www.finisar.com/blogs/lightspeed/why-use-lcos-in-a-wavelength-selective-switch/ [retrieved on Oct. 3, 2014].
Bahadur, B., "Liquid Crystals—Applications and Uses," *World Scientific*, vol. 3 (1996).
Palmer, "Diffraction Grating Handbook," $4^{th}$ *Edition* (2000).
Joint Claim Construction and Prehearing Statement, *Thomas Swan & Co., Ltd. v. Finisar Corp. & Fujitsu Network Communications, Inc.*, No. 2:13-cv-178 (*E.D. Texas*), filed Mar. 26, 2014.
Memorandum Opinion and Order, *Thomas Swan & Co. Ltd. v. Finisar Corp. & Fujitsu Network Communications, Inc.*, No. 2:13-cv-178 (*E.D. Texas*), Dkt. 157 (Jun. 25, 2014).
U.S. Appl. No. 09/860,289, filed Feb. 11, 2003, entitled "Electro-Optical Component Having a Reconfigurable Phase State," by William Alden Crossland, Timothy David Wilkinson, and Kamran Eshraghian.
Order of Dismissal with Prejudice, *Thomas Swan & Co. Ltd, Plaintiff v. Finisar Corp. and Fujitsu Network Communications, Inc.*, in Case No. 2: 13-cv-178-JRG, consisting of 2 pages (Oct. 30, 2014).
Judgment for Case IPR2014-01381 (U.S. Patent No. 8,335,033), Case IPR2014-01382 (U.S. Patent No. 8,089,683), Case IPR2014-01383 (U.S. Patent No. 7,145,710), Case IPR2014-01384 (U.S. Patent No. 7,664,395), *Fujitsu Network Communications, Inc., Petitioner v. Thomas Swan & Co. Ltd*, Patent Owner, consisting of 4 pages (Nov. 10, 2014).
Judgment for U.S. Patent No. 7,145,710 B2, *Finisar Corp., Petitioner v. Thomas Swan & Co. Ltd*, Patent Owner, in Case No. IPR2014-00460, consisting of 3 pages, Paper 20 (Nov. 3, 2014).
Judgment for U.S. Patent No. 7,664,395 B2, *Finisar Corp., Petitioner v. Thomas Swan & Co. Ltd*, Patent Owner, in Case No. IPR2014-00461, consisting of 3 pages, Paper 18 (Nov. 3, 2014).
Judgment for U.S. Patent No. 8,089,683 B2, *Finisar Corp., Petitioner v. Thomas Swan & Co. Ltd*, Patent Owner, in Case No. IPR2014-00462, consisting of 3 pages, Paper 18 (Nov. 3, 2014).
Judgment for U.S. Patent No. 8,335,033 B2, *Finisar Corp., Petitioner v. Thomas Swan & Co. Ltd*, Patent Owner, in Case No. IPR2014-00465, consisting of 3 pages, Paper 18 (Nov. 3, 2014).

\* cited by examiner

OPTICAL PROCESSING

RELATED APPLICATIONS

This application is a continuation of U.S. application Ser. No. 12/710,913, filed Feb. 23, 2010, which is a continuation of U.S. application Ser. No. 11/978,258, filed Oct. 29, 2007, now U.S. Pat. No. 8,089,683, which is a continuation of U.S. application Ser. No. 11/515,389, filed Sep. 1, 2006, now U.S. Pat. No. 7,612,930, which is a divisional of U.S. application Ser. No. 10/487,810, filed Sep. 2, 2002, now U.S. Pat. No. 7,145,710, which is the U.S. National Stage of International Application No. PCT/GB02/04011, filed Sep. 2, 2002, and published in English. This application claims priority under 35 U.S.C. §119 or 365 to Great Britain Application No. 0121308.1, filed Sep. 3, 2001. The entire teachings of the above applications are incorporated herein by reference.

FIELD OF THE INVENTION

The present invention relates to an optical device and to a method of controlling an optical device.

More particularly but not exclusively the invention relates to the general field of controlling one or more light beams by the use of electronically controlled devices. The field of application is mainly envisaged as being to fields in which reconfiguration between inputs and outputs is likely, and stability of performance is a significant requirement.

BACKGROUND OF THE INVENTION

It has previously been proposed to use so-called spatial light modulators to control the routing of light beams within an optical system, for instance from selected ones of a number of input optical fibres to selected ones of output fibres.

Optical systems are subject to performance impairments resulting from aberrations, phase distortions and component misalignment. An example is a multiway fibre connector, which although conceptually simple can often be a critical source of system failure or insertion loss due to the very tight alignment tolerances for optical fibres, especially for single-mode optical fibres. Every time a fibre connector is connected, it may provide a different alignment error. Another example is an optical switch in which aberrations, phase distortions and component misalignments result in poor optical coupling efficiency into the intended output optical fibres. This in turn may lead to high insertion loss. The aberrated propagating waves may diffract into intensity fluctuations creating significant unwanted coupling of light into other output optical fibres, leading to levels of crosstalk that impede operation. In some cases, particularly where long path lengths are involved, the component misalignment may occur due to ageing or temperature effects.

Some prior systems seek to meet such problems by use of expensive components. For example in a communications context, known free-space wavelength multiplexers and demultiplexers use expensive thermally stable opto-mechanics to cope with the problems associated with long path lengths.

Certain optical systems have a requirement for reconfigurability. Such reconfigurable systems include optical switches, add/drop multiplexers and other optical routing systems where the mapping of signals from input ports to output ports is dynamic. In such systems the path-dependent losses, aberrations and phase distortions encountered by optical beams may vary from beam to beam according to the route taken by the beam through the system. Therefore the path-dependent loss, aberrations and phase distortions may vary for each input beam or as a function of the required output port.

The prior art does not adequately address this situation.

Other optical systems are static in terms of input/output configuration. In such systems, effects such as assembly errors, manufacturing tolerances in the optics and also changes in the system behaviour due to temperature and ageing, create the desirability for dynamic direction control, aberration correction, phase distortion compensation or misalignment compensation.

It should be noted that the features of dynamic direction control, phase distortion compensation and misalignment control are not restricted to systems using input beams coming from optical fibres. Such features may also be advantageous in a reconfigurable optical system. Another static system in which dynamic control of phase distortion, direction and (relative) misalignment would be advantageous is one in which the quality and/or position of the input beams is time-varying.

Often the input and output beams for optical systems contain a multiplex of many optical signals at different wavelengths, and these signals may need to be separated and adaptively and individually processed inside the system. Sometimes, although the net aim of a system is not to separate optical signals according to their wavelength and then treat them separately, to do so increases the wavelength range of the system as a whole. Where this separation is effected, it is often advantageous for the device used to route each channel to have a low insertion loss and to operate quickly.

It is an aim of some aspects of the present invention at least partly to mitigate difficulties of the prior art.

It is desirable for certain applications that a method or device for addressing these issues should be polarisation-independent, or have low polarisation-dependence.

SLMs have been proposed for use as adaptive optical components in the field of astronomical devices, for example as wavefront correctors. In this field of activity, the constraints are different to the present field—for example in communication and like devices, the need for consistent performance is paramount if data is to be passed without errors. Communication and like devices are desirably inexpensive, and desirably inhabit and successfully operate in environments that are not closely controlled. By contrast, astronomical devices may be used in conditions more akin to laboratory conditions, and cost constraints are less pressing. Astronomical devices are unlikely to need to select successive routings of light within a system, and variations in performance may be acceptable.

SUMMARY OF THE INVENTION

According to a first aspect of the invention, there is provided a method of operating an optical device comprising an SLM having a two-dimensional array of controllable phase-modulating elements, the method comprising delineating groups of individual phase-modulating elements;

selecting, from stored control data, control data for each group of phase-modulating elements;

generating from the respective selected control data a respective hologram at each group of phase-modulating elements; and varying the delineation of the groups and/or the selection of control data whereby upon illumination of said groups by respective light beams, respective emergent light beams from the groups are controllable independently of each other.

In some embodiments, the variation of the delineation and/or control data selection is in response to a signal or signals indicating a non-optimal performance of the device. In other embodiments, the variation is performed during a set up or training phase of the device. In yet other embodiments, the variation is in response to an operating signal, for example a signal giving the result of sensing non-performance system parameters such as temperature.

An advantage of the method of this aspect of the invention is that stable operation can be achieved in the presence of effects such as ageing, temperature, component, change of path through the system and assembly tolerances.

Preferably, control of said light beams is selected from the group comprising: control of direction, control of power, focussing, aberration compensation, sampling and beam shaping.

Clearly in most situations more than one of these control types will be needed—for example in a routing device (such as a switch, filter or add/drop multiplexer) primary changes of direction are likely to be needed to cope with changes of routing as part of the main system but secondary correction will be needed to cope with effects such as temperature and ageing. Additionally, such systems may also need to control power, and to allow sampling (both of which may in some cases be achieved by direction changes).

Advantageously, each phase modulating element is responsive to a respective applied voltage to provide a corresponding phase shift to emergent light, and the method further comprises;

controlling said phase-modulating elements of the spatial light modulator to provide respective actual holograms derived from the respective generated holograms, wherein the controlling step comprises;

resolving the respective generated holograms modulo 2pi.

The preferred SLM uses a liquid crystal material to provide phase shift and the liquid crystal material is not capable of large phase shifts beyond plus or minus $2\pi$. Some liquid crystal materials can only provide a smaller range of phase shifts, and if such materials are used, the resolution of the generated hologram is correspondingly smaller.

Preferably the method comprises:

providing a discrete number of voltages available for application to each phase modulating element;

on the basis of the respective generated holograms, determining the desired level of phase modulation at a predetermined point on each phase modulating element and choosing for each phase modulating element the available voltage which corresponds most closely to the desired level.

Where a digital control device is used, the resolution of the digital signal does not provide a continuous spectrum of available voltages. One way of coping with this is to determine the desired modulation for each pixel and to choose the individual voltage which will provide the closest modulation to the desired level.

In another embodiment, the method comprises:

providing a discrete number of voltages available for application to each phase modulating element;

determining a subset of the available voltages which provides the best fit to the generated hologram.

Another technique is to look at the pixels of the group as a whole and to select from the available voltages those that give rise to the nearest phase modulation across the whole group.

Advantageously, the method further comprises the step of storing said control data wherein the step of storing said control data comprises calculating an initial hologram using a desired direction change of a beam of light, applying said initial hologram to a group of phase modulating elements, and correcting the initial hologram to obtain an improved result.

The method may further comprise the step of providing sensors for detecting temperature change, and performing said varying step in response to the outputs of those sensors.

The SLM may be integrated on a substrate and have an integral quarter-wave plate whereby it is substantially polarisation insensitive.

Preferably the phase-modulating elements are substantially reflective, whereby emergent beams are deflected from the specular reflection direction.

In some aspects, for at least one said group of pixels, the method comprises providing control data indicative of two holograms to be displayed by said group and generating a combined hologram before said resolving step.

According to a second aspect of the invention, there is provided an optical device comprising an SLM and a control circuit, the SLM having a two-dimensional array of controllable phase-modulating elements and the control circuit having a store constructed and arranged to hold plural items of control data, the control circuit being constructed and arranged to delineate groups of individual phase-modulating elements, to select, from stored control data, control data for each group of phase-modulating elements, and to generate from the respective selected control data a respective hologram at each group of phase-modulating elements, wherein the control circuit is further constructed and arranged, to vary the delineation of the groups and/or the selection of control data whereby upon illumination of said groups by respective light beams, respective emergent light beams from the groups are controllable independently of each other.

An advantage of the device of this aspect of the invention is that stable operation can be achieved in the presence of effects such as ageing, temperature, component and assembly tolerances. Embodiments of the device can handle many light beams simultaneously. Embodiments can be wholly reconfigurable, for example compensating differently for a number of routing configurations.

Preferably, the optical device has sensor devices arranged to detect light emergent from the SLM, the control circuit being responsive to signals from the sensors to vary said delineation and/or said selection.

In some embodiments, the optical device has temperature responsive devices constructed and arranged to feed signals indicative of device temperature to said control circuit, whereby said delineation and/or selection is varied.

In another aspect, the invention provides an optical routing device having at least first and second SLMs and a control circuit, the first SLM being disposed to receive respective light beams from an input fibre array, and the second SLM being disposed to receive emergent light from the first SLM and to provide light to an output fibre array, the first and second SLMs each having a respective two-dimensional array of controllable phase-modulating elements and the control circuit having a store constructed and arranged to hold plural items of control data, the control circuit being constructed and arranged to delineate groups of individual phase-modulating elements, to select, from stored control data, control data for each group of phase-modulating elements, and to generate from the respective selected control data a respective hologram at each group of phase-modulating elements, wherein the control circuit is further constructed and arranged, to vary the delineation of the groups and/or the selection of control data whereby upon illumination of said groups by respective light beams, respective emergent light beams from the groups are controllable independently of each other.

In a further aspect, the invention provides a device for shaping one or more light beams in which the or each light beam is incident upon a respective group of pixels of a two-dimensional SLM, and the pixels of the or each respective group are controlled so that the corresponding beams emerging from the SLM are shaped as required.

According to a further aspect of the invention there is provided an optical device comprising one or more optical inputs at respective locations, a diffraction grating constructed and arranged to receive light from the or each optical input, a focussing device and a continuous array of phase modulating elements, the diffraction grating and the array of phase modulating elements being disposed in the focal plane of the focussing device whereby diverging light from a single point on the diffraction grating passes via the focussing device to form beams at the array of phase modulating elements, the device further comprising one or more optical output at respective locations spatially separate from the or each optical input, whereby the diffraction grating is constructed and arranged to output light to the or each optical output.

This device allows multiwavelength input light to be distributed in wavelength terms across different groups of phase-modulating elements. This allows different processing effects to be applied to any desired part or parts of the spectrum.

According to a still further aspect of the invention there is provided a method of filtering light comprising applying a beam of said light to a diffraction grating whereby emerging light from the grating is angularly dispersed by wavelength, forming respective beams from said emerging light by passing the emerging light to a focussing device having the grating at its focal plane, passing the respective beams to an SLM at the focal plane of the focussing device, the SLM having a two-dimensional array of controllable phase-modulating elements, selectively reflecting light from different locations of said SLM and passing said reflected light to said focussing element and then to said grating.

Preferably the method comprises delineating groups of individual phase-modulating elements to receive beams of light of differing wavelength;

selecting, from stored control data, control data for each group of phase-modulating elements;

generating from the respective selected control data a respective hologram at each group of phase-modulating elements; and varying the delineation of the groups and/or the selection of control data.

According to a still further aspect of the invention there is provided an optical add/drop multiplexer having a reflective SLM having a two-dimensional array of controllable phase-modulating elements, a diffraction device and a focussing device wherein light beams from a common point on the diffraction device are mutually parallel when incident upon the SLM, and wherein the SLM displays respective holograms at locations of incidence of light to provide emergent beams whose direction deviates from the direction of specular reflection.

In a yet further aspect, the invention provides a test or monitoring device comprising an SLM having a two-dimensional array of pixels, and operable to cause incident light to emerge in a direction deviating from the specular direction, the device having light sensors at predetermined locations arranged to provide signals indicative of said emerging light.

The test or monitoring device may further comprise further sensors arranged to provide signals indicative of light emerging in the specular directions.

Yet a further aspect of the invention relates to a power control device for one or more beams of lights in which the said beams are incident on respective groups of pixels of a two-dimensional SLM, and holograms are applied to the respective group so that the emergent beams have power reduced by comparison to the respective incident beams.

The invention further relates to an optical routing module having at least one input and at least two outputs and operable to select between the outputs, the module comprising a two dimensional SLM having an array of pixels, with circuitry constructed and arranged to display holograms on the pixels to route beams of different frequency to respective outputs.

According to a later aspect of the invention there is provided an optoelectronic device comprising an integrated multiple phase spatial light modulator (SLM) having a plurality of pixels, wherein each pixel can phase modulate light by a phase shift having an upper and a lower limit, and wherein each pixel has an input and is responsive to a value at said input to provide a phase modulation determined by said value, and a controller for the SLM, wherein the controller has a control input receiving data indicative of a desired phase modulation characteristic across an array of said pixels for achieving a desired control of light incident on said array, the controller has outputs to each pixel, each output being capable of assuming only a discrete number of possible values, and the controller comprises a processor constructed and arranged to derive, from said desired phase modulation characteristic, a non-monotonic phase modulation not extending outside said upper and lower limits, and a switch constructed and arranged to select between the possible values to provide a respective one value at each output whereby the SLM provides said non-monotonic phase modulation.

Some or all of the circuitry may be on-chip leading to built-in intelligence. This leads to more compact and ultimately low-cost devices. In some embodiments, some or all on-chip circuitry may operate in parallel for each pixel which may provide huge time advantages; in any event the avoidance of the need to transfer data off chip and thereafter to read in to a computer allows configuration and reconfiguration to be faster.

According to another aspect of the invention there is provided a method of controlling a light beam using a spatial light modulator (SLM) having an array of pixels, the method comprising:

determining a desired phase modulation characteristic across a sub-array of said pixels for achieving the desired control of said beam;

controlling said pixels to provide a phase modulation derived from the desired phase modulation, wherein the controlling step comprises providing a population of available phase modulation levels for each pixel, said population comprising a discrete number of said phase modulation levels;

on the basis of the desired phase modulation, a level selecting step of selecting for each pixel a respective one of said phase modulation levels; and causing each said pixel to provide the respective one of said phase modulation levels.

The SLM may be a multiple phase liquid crystal over silicon spatial light modulator having plural pixels, of a type having an integrated wave plate and a reflective element, such that successive passes of a beam through the liquid crystal subject each orthogonally polarised component to a substantially similar electrically-set phase change.

If a non-integrated wave plate is used instead, a beam after reflection and passage through the external wave plate will not pass through the same zone of the SLM, unless it is following the input path, in which case the zero order component of said beam will re-enter the input fibre.

The use of the wave plate and the successive pass architecture allows the SLM to be substantially polarisation independent.

In one embodiment the desired phase modulation at least includes a linear component.

Linear phase modulation, or an approximation to linear phase modulation may be used to route a beam of light, i.e. to select a new direction of propagation for the beam. In many routing applications, two SLMs are used in series, and the displayed information on the one has the inverse effect to the information displayed on the other. Since the information represents phase change data, it may be regarded as a hologram. Hence an output SLM may display a hologram that is the inverse of that displayed on the input SLM. Routing may also be "one-to-many" (i.e. multicasting) or "one-to-all" (i.e. broadcasting) rather than the more usual one-to-one in many routing devices. This may be achieved by correct selection of the relevant holograms.

Preferably the linear modulation is resolved modulo 2pi to provide a periodic ramp.

In another embodiment the desired phase modulation includes a non-linear component.

Preferably the method further comprises selecting, from said array of pixels, a sub-array of pixels for incidence by said light beam.

The size of a selected sub-array may vary from switch to switch according to the physical size of the switch and of the pixels. However, a typical routing device may have pixel arrays of between 100*100 and 200*200, and other devices such as add/drop multiplexers may have arrays of between 10*10 and 50*50. Square arrays are not essential.

In one embodiment the level-selecting step comprises determining the desired level of phase modulation at a pre-determined point on each pixel and choosing for each pixel, the available level which corresponds most closely to the desired level.

In another embodiment, the level-selecting step comprises determining a subset of the available levels, which provides the best fit to the desired characteristic.

The subset may comprise a subset of possible levels for each pixel.

Alternatively the subset may comprise a set of level distributions, each having a particular level for each pixel.

In one embodiment, the causing step includes providing a respective voltage to an electrode of each pixel, wherein said electrode extends across substantially the whole of the pixel.

Preferably again the level selecting step comprises selecting the level by a modulo 2pi comparison with the desired phase modulation. The actual phase excursion may be from A to A+2π where A is an arbitrary angle.

Preferably the step of determining the desired phase modulation comprises calculating a direction change of a beam of light.

Conveniently, after the step of calculating a direction change, the step of determining the desired phase modulation further comprises correcting the phase modulation obtained from the calculating step to obtain an improved result.

Advantageously, the correction step is retroactive.

In another embodiment the step of determining the desired phase modulation is retroactive, whereby parameters of the phase modulation are varied in response to a sensed error to reduce the error.

A first class of embodiments relates to the simulation/synthesis of generally corrective elements. In some members of the first class, the method of the invention is performed to provide a device, referred to hereinafter as an accommodation element for altering the focus of the light beam.

An example of an accommodation element is a lens. An accommodation element may also be an anti-astigmatic device, for instance comprising the superposition of two cylindrical lenses at arbitrary orientations.

In other members of the first class, the method of the invention is performed to provide an aberration correction device for correcting greater than quadratic aberrations.

The sub-array selecting step may assign a sub-array of pixels to a beam based on the predicted path of the beam as it approaches the SLM just prior to incidence.

Advantageously, after the sub-array is assigned using the predicted path, it is determined whether the assignment is correct, and if not a different sub-array is assigned.

The assignment may need to be varied in the event of temperature, ageing or other physical changes. The sub-array selection is limited in resolution only by the pixel size. By contrast other array devices such as MEMS have fixed physical edges to their beam steering elements.

An element of this type may be used in a routing device to compensate for aberrations, phase distortions and component misalignment in the system. By providing sensing devices a controller may be used to retroactively control the element and the element may maintain an optimum performance of the system.

In one embodiment of this first class, the method includes both causing the SLM to route a beam and causing the SLM to emulate a corrective element to correct for errors, whereby the SLM receives a discrete approximation of the combination of both a linear phase modulation applied to it to route the beam and a non-linear phase modulation for said corrections.

Synthesising a lens using an SLM can be used to change the position of the beam focused spot and therefore correct for a position error or manufacturing tolerance in one or more other lenses or reflective (as opposed to transmissive) optical elements such as a curved mirror.

The method of the invention may be used to correct for aberrations such as field curvature in which the output 'plane' of the image(s) from an optical system is curved, rather than flat.

In another embodiment of the first class, intelligence may be integrated with sensors that detect the temperature changes and apply data from a look-up table to apply corrections.

In yet another embodiment of this class, misalignment and focus errors are detected by measuring the power coupled into strategically placed sensing devices, such as photodiode arrays, monitor fibres or a wavefront sensor. Compensating holograms are formed as a result of the discrete approximations of the non-linear modulation. Changes or adjustments may then be made to these holograms, for example by applying a stimulus and then correcting the holograms according to the sensed response until the system alignment is measured to be optimised.

In embodiments where the method provides routing functions by approximated linear modulation, adaptation of non-linear modulation due to changes in the path taken through the system desirably takes place on a timescale equivalent to that required to change the hologram routing, i.e. of the order of milliseconds.

A control algorithm may use one or more of several types of compensation.

In one embodiment a look-up table is used with pre-calculated 'expected' values of the compensation taking account of the different routes through the system.

In another embodiment the system is trained before first being operated, by repeated changes of, or adjustments to, the compensating holograms to learn how the system is misaligned.

A further embodiment employs intelligence attached to the monitor fibres for monitoring and calculation of how these compensating holograms should adapt with time to accommodate changes in the system alignment. This is achieved in some embodiments by integrating circuitry components into the silicon backplane of the SLM.

In many optical systems there is a need to control and adapt the power or shape of an optical beam as well as its direction or route through the optical system. In communications applications, power control is required for network management reasons. In general, optical systems require the levelling out or compensation for path and wavelength-dependent losses inside the optical system. It is usually desirable that power control should not introduce or accentuate other performance impairments.

Thus in a second class of embodiments, the modulation applied is modified for controlling the attenuation of an optical channel subjected to the SLM.

In one particular embodiment, the ideal value of phase modulation is calculated for every pixel, and then multiplied by a coefficient having a value between 0 and 1, selected according to the desired attenuation and the result is compared to the closest available phase level to provide the value applied to the pixels.

In another embodiment, the method further comprises selecting by a discrete approximation to a linear phase modulation, a routing hologram for display by the SLM whereby the beams may be correctly routed; selecting by a discrete approximation to a non-linear phase modulation, a further hologram for separating each beam into main and subsidiary beams, wherein the main beam is routed through the system and the or each subsidiary beam is diffracted out of the system; combining the routing and further holograms together to provide a resultant hologram; and causing the SLM to provide the resultant hologram.

The non-linear phase modulation may be oscillatory.

In yet another embodiment, the method further comprises selecting by a discrete approximation to a linear phase modulation, a routing hologram for display by the SLM whereby the beams may be correctly routed; selecting by a discrete approximation to a non-linear phase modulation, a further hologram for separating each beam into main and subsidiary beams, wherein the main beam is routed through the system and at least one subsidiary beam is incident on an output at an angle such that its contribution is insignificant; combining the routing and further holograms together to provide resultant hologram; and causing the SLM to display the resultant hologram.

The non-linear phase modulation may be oscillatory.

In a closely allied class of embodiments, light may be selectively routed to a sensor device for monitoring the light in the system. The technique used may be a power control technique in which light diverted from the beam transmitted through the system to reduce its magnitude is made incident on the sensor device.

In another class of embodiments, a non-linear phase modulation profile is selected to provide beam shaping, for example so as to reduce cross-talk effects due to width clipping. This may use a pseudo amplitude modulation technique.

In a further class of embodiments, the method uses a non-linear modulation profile chosen to provide wavelength dependent effects.

The light may be at a telecommunications wavelength, for example 850 nm, 1300 nm or in the range 1530 nm to 1620 nm.

BRIEF DESCRIPTION OF THE DRAWINGS

Exemplary embodiments of the invention will now be described with reference to the accompanying drawings in which.

DETAILED DESCRIPTION OF THE PREFERRED EMBODIMENTS

Many of the embodiments of the invention centre upon the realisation that the problems of the prior art can be solved by using a reflective SLM having a two-dimensional array of phase-modulating elements that is large in number, and applying a number of light beams to groups of those phase-modulating elements. A significant feature of these embodiments is the fact that the size, shape and position of those groups need not be fixed and can, if need be, be varied. The groups may display holograms which can be set up as required to deflect the light so as to provide a non-specular reflection at a controllable angle to the specular reflection direction. The holograms may additionally or alternatively provide shaping of the beam.

The SLM may thus simulate a set of highly flexible mirrors, one for each beam of light. The size, shape and position of each mirror can be changed, as can the deflection and the simulated degree of curvature.

Devices embodying the invention act on light beams incident on the device to provide emerging light beams which are controlled independently of one another. Possible types of control include control of direction, control of power, focussing, aberration compensation, sampling and beam shaping.

The structure and arrangement of polarisation-independent multiple phase liquid crystal over silicon spatial light modulators (SLMs) for routing light beams using holograms are discussed in our co-pending patent application PCT/GB00/03796. Such devices have an insertion loss penalty due to the dead-space between the pixels. As discussed in our co-pending patent application GB0107742.9, the insertion loss may be reduced significantly by using a reflecting layer inside the substrate positioned so as to reflect the light passing between the pixels back out again.

Figure 1:
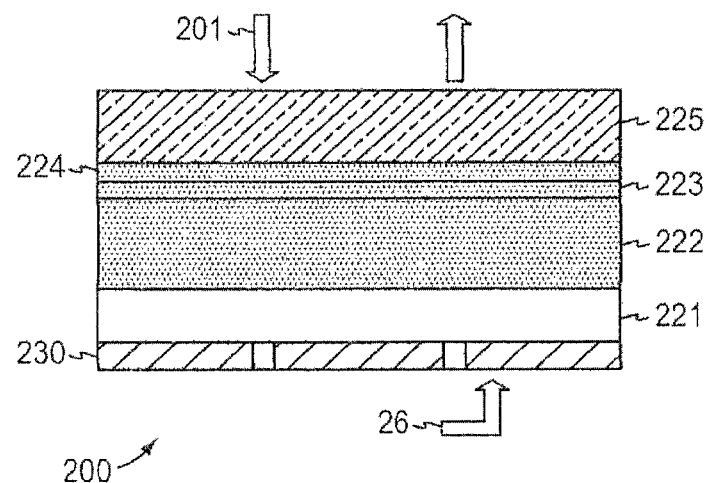
FIG. 1 shows a cross-sectional view through an exemplary SLM suitable for use in the invention.

Referring to FIG. 1, an integrated SLM 200 for modulating light 201 of a selected wavelength, e.g. 1.5 µm, consists of a pixel electrode array 230 formed of reflective aluminum. The pixel electrode array 230, as will later be described acts as a mirror, and disposed on it is a quarter-wave plate 221. A liquid crystal layer 222 is disposed on the quarter-wave plate 221 via an alignment layer (not shown) as is known to those skilled in the art of liquid crystal structures. Over (as shown) the liquid crystal layer 222 are disposed in order a second alignment layer 223, a common ITO electrode layer 224 and an upper glass layer 225. The common electrode layer 224 defines an electrode plane. The pixel electrode array 230 is disposed parallel to the common electrode plane 224. It will be understood that alignment layers and other intermediate layers will be provided as usual. They are omitted in FIG. 1 for clarity.

The liquid crystal layer 222 has its material aligned such that under the action of a varying voltage between a pixel electrode 230 and the common electrode 224, the uniaxial axis changes its tilt direction in a plane normal to the electrode plane 224.

The quarter wave plate 221 is disposed such that light polarised in the plane of tilt of the director is reflected back by the mirror 230 through the SLM with its plane of polarisation perpendicular to the plane of tilt, and vice-versa.

Circuitry, not shown, connects to the pixel electrodes 230 so that different selected voltages are applied between respective pixel electrodes 230 and the common electrode layer 224.

Considering an arbitrary light beam 201 passing through a given pixel, to which a determined potential difference is applied, thus resulting in a selected phase modulation due to the liquid crystal layer over the pixel electrode 230. Consider first and second orthogonal polarisation components, of arbitrary amplitudes, having directions in the plane of tilt of the director and perpendicular to this plane, respectively. These directions bisect the angles between the fast and slow axes of the quarter-wave plate 221.

The first component experiences the selected phase change on the inward pass of the beam towards the aluminium layer 230, which acts as a mirror. The second component experiences a fixed, non-voltage dependent phase change However, the quarter-wave plate 221 in the path causes polarisation rotation of the first and second components by 90 degrees so that the second polarisation component of the light beam is presented to the liquid crystal for being subjected to the selected phase change on the outward pass of the beam away from the mirror layer 230. The first polarisation component experiences the fixed, non-voltage dependent phase change on the outward pass of the beam. Thus, both of the components experience the same overall phase change contribution after one complete pass through the device, the total contribution being the sum of the fixed, non-voltage dependent phase and the selected voltage dependent phase change.

It is not intended that any particular SLM structure is essential to the invention, the above being only exemplary and illustrative. The invention may be applied to other devices, provided they are capable of multiphase operation and are at least somewhat polarisation independent at the wavelengths of concern. Other SLMs are to be found in our co-pending applications WO01/25840, EP1050775 and EP1053501 as well as elsewhere in the art.

Where liquid crystal materials other than ferroelectric are used, current practice indicates that the use of an integral quarter wave plate contributes to the usability of multiphase, polarisation-independent SLMs.

A particularly advantageous SLM uses a liquid crystal layer configured as a pi cell.

Figure 2:
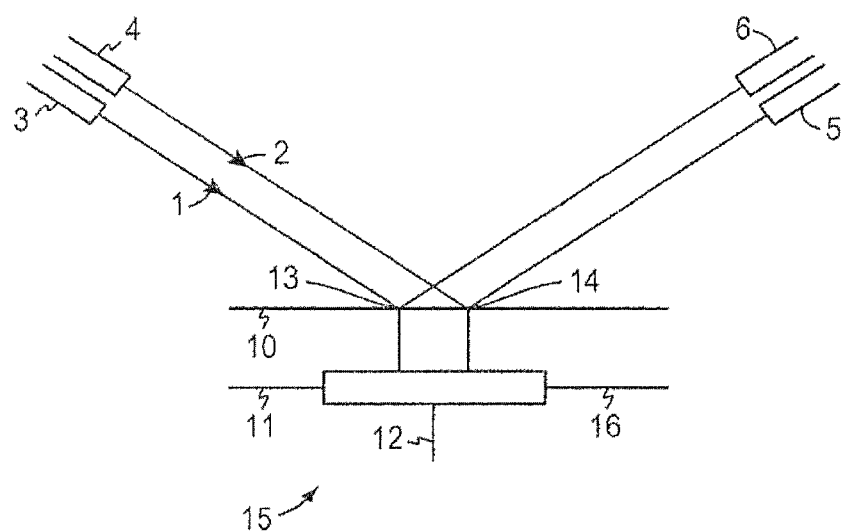
FIG. 2 shows a sketch of a routing device in which a routing SLM is used additionally to provide correction for performance impairment due to misalignment.

Referring to FIG. 2, an integrated SLM 10 has processing circuitry 11 having a first control input 12 for routing first and second beams 1,2 from input fibres 3,4 to output fibres 5,6 in a routing device 15. The processing circuitry 11 includes a store holding control data which is processed to generate holograms which are applied to the SLM 10 for control of light incident upon the SLM 10. The control data are selected in dependence upon the data at the control input 12, and may be stored in a number of ways, including compressed formats. The processing circuitry 11, which may be at least in part on-chip, is also shown as having an additional input 16 for modifying the holograms. This input 16 may be a physical input, or may be a "soft" input—for example data in a particular time slot.

The first beam 1 is incident on, and processed by a first array, or block 13 of pixels, and the second beam 2 is incident on and processed by a second array, or block 14 of pixels. The two blocks of pixels 13,14 are shown as contiguous. In some embodiments they might however be separated from one another by pixels that allow for misalignment.

Where the SLM is used for routing the beams 1,2 of light, this is achieved by displaying a linearly changing phase ramp in at least one direction across the blocks or arrays 13,14. The processing circuitry 11 determines the parameters of the ramp depending on the required angle of deflection of the beam 1,2. Typically the processing circuitry 11 stores data in a look-up table, or has access to a store of such data, to enable the required ramp to be created in response to the input data or command at the first control input 12. The angle of deflection is probably a two dimensional angle where the plane common to the direction of the incident light and that of the reflected light is not orthogonal to the SLM.

Assigning x and y co-ordinates to the elements of the SLM, the required amount of angular shift from the specular reflection direction may be resolved into the x and y directions. Then, the required phase ramp for the components is calculated using standard diffraction theory, as a "desired phase characteristic".

This process is typically carried out in a training stage, to provide the stored data in the look-up table.

Having established a desired phase modulation characteristic across the array so as to achieve the desired control of said beam the processing circuitry 11 transforms this characteristic into one that can be displayed by the pixels 13,14 of the SLM 10. Firstly it should be borne in mind that the processing circuitry 11 controlling the pixels of an SLM 10 is normally digital. Thus there is only a discrete population of values of phase modulation for each pixel, depending on the number of bits used to represent those states.

To allow the pixels 13,14 of the SLM 11 to display a suitable phase profile, the processing circuitry 11 carries out a level selecting operation for each pixel. As will be appreciated, the ability of the SLM to phase modulate has limits due to the liquid crystal material, and hence a phase ramp that extends beyond these limits is not possible. To allow for the physical device to provide the effects of the ideal device (having a continuously variable limitless phase modulation ability), the desired phase ramp may be transformed into a non-monotonic variation having maxima and minima within the capability limits of the SLM 10. In one example of this operation, the desired phase modulation is expressed modulo 2pi across the array extent, and the value of the desired modulo-2pi modulation is established at the centre of each pixel. Then for each pixel, the available level nearest the desired modulation is ascertained and used to provide the actual pixel voltage. This voltage is applied to the pixel electrode for the pixel of concern.

For small pixels there may be edge effects due to fringing fields between the pixels and the correlations between the director directions in adjacent pixels. In such systems the available phase level nearest to the value of the desired modulo-2pi modulation at the centre of each pixel (as described above) should be used as a first approximation. A recursive algorithm is used to calculate the relevant system performance characteristic taking into account these 'edge' effects and to change the applied level in order to improve the system performance to the required level.

"Linear" means that the value of phase across an array of pixels varies linearly with distance from an arbitrary origin, and includes limited linear changes, where upon reaching a maximum phase change at the end of a linear portion, the phase change reverts to a minimum value before again rising linearly.

The additional input 16 causes the processing circuitry 11 to modify the holograms displayed by applying a discrete approximation of a non-linear phase modulation so that the SLM 10 synthesises a corrective optical element such as a lens or an aberration corrector. As will be later described, embodiments may also provide power control (attenuation), sampling and beam shaping by use of the non-linear phase modulation profile. "Non-linear" is intended to signify that the desired phase profile across an array of pixels varies with distance from an arbitrary origin in a curved and/or oscillatory or like manner that is not a linear function of distance. It is not intended that "non-linear" refer to sawtooth or like profiles formed by a succession of linear segments of the same slope mutually separated by "flyback" segments.

The hologram pattern associated with any general non-linear phase modulation $\exp j\phi(u) = \exp j(\phi_0(u) + \phi_1(u) + \phi_3(u) \ldots)$ where j is the complex operator, can be considered as a product. In this product, the first hologram term in the product $\exp j \phi_0(u)$ implements the routing while the second hologram term $\exp j \phi_1(u)$ implements a corrective function providing for example lens simulation and/or aberration correction. The third hologram term $\exp j \phi_2(u)$ implements a signal processing function such as sampling and/or attenuation and/or beam shaping. The routing function is implemented as a linear phase modulation while the corrective function includes non-linear terms and the signal processing function includes non-linear oscillatory terms.

Different methods of implementing the combination of these three terms are possible. In one embodiment the total required phase modulation $\phi_0(u) + \phi_1(u) + \phi_2(u)$ including linear routing and corrective function and the signal processing function is resolved modulo 2pi and approximated to the nearest available phase level before application by the pixels. In another embodiment the summation of the phase modulation required for the linear and corrective function $\phi_0(u) + \phi_1(u)$ is resolved modulo 2pi and approximated to the nearest phase level in order to calculate a first phase distribution. A second phase distribution $\phi_2(u)$ is calculated to provide sampling and/or attenuation and/or beam shaping. The two phase distributions are then added, re-resolved modulo 2pi and approximated to the nearest available phase level before application by the pixels. Other methods are also possible.

Mathematically the routing phase modulation is periodic due to the resolution modulo 2pi and by nature of its linearity.

Therefore the routing phase modulation results in a set of equally spaced diffraction orders. The greater the number of available phase levels the closer the actual phase modulation to the ideal value and the stronger the selected diffraction order used for routing.

By contrast, the corrective effects are realised by non-linear phase changes $\phi_1(u)$ that are therefore non-periodic when resolved modulo 2pi. This non-periodic phase modulation changes the distribution of the reflected beam about its centre, but not its direction. The combined effect of both linear (routing) and non-periodic phase modulation is to change both the direction and distribution of the beam, as may be shown using the convolution theorem.

The signal processing effects are usually realised by a method equivalent to 'multiplying' the initial routing and/or hologram $\exp j(\phi_0(u) + \phi_1(u))$ by a further hologram $\exp j \phi_2(u)$ in which $\phi_2(u)$ is non-linear and oscillatory. Therefore the set of diffraction orders associated with the further hologram creates a richer structure of subsidiary beams about the original routed beam, as may be shown using the convolution theorem.

While this explanation is for a one-dimensional phase modulator array the same principle may be applied in 2-D.

Hence in a reconfigurable optical system this non-linear phase modulation may be applied by the same spatial light modulator(s) that route the beam. It will be understood by those skilled in the art that the SLM may have only a single control input and the device may have processing circuitry for combining control data for routing and control data for corrective effects and signal processing effects to provide an output to control the SLM.

The data may be entered into the SLM bit-wise per pixel so that for each pixel a binary representation of the desired state is applied. Alternatively, the data may be entered in the form of coefficients of a polynomial selected to represent the phase modulation distribution of the pixel array of concern in the SLM. This requires calculating ability of circuitry of the SLM, but reduces the data transfer rates into the SLM. In an intermediate design the polynomial coefficients are received by a control board that itself sends bit-wise per pixel data to the SLM. On-chip circuitry may interpret data being entered so as to decompress that data.

The pixel array of concern could be all of the pixels associated with a particular beam or a subset of these pixels. The phase modulation distribution could be a combined phase modulation distribution for both routing and corrective effects or separate phase modulation distributions for each. Beam shaping, sampling and attenuation phase modulation distributions, as will be described later, can also be included. In some cases it may not be possible to represent the phase modulation distribution as a simple polynomial. This difficulty may be overcome by finding a simple polynomial giving a first approximation to the desired phase modulation distribution. The coefficients of this polynomial are sent to the SLM. A bit-wise correction is sent for each pixel requiring a correction, together with an address identifying the location of the pixel. When the applied distribution is periodic only the corrections for one period need be sent.

The processing circuitry 11 may be discrete from or integral with the SLM, or partly discrete and partly integral.

Figure 3:
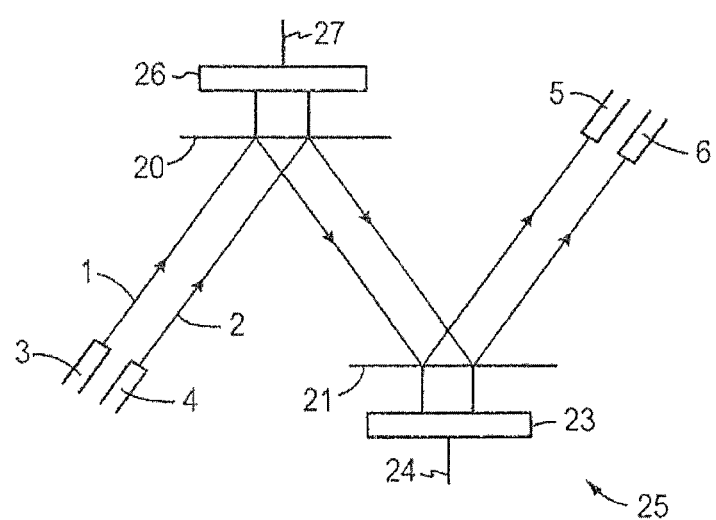
FIG. 3 shows a sketch of a routing device in which a routing SLM is used to route light beams and an additional SLM provides correction for performance impairment due to misalignment.

Referring to FIG. 3, a routing device 25 includes two SLMs 20,21 which display holograms for routing light 1,2 from an input fibre array 3,4 to an output fibre array 5,6. The two SLMs are reflective and define a zigzag path. The first SLM 20 hereinafter referred to as a "corrective SLM" not only carries out routing but also synthesises a corrective optical element. The second SLM 21 carries out only a routing function in this embodiment, although it could also carry out corrections or apply other effects if required. The second SLM 21 is hereinafter referred to as a "routing SLM". Although the corrective SLM 20 is shown disposed upstream of the routing SLM 21, it may alternatively be disposed downstream of the routing SLM 21, between two routing SLMs, or with systems using routing devices other than the routing SLM 21.

The routing SLM 21 has operating circuitry 23 receiving routing control data at a routing control input 24, and generating at the SLM 21 sets of holograms for routing the beams 1,2. The corrective SLM 20 has operating circuitry 26 receiving compensation or adaptation data at a control input 27 to cause the SLM 20 to display selected holograms. In this embodiment, the SLM 20 forms a reflective lens.

Synthesising a lens at the SLM 20 can be used to change the position of the beam focused spot and therefore correct for a position error or manufacturing tolerance in one or more other lenses or reflective (as opposed to transmissive) optical elements, such as a curved mirror. The synthesised lens can be spherical or aspheric or cylindrical or a superposition of such lenses. Synthesised cylindrical lenses may have arbitrary orientation between their two long axes and the lens focal lengths can both be positive, or both be negative, or one can be positive and the other negative.

To provide a desired phase modulation profile for a lens or curved mirror to compensate for an unwanted deviation from a required system characteristic, the system is modelled without the lens/mirror. Then a lens/mirror having the correction to cancel out the deviation is simulated, and the parameters of the lens/mirror are transformed so that when applied to an SLM the same effect is achieved.

In one application what is required is to adjust the position and width of the beam waist, of a Gaussian-type beam at some particular point in the optical system, in order to compensate for temperature changes or changes in routing configuration. Hence two properties of the beam must be adjusted and so it is necessary to change two properties of the optical system. In a conventional static optical system both a lens focal length and the position of the lens are selected to achieve the required beam transformation. In the dynamic systems under consideration it is rarely possible deliberately to adjust the position of the optical components. A single variable focus action at a fixed position changes both the position and the width of the beam waist and only in special circumstances will both properties be adjusted to the required value.

One method to overcome this problem is to apply both corrective phase and corrective 'pseudo-amplitude' modulation (to be described later) with a single SLM. However the amplitude modulation reduces the beam power which may be undesirable in some applications. A further and preferred method is to apply corrective phase modulation with two separate SLMs.

For example consider coupling from one input fibre (or input beam) through a routing system into the selected output fibre (or output beam). Inside the routing system there are at least two SLMs carrying out a corrective function. They may also be routing and carrying out other functions (to be described in this application). In between a given pair of SLMs carrying out focus correction there is an intermediate optical system.

At the first SLM carrying out a corrective function there may be calculated and/or measured the incident amplitude and phase distribution of the input beam that had propagated from the input fibre or beam. At the second SLM carrying out a corrective function there may be calculated and/or measured the ideal amplitude and phase distribution that the output beam would adopt if coupling perfectly into the output fibre or beam. This can be achieved by backlaunching from the output fibre or beam or by a simulation of a backlaunch. The required focus correction functions of these two SLMs is to transform the incident amplitude and phase distribution arriving at the first SLM to the ideal amplitude and phase distribution at the second SLM to achieve perfect (or the desired) coupling efficiency into the output fibre or output beam.

The corrective phase modulation to be applied at the first SLM should be calculated, so as to achieve the ideal amplitude distribution at the second SLM as the beam arrives at the second SLM after passing from the first SLM and through the intermediate system. This calculation should take into account propagation through the intermediate system between the first and second SLMs. Hence the function of the first SLM is to correct the beam so as to achieve the ideal amplitude distribution for the output beam. The beam phase distribution should also be calculated as it arrives at the second SLM. The corrective phase distribution to be applied at the second SLM should be calculated so as to transform the phase distribution of the beam incident upon it from the intermediate system to the ideal phase distribution required for the output beam at the second SLM.

Two variables available at the SLM to effect corrections from an optimal or other desired level of performance are firstly the blocks of pixels that are delineated for the incident light beam, and secondly the hologram that is displayed on the block(s) of concern.

Starting with the delineation of blocks, it should be borne in mind that the point of arrival of light on the SLM can only be predicted to a certain accuracy and that the point may vary according to physical changes in the system, for example due to temperature effects or ageing. Thus, the device allows for assessment of the results achieved by the current assignment, and comparison of those results with a specified performance. In response to the comparison results, the delineation may be varied so as to improve the results.

In one embodiment a training phase, uses for example a hill climbing approach to control and optimise the position of the centre of the block. Then if the "in-use" results deviate by more than a specified amount from the best value, the delineation of the block is varied. This process reassignment may step the assigned block one pixel at a time in different directions to establish whether an improved result is achieved, and if so continuing to step to endeavour to reach an optimum performance. The variation may be needed where temperature effects cause positional drift between components of the device. It is important to realise that unlike MEMS systems and the like, all the pixels are potentially available for all the beams. Also the size, shape and location of a delineated block is not fixed.

Equally the size and shape of a block may be varied if required. Such changes may be necessary under a variety of situations, especially where a hologram change is needed. If for example a hologram requiring a larger number of pixels becomes necessary for one beam, the size of the block to display that hologram can be altered. Such changes must of course usually be a compromise due to the presence of other blocks (possibly contiguous with the present block) for displaying holograms for other beams of light.

Monitoring techniques for determining whether the currently assigned block is appropriate include the techniques described later herein as "taking moments".

Turning to variation of the hologram that is displayed on the block of concern, one option to take into account for example physical changes in the system, such as movement out of alignment, is to change one normal linear-type routing hologram for another, or to adjust the present hologram in direct response to the sensed change. Thus if, due for example to temperature effects, a target location for a beam moves, it may be necessary to change the deflection currently being produced at a pixel block. This change or adjustment may be made in response to sensed information at the target location, and may again be carried out "on-line" by varying the hologram step by step. However, it may be possible to obtain an actual measure of the amount and direction of change needed, and in this case either a new hologram can be read in to the SLM or a suitable variation of the existing hologram carried out.

As well as, or instead of, linear changes to linear routing holograms, corrective changes may be needed, for example to refocus a beam or to correct for phase distortion and non-focus aberrations.

Having corrected the beam focus other aberrations may remain in the system. Such aberrations distort the phase distributions of the beams. These aberrations will also change with routing configuration as the beams are passing through different lenses and/or different positions on the same lenses. Similarly the aberrations will change with temperature. To obtain stable and acceptable performance of a reconfigurable optical system, the aberrations can be corrected dynamically.

To provide a desired phase modulation profile for these aberrations the system may be modelled or measured to calculate the phase distortion across the SLM, compared to the ideal phase distribution. The ideal phase distribution may again be found by modelling the system 'backwards' from the desired output beam, or by backlaunching and measurement, while the actual phase distribution may be found by modelling the system forwards from the input beam or measurement. The calculations will include the effects of reflection from the SLM itself. The corrective function of the SLM is to transform between the actual and ideal phase distortion. The phase distortion is defined as the phase difference between the actual phase distribution and the ideal phase distribution. The desired corrective profile is the conjugate phase of the phase distortion.

Alternatively, these corrective functions can be shared by two SLMS, which allows an extra degree of freedom in how the beam propagates inside the intermediate system between the two SLMs.

Further, given a real system a sampling method (as will be described later) may be used to direct a fraction of the beam towards a wavefront sensor that may assess the beam. So far the process is deterministic. Then the changes are applied to the real system, and perturbations on the parameters are applied while monitoring the sensor and/or the input/output state, so as to determine whether an optimum configuration is achieved. If not, the parameters are changed until a best case is achieved. Any known optimising technique may be used. It is preferred to provide a reasonable starting point by deterministic means, as otherwise local non-optimum performance maxima may be used instead of the true optimum.

The method or device of the invention may be used to correct for aberrations such as field curvature in which the output 'plane' of the image(s) from an optical system is curved, rather than flat.

Equally, even if in use the SLM forms a corrective element by having non-linear phase modulation applied across it, if it is operated in separate training and use phases, it may be desirable while training for the SLM to route as well. In this case the SLM scans the processed beam over a detector or routes the beam, for example using one or more dummy holograms, into a monitor fibre.

Figure 4:
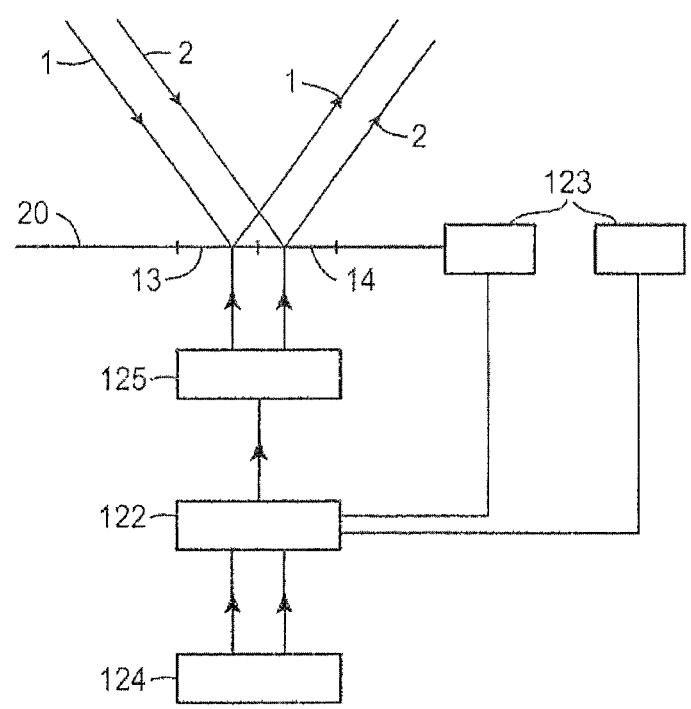
FIG. 4 shows a block diagram of an adaptive corrective SLM.

Referring now to FIG. 4, the corrective SLM 20, used purely for synthesising a corrective element, has operating circuitry 125, and further comprises processing circuitry 122 and temperature sensors 123. In this embodiment the operating circuitry, temperature sensors and processing circuitry are integrated on the same structure as the rest of the SLM, but this is not critical to the invention. Associated with the processing circuitry is a store 124 into which is programmed a lookup table. The sensors detect temperature changes in the system as a whole and in the SLM, and in response to changes access the look up table via the processing circuitry 122 to apply corrections to the operating circuitry. These corrections affect the holograms displayed on the blocks 13, 14 of pixels. The sensors may also be capable of correction for temperature gradients.

This technique may also be applied to an SLM used for routing.

Figure 5:
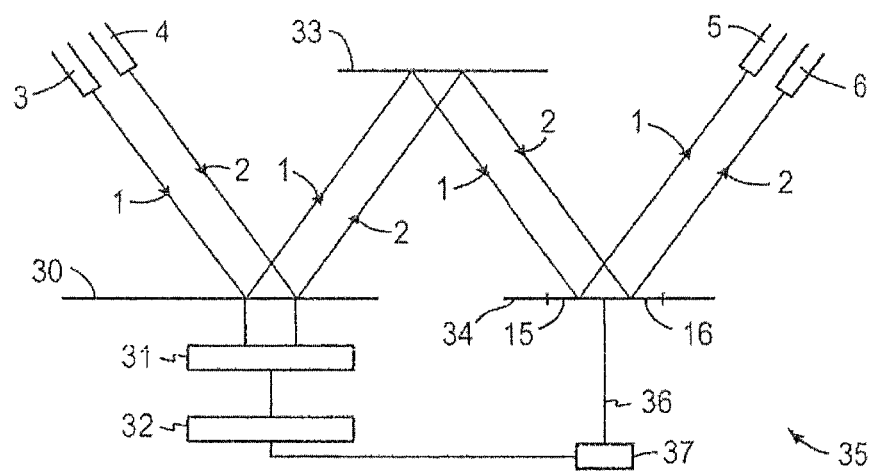
FIG. 5 shows an adaptive optical system using three SLMs.

Referring now to FIG. 5, an optical system 35 has a corrective SLM 30 with operating circuitry 31, and processing circuitry 32. The system includes further devices, here second and third SLMs 33 and 34, disposed downstream of the corrective SLM 30. The second SLM 33 is intended to route light to particular pixel groups 15, 16 of the third SLM 34. The third SLM 34 has monitor sensors 37 for sensing light at predetermined locations. In one embodiment these sensors 37 are formed by making the reflective layer partially transmissive, and creating a sensing structure underneath. In another, the pixel electrode of selected pixels is replaced by a silicon photodetector or germanium sensor structure.

In either case, circuitry may be integrated into the silicon backplane to process the output of the sensors 37, for example to compare the outputs of adjacent sensors 37, or to threshold one sensor against neighbouring sensor outputs. Where possible, processing circuitry is on chip, as it is possible to reduce the time taken after light has been received to respond to it in this way. This is because there is no need to read information off-chip for processing, and also because calculations may be able to be performed in parallel.

Provided the routing-together with any compensation effects from the corrective SLM 30—is true, the sensors 37 will receive only a minimal amount of light. However where misalignment or focus errors are present, the extent of such errors is detected by measuring the power coupled into the monitor sensors. To that end, the sensors 37 provide data, possibly after some on-chip processing, to the processing circuitry 32. The processing circuitry 32 contains a control algorithm to enable it to control the operating circuitry 31 to make changes of, or adjustments to, the compensating holograms displayed on the corrective SLM 30 until the system alignment is measured to be optimised. In some embodiments, changes to the sub-arrays to which beam affecting holograms are applied may be made in response to the sensor output data.

In another embodiment a determined number of dummy ports are provided. For example for a connector two or more such ports are provided and for routing devices three or more dummy ports are provided. These are used for continuous misalignment monitoring and compensation, and also for system training at the start.

Although some embodiments can operate on a trial and error basis, or can be adapted "on the fly", a preferred optical system uses a training stage during which it causes to be stored in the look-up table data enabling operation under each of the conditions to be encountered in use.

In one embodiment, in the training stage, a set of initial starting values is read in for application to the SLM 30 as hologram data, then light is applied at a fibre and the result of varying the hologram is noted. The variations may include both a change of pixels to which the hologram is applied, and a change of the hologram. Where more than one fibre is provided, light is applied to each other fibre in turn, and similar results obtained. Then other environmental changes are applied and their effects noted, e.g. at the sensors 37, and the correction for input data either calculated or sought by varying the presently-applied data using optimisation techniques to seek best or acceptable performance.

Then, in use, the system may be operated on a deterministic basis—i.e. after ascertaining what effect is sought, for example responding to a temperature change or providing a change in routing, the change to the applied data for operating the device can be accessed without the need for experiment.

A preferred embodiment operates in the deterministic way, but uses one or more reference beams of light passed through the device using the SLM 30. In that way the effect of deviations due to the device itself can be isolated. Also it can be confirmed that changes are being correctly made to take into account environmental and other variations.

The device may also have further monitor sensors placed to receive the zero-order reflections from the SLM(s) to enable an assessment to be made of the input conditions. For example, where an input channel fails, this can be determined by observing the content of the specular reflection from the light beam representing that channel. Where there are two SLMs as in some routing systems, the specular reflections from each SLM may be sensed and compared.

Figure 6:
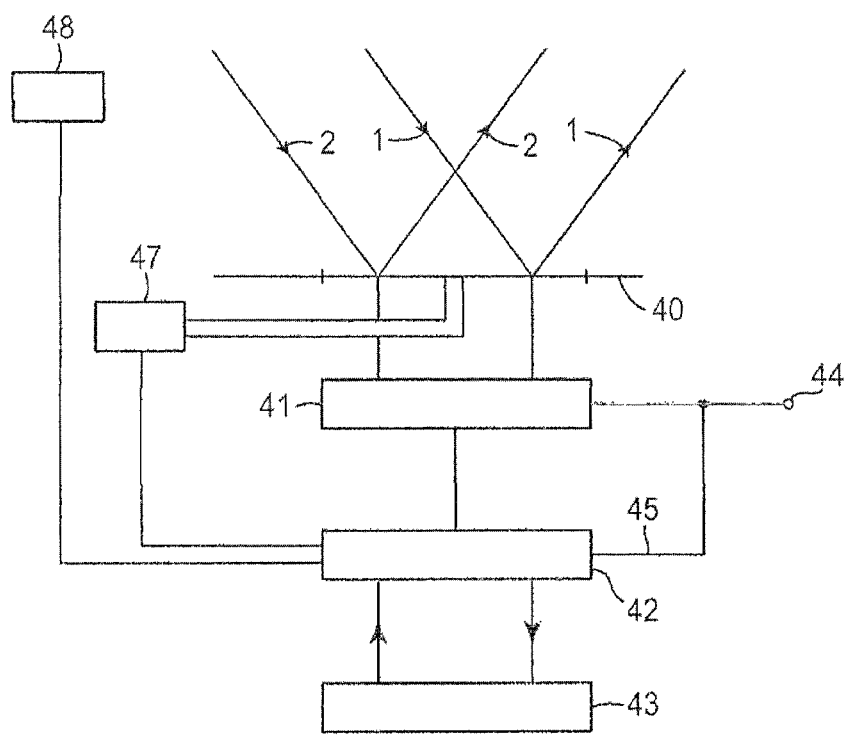
FIG. 6 shows a partial block diagram of a routing device with a dual function SLM and control arrangements.

Referring now to FIG. 6, a dual-function SLM 40 provides both routing and correction. The SLM 40 has operating circuitry 41 and processing circuitry 42. The operating circuitry 41 receives routing data at a first control input 44 for causing the processing circuitry 42 to generate the holograms on the SLM 40 to achieve the desired routing. The processing circuitry 42 also receives routing data on an input 45, and controls the operating circuitry 41 using an algorithm enabling adaptation due to changes in the path taken through the system to take place on a timescale equivalent to that required to change the hologram display, i.e. of the order of milliseconds.

The control algorithms for this embodiment may use one or more of several types of compensation.

In one embodiment a look-up table is stored in a memory 43, the look-up table storing pre-calculated and stored values of the compensation for each different route through the system.

In another embodiment the system is trained before first being operated, using changes of, or to the compensating holograms to learn how changing the compensating holograms affects the system performance, the resulting data being held in the memory 43.

In a further embodiment, the processing circuitry 42 employs intelligence responsive to signals from monitor sensors 47,48 for monitoring and calculation of how these compensating holograms should adapt with time to accommodate changes in the system alignment. This is achieved in some embodiments by integrating circuitry components into the silicon backplane of the SLM, or by discrete components such as germanium detectors where the wavelengths are beyond those attainable by silicon devices. In some embodiments sensors 47 are provided for sensing light at areas of the SLM, and in others the sensors 48 may instead or also be remote from the SLM 40 to sense the effects of changes on the holograms at the SLM 40.

Figure 7:
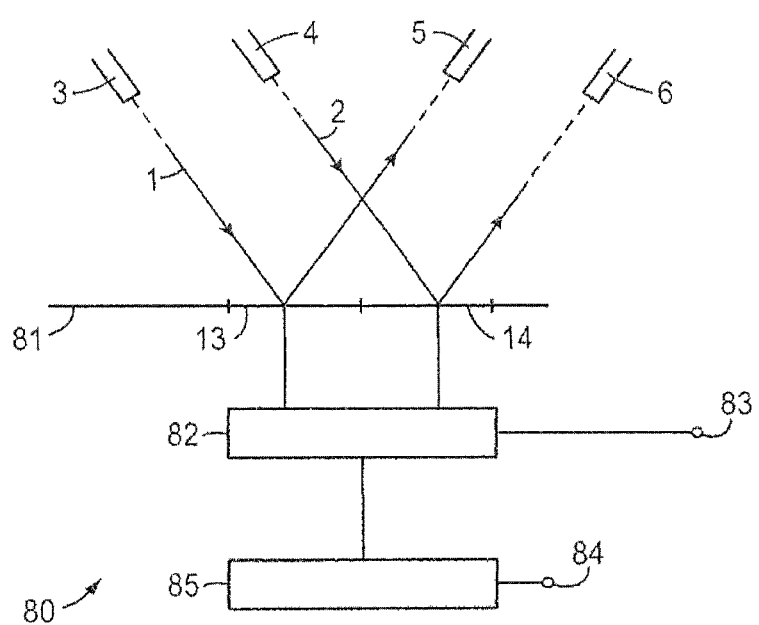
FIG. 7 shows a block diagram of an SLM for controlling the power transferred in an optical system.

Referring now to FIG. 7, an optical system 80 includes an SLM 81 for routing beams 1,2 of light from input fibres 3,4 to output fibres 5,6 by means of holograms displayed on pixel groups 13,14 of the SLM. The holograms are generated by processing circuitry 82 which responds to a control input 83 to apply voltages to an array of pixellated elements of the SLM, each of which is applied substantially uniformly across the pixel of concern. This result is a discrete approximation of a linear phase modulation to route the beams.

Figure 8A:
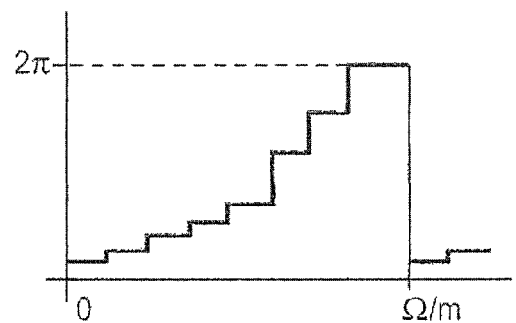
FIG. 8a shows a diagram of phase change distribution applied by a hologram for minimum attenuation.

The processing circuitry 82 calculates the ideal linear phase ramp to route the beams, on the basis of the routing control input 83 and resolves this phase modulo 2Pi. The processing circuitry at each of the pixels then selects the closest available phase level to the ideal value. For example if it is desired to route into the m'th diffraction order with a grating period $\Omega$ the ideal phase at position u on the SLM 81 is $2\pi \cdot mu/\Omega$. Therefore, approximately, the phase goes linearly from zero up to 2pi over a distance $\Omega/m$ after which it falls back to zero, see FIG. 8a.

Control of the power in individual wavelength channels is a common requirement in communication systems. Typical situations are the need to avoid receiver saturation, to maintain stable performance of the optical amplifiers or to suppress non-linear effects in the transmission systems that might otherwise change the information content of the signals. Power control may be combined with sampling or monitoring channels to allow adjustment of the power levels to a common power level (channel equalisation) or to some desired wavelength characteristic.

Deliberate changes to the value of 'Ω' can be used to reduce the coupling efficiency into the output in order to provide a desired attenuation. This is suitable for applying a low attenuation. However, it is not suitable for a high attenuation as, in that event, the beam may then be deflected towards another output fibre, increasing the crosstalk. If there is only one output fibre this method may be used regardless of the level of attenuation.

Figure 8B:
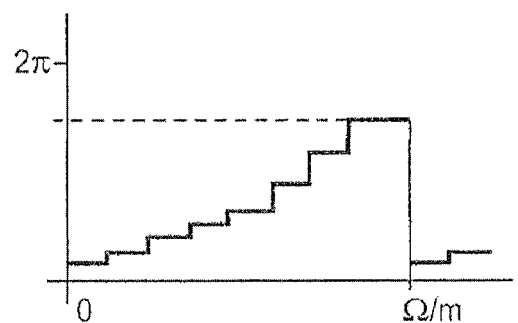
FIG. 8b shows a diagram of phase change distribution applied by a hologram enabling attenuation of the signal.

To provide a selected desired attenuation of the optical channel in the system, processing circuitry 85 responds to an attenuation control input 84 to modify the operation of the operating circuitry 83 whereby the operating circuitry selects a linear phase modulation such that by the end of each periodic phase ramp the phase has reached less than 2pi, see FIG. 8b.

This may be achieved by calculating the ideal value of phase for every pixel, and then multiplying this ideal value by a coefficient r between 0 and 1, determined on the basis of the desired attenuation. The coefficient is applied to every pixel of the array in order to get a reduced level per pixel, and then the available phase level nearest to the reduced level is selected.

The method of this embodiment reduces the power in this diffraction order by making the linear phase modulation incomplete, such that by the end of each periodic phase ramp the phase has only reached 2pi·r. It has however been found that the method of this embodiment may not provide sufficient resolution of attenuation. It also increases the strength of the unwanted diffraction orders likely to cause crosstalk. When combined with deliberate changes in the length of the ideal phase ramp the resolution of attenuation may be improved. Again if there is only a single output fibre the crosstalk is less important.

Resolution may also be improved by having a more complex incomplete linear phase modulation. However, the unwanted diffraction orders may still remain too strong for use in a wavelength-routed network. Hence to control the power by adapting the routing hologram may have undesirable performance implications in many applications, as crosstalk worsens with increase of attenuation. The problem can be overcome by use of a complex iterative design. This could be used to suppress the higher orders but makes the routing control more expensive.

Figure 9:
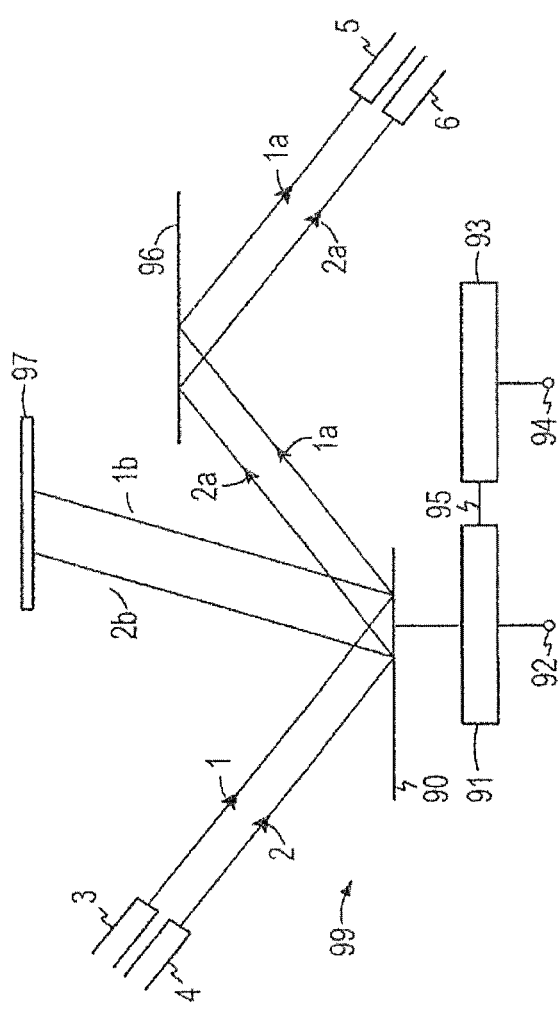
FIG. 9 shows a power control system.

Referring now to FIG. 9, a system 99 includes an SLM 90 controlled by applying a discrete approximation of a linear phase modulation to route beams 1,2 from input fibres 3,4 to output fibres 5,6 as previously described with respect to FIG. 7. Thus operating circuitry 91 selects a routing hologram for display by the SLM, in accordance with a routing input 92, whereby the beams may be correctly routed, using a look up table or as otherwise known. A memory holds sets of data each allowing the creation of a respective power controlling hologram. Processing circuitry 93 runs an algorithm which chooses a desired power controlling hologram corresponding to a value set at a power control input 94. The power controlling hologram is selected to separate each beam into respective main 1a, 2a and subsidiary 1b, 2b beams, such that the main beams 1a, 2a are routed through the system and the or each subsidiary beam(s) 1b, 2b is/are diffracted out of the system, for example to a non-reflective absorber 97.

The processing circuitry 93 applies the power controlling hologram data to a second input 95 of the operating circuitry 91 which acts on the routing hologram data so as to combine the routing and power controlling holograms together to provide a resultant hologram. The operating circuitry then selects voltages to apply to the SLM 90 so that the SLM displays the resultant hologram.

Thus power in a routing context is controlled by combining the routing hologram with another hologram that has the effect of separating the beam into a main beam and a set of one or more subsidiary beams of these the main beam is allowed to propagate through the system as required while the other(s) are diffracted out of the system.

Figure 10:
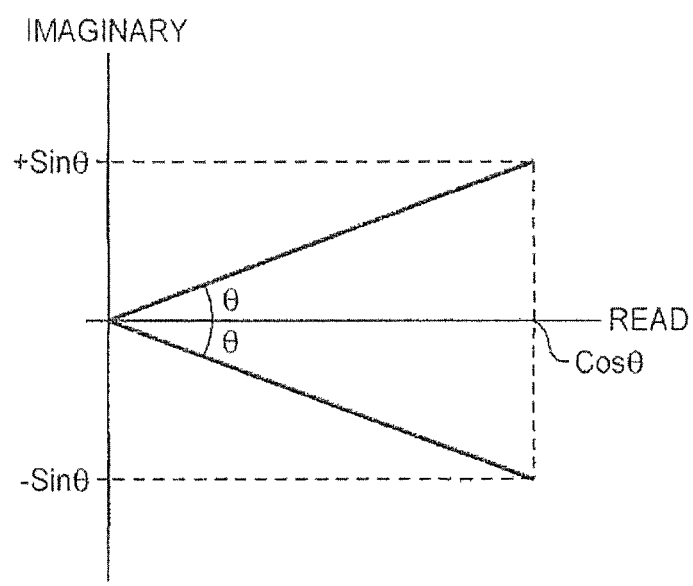
FIG. 10 shows a phasor diagram showing the effect of non-linear oscillatory phase modulation applied to adjacent pixels.

For example consider a hologram that applies phases of +φ and −φ on adjacent pixels. In terms of real and imaginary parts this hologram has the same real part, cos φ, on every pixel, see FIG. 10, while the imaginary part oscillates between +−sin φ. It can be shown using Fourier theory that the net effect is to multiply the amplitude of the original routed beam by a factor cos φ, and to divert the unwanted power into a set of weak beams at angles that are integer multiples of ±λ/2p with respect to the original routed beam, where λ is the operating wavelength and p is the pixel pitch.

The system is designed from a spatial viewpoint such that light propagating at such angles falls outside the region of the output fibres 5,6 of FIG. 9. An alternative design directs the unwanted light into output fibres 5,6 at such a large angle of incidence that the coupling into the fundamental mode is very weak, and has no substantial effect. In this case the unwanted power is coupling into the higher-order modes of the fibre and so will be attenuated rapidly. A fibre spool or some other technique providing mode stripping is then used on the output fibre before the first splice to any other fibre.

In either case, the effective attenuation of the beam is $10 \log_{10} \cos^2 \phi$. Hence, in this way, polarisation-independent phase modulation may be used to create an effect equivalent to polarisation-independent amplitude modulation. This is termed herein "pseudo amplitude modulation". In this particular case the pseudo-amplitude modulation applied at every pixel is cos φ.

It will be clear to those skilled in the art that use of alternate pixels as the period of alternation is not essential, and may in some cases be undesirable. This is because of edge effects in the pixels.

The period and pattern of alternation can be varied so as to adjust the deflection angle of the 'unwanted power'. This light directed away from the output fibres can be collected and used as a monitor signal. Hence the pseudo-amplitude modulation can be used to sample the beam incident on an SLM as previously discussed. This sampling hologram can be combined with a routing and/or power control and/or corrective SLM. In the latter case the sampled beam can be directed towards a wavefront sensor and then used to assess the quality of the beam correction. While the pseudo-amplitude modulation as described above is applied to the whole beam, it could be applied selectively to one or more parts of the beam.

A further modification to this pseudo-amplitude modulation is to multiply it by a further phase modulating hologram such as to achieve a net effect equivalent to a complex modulation.

It is often important that the sampling hologram takes a true sample of the output beam. Therefore in some cases the sampling hologram should be applied after the combination of all other desired effects including resolution modulo 2pi and approximation to the nearest available phase level. In this case the overall actual phase modulation distribution is achieved by a method equivalent to forming the product of the sampling hologram and the overall hologram calculated before sampling.

Similar pseudo-amplitude modulation techniques may be extended to suppress the crosstalk created by clipping of the beam tails at the edges of each hologram and to tailor the coupling efficiency vs. transverse offset characteristic of the output fibres. Since the transverse position at the output fibre is wavelength dependent, this tailoring of the coupling efficiency vs. offset can be used to tailor the wavelength response of the system. This is important in the context of wavelength division multiplexing (WDM) systems where the system wavelength can be expected to lie anywhere in the range of the available optical amplifiers. The output angle for beam steering using an SLM and periodic linear phase modulation is proportional to the wavelength while the focal length of corrective lenses is also wavelength-dependent. Therefore a hologram configured to give the optimum coupling efficiency at one wavelength will produce an output beam with transverse and/or longitudinal offset at another wavelength. These effects result in wavelength-dependent losses in systems required to route many wavelength channels as an ensemble. Hence a method designed to flatten or compensate for such wavelength-dependent losses is useful and important.

Among the envisaged applications are the flattening of the overall wavelength response and the compensation for gain ripple in optical amplifiers, especially Erbium-doped fibre optic amplifiers (EDFA).

An SLM device may also be used to adapt the shape, e.g. the mode field shape, of a beam in order to suppress crosstalk.

Beam shaping is a type of apodisation. It is advantageously used to reduce crosstalk created at a device by clipping of the energy tails of the light beams. Such clipping leads to ripples in the far field. These ripples cause the beam to spread over a wider region than is desired. In telecommunications routing this can lead to crosstalk. Other applications may also benefit from apodisation of a clipped laser beam, such as laser machining, for example, where it is desired to process a particular area of a material without other areas being affected and laser scalpels for use in surgery.

Clipping occurs because the energy of the beam spreads over an infinite extent (although the amplitude of the beam tails tends to zero), while any device upon which the beam is incident has a finite width. Clipping manifests itself as a discontinuity in the beam amplitude at the edges of the device.

Figure 11:
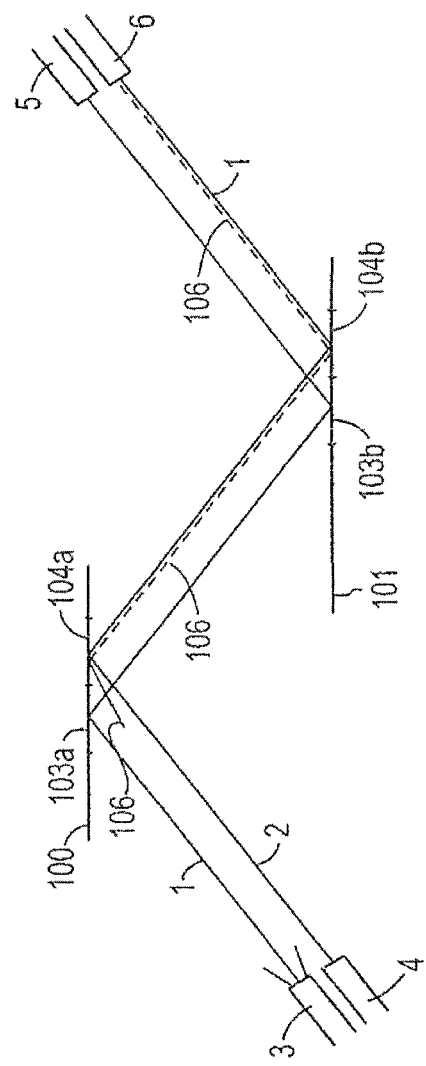
FIG. 11 shows a schematic diagram of a part of an optical routing system illustrating the effects of clipping and cross talk.

Referring to FIG. 11, two SLMs 100,101 are used for beam steering or routing of beams 1,2 from input fibres 3,4 to output fibres 5,6, as described in PCT GB00/03796. Each SLM 100,101 is divided into a number of blocks of pixels 103a, 104a; 103b, 104b. Each block 103a, 104a is associated with a particular input fibre 3,4—i.e. the fibre of concern points to the subject block. Each block displays a hologram that applies routing. As previously discussed herein the holograms may also or alternatively provide focus compensation, aberration correction and/or power control and/or sampling, as required.

The blocks 103a, 104a at the input SLM 100 each receive a beam from an associated input fibre 3,4 while the blocks 103b, 104b at the output SLM 101 each direct a beam towards an associated output fibre 5,6. Each block 103a, 103b has a finite width and height. As known to those skilled in the art and as previously noted, the beam width is infinite, therefore the block clips the beam from or to the associated fibre and this creates undesired ripples in the far field.

The ripples due to clipping of the beam 1 are figuratively shown as including a beam 106 which, it will be seen, is incident on the wrong output hologram, displayed on block 104b at the output SLM 101. "Wrong" signifies holograms other than that to which the beam of concern is being routed, for example holograms displayed by blocks around the block to which the beam should be routed. Some of these ripples will then be coupled into "wrong" output fibres 5,6—i.e. those to which the beam is not deliberately being routed-leading to crosstalk. It will be clear to those skilled in the art that these effects will be present on blocks other than those adjacent to the "correct" blocks, as the field of beam 1 is infinite in extent.

In any physical system the effect of the ripples created by clipping at the output SLM 101 depends on the optical architecture.

In practice the non-ideal transfer function of the optics (due to finite lens apertures and aberrations) means that a sharp change in the amplitude spreads out and causes crosstalk in adjacent output fibres. In effect the optics applies a limit to the range of spatial frequencies that can be transmitted. This frequency limit causes crosstalk.

The wider the device, compared to the beam spot size at the device, the weaker the ripples in the far field and the lower the crosstalk. In general a parameter C is defined such that the required width of SLM per beam is given by H=C·ω, where ω is the beam spot size at the SLM. The value of C depends on the beam shape, the optical architecture and the allowable crosstalk. Typically for a Gaussian beam, with no beam shaping and aiming for crosstalk levels around −40 dB, C would be selected to have a value greater than or equal to three. Looking at this system from the spatial frequency viewpoint, the field incident on the SLM contains (for perfect optics) all the spatial frequencies in the input beam. The finite device width cuts off the higher spatial frequencies, so, again, the optics applies a limit to the range of spatial frequencies that can be transmitted and this frequency limit causes crosstalk.

Beam shaping can be used to decrease the crosstalk for a given value of C, and also allow the use of a lower value of C. Calculations for N*N switches have shown that decreasing the value of C leads to more compact optical switches and increases the wavelength range per port. Hence beam shaping can be employed to provide more compact optical switches and/or an increased wavelength range per port.

The idea behind using beam shaping or 'apodisation' to reduce crosstalk is based on an analogy with digital transmission systems. In these systems a sequence of pulses is transmitted through a channel possessing a limited bandwidth. The frequency response of the channel distorts the edges of pulses being transmitted so that the edges may interfere with one another at the digital receiver leading to crosstalk. The channel frequency response can, however, be shaped so as to minimise such crosstalk effects. Filters with responses that have odd-symmetry can be used to make the edges go through a zero at the time instants when pulses are detected.

Therefore beam-shaping with odd symmetry can be used to make the crosstalk go through a zero at the positions of the output fibres. Such a method is likely to be very sensitive to position tolerances.

Another method used in digital systems is to shape the frequency cut-off so that it goes smoothly to zero. In the present context the ideal case of 'smoothly' is that the channel frequency response and all derivatives of the frequency response become zero. In practice it is not possible to make all derivatives go to zero but a system may be designed in which the amplitude and all derivatives up to and including the k'th derivative become zero at the ends of the frequency range. The higher the value of k, the quicker the tails of the pulse decay. Therefore the beam shaping should go as smoothly as possible to zero.

To investigate the effects of beam shaping the amplitude modulation was treated as continuous. The system studied was a single lens $2f$ system where $2f$ is the length of the system between fibres and SLM, assuming f is the focal length with fibres in one focal plane, and an SLM in the other focal plane. The input fibre beam was treated as a Gaussian. Various amplitude modulation shapes were applied at the SLM and the coupling efficiency into the output fibre was calculated. In this architecture and from Abbe theory, the incident field at the SLM is proportional to the Fourier Transform of the field leaving the input fibre. In particular, different spatial frequencies in the fibre mode land on different parts of the SLM. Clipping removes the spatial frequencies outside the area of the hologram. Beam shaping at the SLM has the effect of modifying the relative amplitude of the remaining spatial frequencies.

Residual ripples may still remain due to the discontinuity in the beam derivative but the ripples will be reduced in amplitude and decay more quickly. Further reduction in the ripple amplitude and increase in the rate of decay may be achieved by shaping the beam such that both the amplitude and the first k derivatives go to zero at the edges.

Mathematical analysis of the effect has also been carried out. The results are as follows:

The $n^{th}$ time derivative of a function can be expressed in terms of its Fourier Transform as shown in equation (1):

$$\frac{d^n g(t)}{dt^n} = \int_{-\infty}^{\infty} (i2\pi f)^n G(f) \exp i 2\pi f t \, df \quad (1)$$

Hence, by inversion, the frequency dependence of the Fourier Transform (FT) may be expressed as an FT of any one of the function's derivatives as shown in equation (2):

$$G(f) = \frac{1}{(i2\pi f)^n} \int_{-\infty}^{\infty} \frac{d^n g(t)}{dt^n} \exp - i2\pi f t \, dt \quad (2)$$

Choosing the zeroth derivative provides the expression in equation (3):

$$G(f) = \int_{-\infty}^{\infty} g(t) \exp - i2\pi f t \, dt \quad (3)$$

To apply the analysis to free-space beam-steering:

let x and y be the position co-ordinates at the fibre output from a switch, and u and v be the position co-ordinates at the SLM. Assume the SLM to be in one focal plane of a lens of focal length f, and the fibre array to be in the other focal plane:

$$E_{FIB}(x, y) = \quad (4)$$
$$\frac{i}{f\lambda} \exp\left(-i\frac{2\pi}{\lambda}(2f + nt)\right) \int \int E_{SLM}(u, v) \exp i \frac{2\pi f}{\lambda}(xu + yv) du \, dv$$

such that the output field (see equation (4)) is a 2-D Fourier Transform of the field at the SLM, $E_{SLM}$. In this result t is the lens thickness and N its refractive index, while $\lambda$ is the optical wavelength.

For the present purposes the 1-D equivalent is considered (relation 5):

$$E_{FIB}(x) = \frac{i}{f\lambda} \exp\left(-i\frac{2\pi}{\lambda}(2f + nt)\right) \int E_{SLM}(u) \exp i \frac{2\pi f}{\lambda}(xu) du \quad (5)$$

Comparing with (3) it is clear that the position co-ordinate at the SLM (u) is equivalent to the time domain and the position co-ordinate at the output (x) is equivalent to the frequency domain. Hence from (2) the output field may be expressed in terms of a derivative of the field at the SLM, as shown in equation (6):

$$E_{FIB}(x) = \frac{i}{f\lambda} \exp\left(-i\frac{2\pi}{\lambda}(2f + nt)\right)\left(\frac{i}{2\pi x}\right)^n \int \frac{d^n E_{SLM}(u)}{du^n} \exp i \frac{2\pi f}{\lambda}(xu) du \quad (6)$$

Let the $k^{th}$ derivative of $E_{SLM}(u)$ be non-zero and smoothly varying over the range $[-H/2, H/2]$, but zero outside this range, such that the derivative changes discontinuously at $u = \pm H/2$:

$$\frac{d^k E_{SLM}(u)}{du^k} = 0 \qquad \forall u : u < -\frac{H}{2} \quad (7)$$
$$= g^H \qquad u = -\frac{H}{2}$$
$$= s(u) + g^H \qquad -\frac{H}{2} < u < \frac{H}{2}$$
$$= g^H \qquad u = +\frac{H}{2}$$
$$= 0 \qquad u > \frac{H}{2}$$

This representation assumes $E_{SLM}$ to be even in u. Physically this situation represents a beam that is perfectly aligned with respect to the centre of a hologram of width H.

This derivative may be expressed as the sum of a rect function and a smoothly varying function, $s(u)$, that is zero at and outside $|u| = H/2$:

$$\frac{d^k E_{SLM}(u)}{du^k} \equiv g_H \, \text{rect}\left(\frac{u}{H/2}\right) + s(u) \quad (8)$$

For example consider a clipped (and unapodised) Gaussian beam; the zeroth derivative (k=0) may be expressed as:

$$s(u) = \exp - \left(\frac{u}{\omega_{HOL}}\right)^2 - \exp - \left(\frac{H}{2\omega_{HOL}}\right)^2 \forall |u| < \frac{H}{2} \quad (9)$$
$$= 0 \; \forall |u| \geq \frac{H}{2}$$
$$g_H = \exp - \left(\frac{H}{2\omega_{HOL}}\right)^2 \quad (10)$$

Now returning to the general case (equation (8)) the $k+1^{th}$ derivative is calculated:

$$\frac{d^{k+1} E_{SLM}(u)}{du^{k+1}} \equiv g_H \left\{\delta\left(u + \frac{H}{2}\right) - \delta\left(u - \frac{H}{2}\right)\right\} + \frac{ds(u)}{du} \quad (11)$$

It is now convenient to calculate the output field. Set n=k+1 in (6) to obtain:

$$E_{FIB}(x) \propto \qquad (12)$$

$$\frac{1}{(i2\pi x)^{k+1}} \left\{ g_H \int_{-\infty}^{\infty} (\delta(t+H/2) + \delta(t-H/2)) \exp{-i2\pi x u}\, du + \int_{-\infty}^{\infty} \frac{ds(u)}{du} \exp{-i2\pi x u}\, du \right\}$$

which becomes equation (13):

$$E_{FIB}(x) \propto \frac{1}{(i2\pi x)^{k+1}} \left\{ 2ig_H \sin(\pi x H) + \int_{-\frac{H}{2}}^{\frac{H}{2}} \frac{ds(u)}{du} \exp{-i2\pi x u}\, du \right\} \qquad (13)$$

As the position is increased, the exponential term in the 2$^{nd}$ integral of (13) oscillates more and more rapidly. Eventually the spatial frequency is so high that the derivative of s(u) can be considered to be constant, or nearly constant, over the spatial period. In which case the integral is zero, or nearly zero, when evaluated over each period of the oscillation. Therefore at high frequencies the whole of the second integral must approach zero.

It is assumed that the behaviour is dominated by the first integral. The first integral shows that if the amplitude changes discontinuously (k=0, i.e. an unapodised hologram), the spectrum ($E_{FIB}$) decays as 1/x. Now, if the amplitude and the first derivative are continuous, it is the second derivative that changes discontinuously, and so k=2 and the spectrum ($E_{FIB}$) decays as 1/x$^3$. Numerical simulations have been carried out to confirm this behaviour.

A particularly advantageous shape is one in which the shaped beam has odd symmetry about points midway between the centre and the edges such that the beam amplitude and all of its derivatives go to zero at the beam edges.

The beam shaping may be effected to remove only a small amount of power from the central portion of the beam, to maintain acceptable system efficiency. A method for shaping a beam to achieve suppression of the ripples is now described.

Defining the middle of the beam as f(u), then f(u) can describe the original beam in its central portion, or what is left in the original beam after it has already been partially shaped, using, for example, pseudo-amplitude. To avoid ripples in the far field the edges of the beam go to zero at u=±H/2, where H is the width of the hologram.

Hence, at the right-hand edge, describe the beam as in equation (14):

$$f_R(u) = f(0) - f(u - H/2) \qquad (14)$$

(The left-hand edge is considered later).

To get matching of the amplitude half-way between the middle and the edge it is required that $$f(H/4) = f_R(H/4) \qquad (15)$$

From which there is obtained $$f(H/4) + f(-H/4) = f(0) \qquad (16)$$

Now consider the derivatives at the joining point. The n$^{th}$ derivative of the right-hand edge function is given by equation (17):

$$\left. \frac{d^n f_{RH}}{du^n} \right|_{u=U} = -\left. \frac{d^n f}{du^n} \right|_{u=U-H/2} \qquad (17)$$

Hence at the joining point condition (18) is valid:

$$\left. \frac{d^n f_{RHEDGE}}{du^n} \right|_{u=H/4} = -\left. \frac{d^n f}{du^n} \right|_{u=-H/4} \qquad (18)$$

In order to avoid the creation of high frequency effects (crosstalk tails) by the joining point all derivatives are desirably continuous here. Hence it is required that condition (19) should be true:

$$\left. \frac{d^n f}{du^n} \right|_{u=H/4} = -\left. \frac{d^n f}{du^n} \right|_{u=-H/4} \qquad (19)$$

To find out whether this is possible, expand the function f in a Taylor series about x=0 to obtain equation (20)

$$f = f(0) + a_1 u + a_2 u^2 + a_3 u^3 + a_4 u^4 + a_5 u^5 + a_6 u^6 + \qquad (20)$$

The first derivative is given by equation (21):

$$\frac{df}{du} = a_1 + 2a_2 u + 3a_3 u^2 + 4a_4 u^3 + \ldots \qquad (21)$$

The required condition (19) for the first derivative (n=1) can be obtained provided f is even in x, so that all the odd coefficients {a1, a3 ...} in (20) and (21) are zero. This makes the first derivative continuous at the joining point. Furthermore if ƒ is an even function then ƒ(H/4)=ƒ(−H/4) in which case (16) becomes:

$$f(H/4) = \frac{1}{2} f(0) \qquad (22)$$

Given that f is now an even function, the second derivative of f is given by equation (23):

$$\frac{d^2 f}{du^2} = 2a_2 + 12a_4 u^2 + \ldots \qquad (23)$$

Returning to the required condition in (19) it is clear that it cannot be satisfied for n=2. Hence the second derivative is discontinuous at the joining point u=H/4.

The left-hand edge is given by equation (24)

$$f_{LH}(u) = f(0) - f(u + H/2) \qquad (24)$$

Given that f is even, the overall function has odd symmetry in each half plane x=±H/4.

To work out what happens at x=±H/2, expand ƒ$_{RH}$ and ƒ$_{LH}$ in Taylor series, as shown in equations 25 and 26:

$$f_{RH} = a_2 \left(u - \frac{H}{2}\right)^2 + a_4 \left(u - \frac{H}{2}\right)^4 + a_6 \left(u - \frac{H}{2}\right)^6 + \ldots \qquad (25)$$

$$f_{LH} = a_2 \left(u + \frac{H}{2}\right)^2 + a_4 \left(u + \frac{H}{2}\right)^4 + a_6 \left(u + \frac{H}{2}\right)^6 + \ldots \qquad (26)$$

The function and its first derivative are both zero at u=½H, but the second derivative has the value 2a$_2$ Outside of the range [−½H, ½H] the beam drops to zero. Hence the second derivative is discontinuous at both u=±½H and u=±H/4, and the far field must therefore decay as the cube of the distance measured in the far field.

From the analysis, the required properties of f(u) for a hologram of width H are that firstly it should be even in u, and that secondly its amplitude at the position u=H/4 should be half the amplitude at u=0. After apodisation has been applied the shape of the beam in the region between u=H/4 and u=H/2 should be given by $f_{RH}(u)=f(0)-f(u-H/2)$ while in the region between u=-H/2 and u=-H/4 the shape of the beam should be given by fLH(u)=f(0)-f(u+H/2). In practice the shaping may not increase the local beam amplitude. Hence the hologram width and/or the shape of the central portion may have to be adjusted to avoid the requirement for 'amplifying' shaping.

As an example these conditions are satisfied by a Gaussian distribution given by equation (27):

$$f(u) = \exp-\left(\frac{u\sqrt{\ln(2)}}{H/4}\right)^2 - \qquad (27)$$

If the original beam satisfies the first two conditions it can be apodised without removing power from the central region. Otherwise shaping can be applied to the central region so that these two conditions are satisfied.

In some systems there may be a requirement to adapt the width of the beam in the far field: either to narrow the beam or to broaden the beam. This may be useful for laser processing of materials as well as for routing. It is advantageous that the method to change the width does not introduce side lobes. A particular application that would benefit is laser drilling of holes. The SLM could be used to narrow the drilling beam as well as to change its focus so that the drilled hole remains of uniform diameter (or has reduced diameter variation) as the hole is progressively bored.

In order to broaden the far field, the near field (at the SLM) needs to be made narrower. This may be implemented by applying shaping to the central portion of the beam so that its full width half maximum (FWHM) points become closer together and so that the beam shape has even symmetry about its centre. Preferably the amplitude at the very peak is not reduced so as not to lose too much power. The distance between the two FWHM points defines the effective half-width of the hologram. Further shaping should be applied to the left-hand and right-hand edges of this effective hologram, so that the beam shape has the required properties as described previously. Outside of the width of the effective hologram the beam shape should have zero amplitude.

To narrow the far field, the near field (at the SLM) needs to be made broader. This may be implemented by applying shaping to the central portion of the beam, so that the FWHM points become further apart, and so that the beam shape has even symmetry about its centre. Typically this will require reduction of the amplitude around its peak. The extent of this reduction is governed by the need to be able to apply shaping to the right and left hand edges of the hologram with the constraint that the shaping may only decrease the amplitude (and not increase it).

Amplitude-modulating SLMs can be used to implement the shaping but they are polarisation-dependent.

Another pseudo-amplitude modulation can be created to implement the beam shaping by using a phase-modulating SLM, which may be made polarisation-independent. This may be achieved by recognising that a phase modulation exp j φ(u), where j is the complex operator, is equivalent to a phase modulation cos φ(u)+j sin φ(u). Now choose φ(u) such that the modulus of φ(u) is varying slowly but the sign is oscillating.

Hence the real part of the modulation, cos φ(u), will be slowly varying and can act as the amplitude modulator to create the beam shape, while the imaginary part of the modulation, ±sin φ(u), will be oscillating rapidly with an equivalent period of two or more pixels. Hence the energy stripped off by the effective amplitude modulator will be diffracted into a set of beams that are beam-steered out of the system at large angles.

In a preferred embodiment, the system is designed such that light travelling at such angles will either not reach the output plane or will land outside the region defined by the output ports. Therefore the beam component shaped by sin φ(u) is rejected by the optical system, while the beam component shaped by cos φ(u) is accepted by the system and couples into one or more output ports, as required. While this explanation is for a one-dimensional phase modulator array the same principle is applicable in 2-D. If φ(u) varies from 0 at the centre of the beam to π/2 at the edges then the amplitude of the beam shaped by cos φ(u) varies from 1 at the centre of the beam to 0 at the edges, thus removing the amplitude discontinuity that creates rippling tails in the far field. This can be achieved with minimal change to the insertion loss of the beam as it passes through the system. Indeed, often the insertion loss due to clipping is due to interference from the amplitude discontinuity, rather than the loss of energy from the beam tails.

The beam-shaping hologram is non-periodic but oscillatory and may be applied as a combination with other routing and/or lens synthesis and/or aberration correcting and/or power control and/or sampling holograms.

Further advantages of the beam shaping are that it reduces the required value of C for a given required crosstalk, allowing more compact optical switches. Another advantage is that the crosstalk decays much more rapidly with distance away from the target output fibre. Hence, essentially, the output fibres receive crosstalk only from their nearest neighbour fibres.

Therefore in a large optical switch used as a shared N*N switch for a range of wavelengths, it should be possible to arrange the wavelength channel allocation such that no output fibre collects crosstalk from a channel at the same system wavelength as the channel it is supposed to be collecting. This would reduce significantly the homodyne beat noise accumulation in networks using such switches, and, conversely, allow an increase in the allowed crosstalk in each switch as heterodyne crosstalk has much less of an impact at the receiver, and can also be filtered out if necessary.

The crosstalk suppression method uses beam shaping to suppress ripples in the beam tails. The same method can be adapted to change the beam shape around the beam centre. For the case when the output beam is an image of the beam at the SLM the beam shaping is working directly on an image of the output beam. The fraction of the initial beam that is shaped by the slowly varying function cos φ(u) can have the correct symmetry to couple efficiently into the fundamental mode of the output fibre. The fraction of the initial beam that is shaped by the rapidly varying function±sin φ(u) has the wrong symmetry to couple into the fundamental mode and can be adjusted to be at least partially orthogonal to the fundamental mode.

Effectively, it is the fraction of the beam shaped by cos φ(u) that dominates the coupling efficiency into the fundamental mode. Therefore the dependence of the coupling efficiency vs. transverse offset is dominated by the overlap integral between the cos φ(u) shaped beam and the fibre fundamental mode.

When the incident beam is the same shape as the fundamental mode and for small transverse offsets the coupling efficiency decreases approximately parabolically with transverse offset. In many beam-steering systems using phase-modulating SLMs the transverse offset at the output fibre increases linearly with the wavelength difference from the design wavelength. Consequently the system coupling efficiency decreases approximately parabolically with wavelength difference from the design wavelength. Beam shaping can be used to adjust the shape of the incident beam and optimised to flatten the dependence on transverse offset and hence to flatten the wavelength response. Alternatively a more complex wavelength dependence could be synthesised to compensate for other wavelength-dependent effects.

Beam shaping may also be used during system assembly, training or operation in order to measure mathematical moments of a light beam. A description of the method and theory will be followed by a description of some example applications.

The method requires a first stage during which corrective phase modulation is applied by the SLM such that the phase profile of the beam leaving the SLM has no non-linear component. This may be confirmed with a collimeter or wavefront sensor or some other suitable device. In a first embodiment the phase profile has no linear component applied to deflect the beam such that the beam is reflected in a specular direction. An optical receiver is placed to receive the reflected beam. The power reflected exactly into the specular direction is proportional to the square of an integral $A(n)$ given in equation (28) where $f(n,u,v)$ is the complex amplitude of the beam leaving the SLM at co-ordinates u,v during the $n^{th}$ stage of the method.

$$A(n) = \iint f(n,u,v) du\, dv \quad (28)$$

The optical power received by the photodiode during the $n^{th}$ stage of the method is given by equation (29)

$$P(n) = K(A(n))^2 \quad (29)$$

where K is a constant of proportionality.

If received by an optical fibre the received power will be modified according to the fibre misalignment and mode field distribution, leading to possible ambiguities in the method. Hence it is preferred instead to receive the beam by a photodiode. During the first stage of the method the net phase modulation applied by the SLM is such that the beam is of uniform phase. Let $b(u, v)$ be the beam amplitude distribution. Therefore during this first stage the integral A is equal to the zeroth moment, $a0$, of the beam amplitude distribution, as shown in equation (30), and $f(n,u,v)$ is equal to $$A(1) = a0 = \iint b(u,v) du\, dv \quad (30)$$

Therefore the power, P(1), measured by the photodiode during this first stage is given by equation (31).

$$P(1) = K a_0^2 \quad (31)$$

In order to characterise a two-dimensional beam, moments of the beam distribution may be taken in two orthogonal directions, in this case the u and v directions. Consider the pixel block of concern to be broken up into a set of columns. To each column in the block a particular effective amplitude modulation may be applied using the pseudo-amplitude method or some other method. For example consider the pixel column with a centre at co-ordinate $u^*$. By applying an alternating phase modulation of $+\phi(u^*)$ and $-\phi(u^*)$ to adjacent pixels in the same column the effective amplitude modulation applied to the particular column is $\cos(\phi(u^*))$.

In order to calculate the first moment in the u direction, during the second stage of the method the values of $\cos(\phi(u^*))$ are chosen such as to approximate to a linear distribution, as described in equation (32)

$$\cos(\phi(u^*)) \approx mu^* + c \quad (32)$$

Therefore the power P(2) measured during the second stage of the process is given by (33).

$$P(2) \approx K(m^2 a_{1U}^2 + 2mc a_{1U} a_0 + c^2 a_0^2) \quad (33)$$

where $a_{1U}$ is the first moment of the beam distribution in the u direction, as given by (34).

$$a1u = \iint ub(u,v) du\, dv \quad (34)$$

The ratio of the powers measured during the two stages is then given by equation (35)

$$\frac{P(2)}{P(0)} \approx m^2 \left(\frac{a_{1U}}{a_0}\right)^2 + 2mc\frac{a_{1U}}{a_0} + c^2 \quad (35)$$

Given the measured power ratio and the values of m and c as chosen to satisfy the constraints of the method, the quadratic equation given in (35) may be solved to calculate the ratio of the first order moment in the u direction to the zeroth order moment.

The constraints on m and c are such that the actual values of the alternating phase of each column need to be chosen from the available set and such that the total phase excursion across the expected area of the beam remains within the range $[0,\pi]$ or $[-\pi,0]$ so that the $\cos(\phi(u^*))$ term may decrease (or increase) monotonically. In practise a photodiode of finite size will receive power diffracted from the SLM within an angular distribution about the specular direction. A further constraint on the gradient 'm' in equation (32) is such that the side lobes created by the linear amplitude modulation fall outside the area of the photodiode.

Similar methods may be used to take approximate higher-order moments in the u direction, and also first and higher-order moments in the v direction. In the latter case to each row in the block a particular effective amplitude modulation is applied, e.g. by setting adjacent pixels in the row to alternating phases of $+\phi(v^*)$ and $-\phi(v^*)$, where $v^*$ is the position co-ordinate of the row. The second-order moments may also be calculated and used to estimate the beam spot size at the hologram. This estimate can be used as part of the control algorithm for focus adjustment.

In a second embodiment a further linear phase modulation is applied to the hologram during each stage so as to deflect the beam to be measured while taking the moments towards a particular photodiode.

Consider a Gaussian type beam $b(u,v)$ centred at position co-ordinates $(u0,v0)$. The even symmetry of the beam about axes parallel to the u and v directions and through the centre lead to the identities given by equations (36) and (37).

$$\iint (u-u0) b(u,v) du\, dv = 0 \quad (36)$$

$$\iint (v-v0) b(u,v) du\, dv = 0 \quad (37)$$

Hence approximate values of the first order moments measured as described previously, or by some other method, may be used to deduce approximate positions for the beam centres, as shown by equations (38) and (39).

$$u_0 \approx \frac{a_{1U}}{a_0} \quad (38)$$

$$v_0 \approx \frac{a_{1V}}{a_0} \quad (39)$$

In the next stage of the measurement the pixel block initially assigned to the beam is re-assigned such that it is centred within half a pixel in each of the u and v directions from the approximate centre of the beam, as just calculated.

Let the new centre of the pixel block be at (u1,v1). A new hologram should be calculated such that the beam leaving the SLM acts as the product of a beam of uniform phase distribution and an effective amplitude distribution given by equation (40)

$$\cos(\phi(u^*)) \approx m(u^* - u1) \qquad (40)$$

The principle is that if the beam centre lies exactly at u1 the measured power exactly in the specular direction will be zero. Taking into account the finite area of the photodiode the measured power cannot be zero but will be minimised when u1 is within half a pixel pitch of the beam centre.

This new hologram should be applied to the pixel block and the power measured. At this point the method can proceed in two ways.

In one embodiment a further estimate of the beam centre can be calculated, as described previously, a new centre position u1 calculated, the hologram recalculated according to equation (40) and the power measured again. This process can be repeated until the value of u1 appears to have converged.

In a second embodiment the centre of the pixel block, u1 can be re-assigned, the hologram recalculated according to (40) and the power measured again. At the current pixel block centre, u1, for which the beam centre is within half a pixel of u1, the measured power should be at a minimum value.

A further embodiment is to use a suitable combination of these two alternative methods.

The centre of the pixel block in the v direction can be measured using similar methods.

The size of the pixel block used should be chosen so as to cover the expected area of the beam. Outside of this area the phase can be modulated on a checkerboard of, for example, +−pi/2, so that the effective amplitude modulation is zero and the light from these regions is diffracted far away from the photodiode.

It can be shown that equations (36) and (37) are also satisfied if the beam waist is not coincident with the SLM, that is the beam is defocused. Although the method as described above will not be calculating the proper moments of the beam, it can be shown that the position of the beam centre may still be identified using the methods described.

The beam shaping method may be extended to control and adapt the amplitude of the beam steered through the system. If $\phi(u)$ varies from $\psi$ at the centre of the beam to $\pi/2$ at the edges then the real part of the pseudo-amplitude modulation can be considered as $\cos \psi$ multiplied by an ideal beam-shaping function that causes insignificant insertion loss. In which case there is an associated additional insertion loss given by approximately $10 \log_{10} (\cos^2 \psi)$. By varying the value of $\psi$ the beam power can be varied. Therefore the same device can be used to achieve power control, otherwise known as channel equalisation, as well as changing the routing or direction of a beam. Deliberate changes in the beam shaping function can be used to increase the number of 'grey levels' possible for the beam attenuation, i.e. to provide an increased resolution. As for the beam shaping, the rejected power is diffracted out of the system. Therefore this attenuation method does not increase crosstalk.

Another technique for controlling beam power without increasing crosstalk is to deflect the unwanted energy in a direction orthogonal to the fibres susceptible to crosstalk.

This may be combined with yet another technique, namely distorting the beam phase in such a way that much of the energy couples in to the higher-order modes of the fibre, rather than the fundamental mode that carries the signal. The beam phase distortion may alternatively be used alone.

In an embodiment, these methods are achieved by dividing the area of the SLM on which the beam is incident into a set of 'power controlling' stripes. The long side of the stripes are at least substantially in the plane in which the input and output-beam are travelling. By varying the relative phase in the stripes the coupling efficiency into the fundamental mode of the output fibre is changed, and hence the throughput efficiency of the optical system is set. This method can be applied to a pixellated device that is also routing or otherwise adapting a beam. In this case each 'stripe' would contain between one and many of the pixels already in use.

Alternatively the long side of the power controlling stripes could be in one plane in one electrode, with the long side of the routing pixels in an orthogonal direction in the other electrode, of which either the stripe electrodes, or the pixellated electrodes, or both, are transparent.

Alternatively the device acts solely as a beam power controller, or channel equaliser. In this case each stripe could be a single pixel. The set of stripes for each beam defines a block. Many blocks could be placed side by side to form a row of blocks, with each block in the row providing channel equalisation for a different beam. Many rows could also be provided so as to provide channel equalisation for signals coming in on different input fibres.

If a pair of confocal focusing elements is disposed between the output fibre and SLM then the output fibre receives an image of the field at the SLM. In this case the attenuation at the output fibre is governed by the orthogonality between the image and the fundamental mode of the fibre. Assuming, and without loss of generality, that a perfect image is formed such that sharp phase discontinuities are preserved, it may be shown that the coupling efficiency into the fundamental mode is proportional to the square of a sum of weighted integrals. The weight is the modulation $\exp j\phi$ applied by a stripe, and the associated integral is over the area onto which that stripe is imaged. The integrand is positive and depends on the square of the local electric field associated with the fundamental mode. Each integral is represented as a phasor, with a length depending on how much of the fundamental mode power passes through the region onto which the stripe is imaged, and a phasor angle depending on the phase modulation. The net coupling efficiency is given by the magnitude of the vector summation of the individual phasors associated with each stripe. For simple devices it may be advantageous to use as few stripes as possible as this reduces any losses due to dead space between the stripes and reduces the control complexity. With only two stripes of approximately equal area (and hence two phasors of approximately equal length) the possible vector sums lie on a semicircle and hence the number of possible grey levels is equal to the number of phase levels between 0 and $\pi$, which may not be sufficient. Transverse offset of the output fibre with respect to the centre of the image has the effect of making the two phasors unequal and hence complete extinction is not possible. These problems may be overcome by using three or more stripes per hologram. For example with three stripes the loci of vector sums lie on circles centred about the semicircle taking just two of the stripes into consideration. Hence many more values are possible. Increasing the number of stripes increases the number of grey levels and the depth of attenuation.

A fibre spool is used on the output fibre before any splices are encountered. It will clear to those skilled in the art that other mode stripping devices or techniques could be used instead.

This system can also be adaptive: given knowledge of the applied phase by each stripe and enough measurements of the coupling efficiency, the lengths of the different phasors associated with each stripe can be calculated. Given these lengths the performance can be predicted for any other applied phases. Hence suitable algorithms can be included in the SLM or interface to train and adapt the device performance to cater for transverse offset of the output fibre and other misalignments.

Sharp edges or phase discontinuities in this image will be eroded by the optical modulation transfer function (MTF) but, nevertheless, where a sufficient number of stripes is provided it is possible to vary the phase modulation of each and achieve a wide range of attenuation.

Ultimately what limits the depth of attenuation is the residual zero-order due to, for example, an imperfect quarter-wave plate or Fresnel reflections from different surfaces inside the SLM such that the reflected light has not yet been phase-modulated. An example reflection is from the interface between the cover glass and transparent electrode. Such residual zero orders will couple into the output fibre independently of the phase modulation. In many cases the residual zero order will have a different polarisation state to the beam that has been properly processed by the phase modulation, so even adapting the phase modulation will not recover the depth of attenuation.

In such cases it is advantageous to apply some routing to the output fibre, such that the zero order is offset from the output fibre and the intended output beam is steered into a diffraction order of the routing hologram. For a many-pixellated SLM this may be achieved using the standard routing algorithm described earlier. For a simple SLM with few pixels, e.g. the one with the stripes in the plane of the input and output fibres, these stripes can be subdivided in an orthogonal direction, that is to create a 2-D array of pixels. This however increases the device complexity.

An alternative simple device is to combine it with a tip-tilt beam-steering element, as described in Optics Letters, Vol. 19, No 15, Aug. 1, 1994 "Liquid Crystal Prisms For Tip-Tilt Adaptive Optics" G D Love et al. In this case the top 'common electrode' is divided into a set of top electrodes, one for each device, where each device is assumed to receive a separate beam or set of beams. Each top electrode has different voltages applied on two opposite sides. The shape of the top electrode is such that the voltage between the electrodes varies nonlinearly in such a way as to compensate for the non-linearity of the phase vs. applied volts characteristic of the liquid crystal. Hence with all the stripe electrodes at the same voltage the device provides a linear phase ramp acting like a prism and deflecting the phase-modulated beam in a pre-defined direction, such that the residual zero order falls elsewhere, as required. Changing the stripe electrode voltage causes phase changes in the imaged beam but does not prevent the deflection. Small adjustments in the phase ramp can be used to compensate for component misalignments and/or curvature of the SLM substrate and/or wavelength difference from the design wavelength for the tip-tilt device. Such small adjustments in the phase ramp can also be used to achieve fine control over the attenuation. Hence such a device would be useful whether or not the required attenuation is sufficiently strong for the residual zero order to become a problem. Alternatively the top electrode can be divided into two or more areas, with the shape of each so as to compensate for the phase vs. volts non-linearity. Varying the voltage on the ends of each electrode can be used to offset the phase modulation of each stripe in order to create the desired attenuation. In this case the aluminium electrode would be common to the device, removing dead-space effects.

In another embodiment of the tip-tilt device, the top electrode is common to all devices and a shaped transparent electrode is provided, e.g. by deposition, on top of the quarter-wave plate, with connections to the SLM circuitry to either side of the device. In this case the aluminium may act only as a mirror and not as an electrode. Again the shaped transparent electrode may be subdivided into two or more areas to provide the attenuation. This embodiment avoids dead-space effects and also a voltage drop across the quarter-wave plate.

In a further embodiment, such a tip-tilt device has a shaped transparent electrode on both cover glass and quarter-wave plate. The planes of tip-tilt for the two devices may be orthogonal or parallel. With two parallel tip-tilt electrodes the device may act as a power-controlling two-way switch, and also, as will be described later, can be used in a multi-channel add/drop multiplexer. With two orthogonal tip-tilt electrodes the device can beam steer in 2-dimensions such as to correct for positional errors. Either of the two tip-tilt electrodes can be subdivided so as to provide attenuation.

One advantageous SLM is that described in our co-pending patent application EP1053501.

If there is a single focusing element between the output fibre and SLM then the field at the output fibre is the Fourier Transform of the field leaving the SLM. In this case three classes of phase modulation can be used to change the coupling efficiency into the output fibre. The first two classes assume a many-pixellated SLM while the third class assumes a few-pixel SLM with or without tip-tilt features as described earlier. In the third class the tip-tilt feature may be used to compensate for transverse positional errors in the input and output fibre.

The different classes of phase modulation result in a variable coupling efficiency at the output fibres using the following methods:

As noted above, the first class uses a many-pixellated SLM. A periodic phase modulation is applied that creates a set of closely spaced diffraction orders at the output fibre. The spacing is comparable to the fibre mode spot size such that there is significant interference between the tails of adjacent diffraction orders. The phases of these diffraction orders are chosen such that the resulting superposition is rapidly alternating in phase and therefore couples into the higher-order fibre modes. Varying the strength, phase and position of each diffraction order changes the attenuation. If the long sides of the stripes used to create this alternating output field are in the plane of the input and output fibres, then diffraction orders landing outside the target optical fibre fall along a line orthogonal to the output fibre array, and therefore do not cause crosstalk.

In the second class, again using a many-pixellated SLM, a non-periodic smoothly varying non-linear phase modulation is applied at the SLM, in this case the SLM acts as a diffractive lens such that the beam is defocused and couples into higher-order modes.

In the third class, which uses a simple SLM with few pixels, the pixels are used to apply phase distortion across the beam incident on the SLM. Such phase modulation can be considered to be equivalent to the first class but with a long period. The phase distortion at the SLM results in amplitude and phase distortion in the reflected beam and hence reduces the coupling efficiency into the output fibre.

Again, all three methods require use of a mode stripper on the output fibre. Again suitable algorithms can be included in the SLM or interface to train the system.

Another embodiment, not illustrated, uses a graded-index (GRIN) lens secured to one face of an SLM, and having input and output fibres directed on or attached to the opposite face. The SLM may provide selective attenuation, and/or may selectively route between respective input fibres and selected output fibres. A requirement for stable performance is fundamental for optical devices used in communications and like fields. One of the dominant manufacturing costs for such optical devices is device packaging. The GRIN lens architecture results in a compact packaged device resilient to vibrations. However, the architecture can have problems with spherical aberration and problems in achieving the required alignment accuracy. In particular there is often a requirement for precise transverse positioning of the fibres. Also due to manufacturing tolerances in the GRIN lens the focused spot in the reflected beam can be offset significantly in the longitudinal direction from the end face of the output fibre, resulting in an insertion loss penalty. This problem gets worse the longer the GRIN lens. Applying selected non-linear phase modulation to the SLM may compensate for problems such as focus errors, length errors, longitudinal positional errors and spherical aberration. Applying selected linear phase modulation to the SLM and/or using tip-tilt electrodes may compensate for problems such as transverse positional errors.

Optical systems using SLMs may individually process the channels from an ensemble of channels on different wavelengths, entering the system as a multiplex of signals in a common beam. Given a continuous array of pixels the SLM may also process noise between the channels. Hence the optical system acts as a multiwavelength optical processor. The processing may include measurement of the characteristics of the signals and accompanying noise as well as routing, filtering and attenuation.

In a first application, the SLMs carry out attenuation, known in this context as channel equalisation. A second application is a channel controller. A third application is an optical monitor. A fourth application is an optical test set. A fifth application is add/drop multiplexing. Further applications are reconfigurable wavelength demultiplexers and finally modular routing nodes. In all of these applications the SLMs may carry out routing and/or power control and/or beam shaping and/or sampling and/or corrective functions as described earlier. The system to be described is not restricted to this set of seven applications but is a general multi-wavelength system architecture for distributing the wavelength spectrum from one or more inputs across an array of devices and recombining the processed spectrum onto one or more selected outputs.

The inputs and outputs may be to and from optical networking equipment such as transmission systems, transmitter line cards and receiver line cards. Alternatively the inputs may be from one or more local optical sources used as part of a test set: either via an intermediate optical fibre or emitting directly into the optical system. The outputs may be to one or more local photo detectors for use in testing and monitoring. Applications outside the field of communications are also possible such as spectroscopy.

Such multi-wavelength architectures can be adaptations of optical architectures used for wavelength de-multiplexing. Wavelength demultiplexers typically have a single input port and many output ports. These can use one or more blazed diffraction gratings: either in free-space or in integrated form such as an AWG (Arrayed Waveguide Grating). These devices are reciprocal and hence work in reverse. Hence if a signal of the appropriate wavelength is injected into the output port it will emerge from the input port. The output port usually consists of an optical waveguide or fibre with an accepting end that receives a focused beam from the optical system and a delivery end providing an external connection. Now consider replacing the acceptance end of the output waveguide/fibre with a reflective SLM: all of the processed signals reflected straight back will couple into the input fibre and emerge from the input port. These signals can be separated from the input signal with a circulator. Alternatively the system is adapted so that the reflected signals emerge and are collected together into a different fibre.

Free-space optical systems performing wavelength de-multiplexing can use diffraction gratings made by ruling, or from a master, or made holographically, or by etching. Usually these work in reflection but some can work in transmission. One or two gratings can be used in the system. The optics used to focus the beams can be based on refractive elements such as lenses or reflective elements such as mirrors or a combination of the two.

Figure 12:
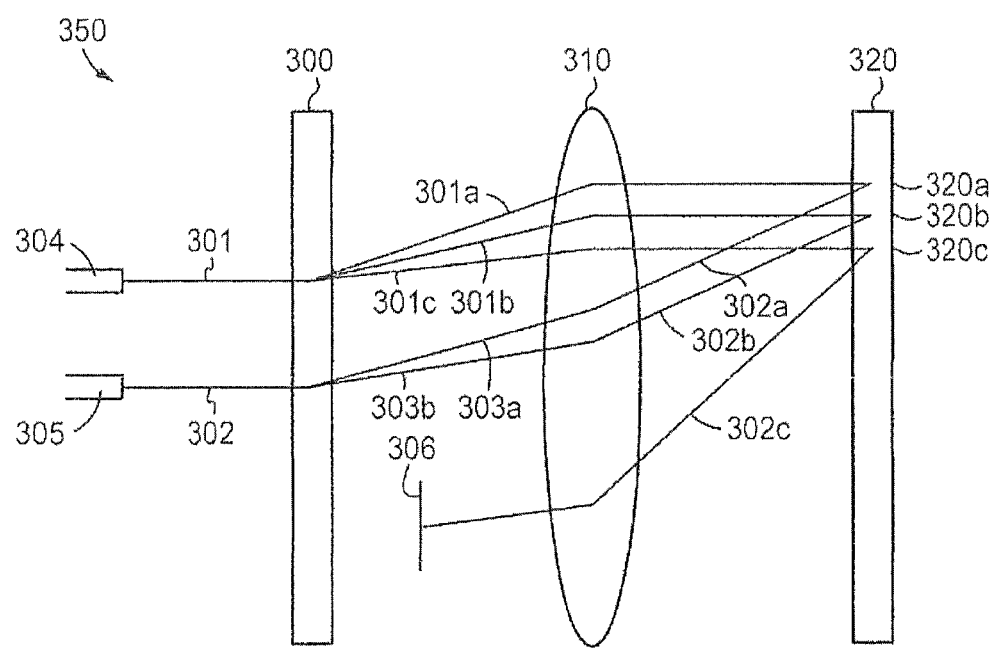
FIG. 12 shows a partial block diagram of a system enabling beams of different wavelength from a composite input beam to be separately controlled before recombination.

Referring to FIG. 12, a channel equaliser 350 has a single grating 300 used with a refractive focusing element 310 and an SLM 320. To make the diagram clearer, the grating 300 is drawn as working in transmission. Other embodiments use two gratings and/or reflective focusing elements and/or gratings that work in reflection, such as blazed gratings.

A first input beam 301 from an input port 304 contains an ensemble of channels at different wavelengths entering the equaliser on the same input port 304. As a result of the grating 300 the beam 301 is split into separate beams 301a, 301b, 301c for each wavelength channel, each travelling in a different direction governed by the grating equation. The grating 300 is positioned in the input focal plane of a main routing lens 310 with a reflective SLM 320 at the output focal plane of the routing lens 310. If desired, there may also be a field-flattening lens just in front of the SLM 320.

If lens 310 were an ideal lens, rays passing through the same point on the focal plane of the lens, regardless of direction provided they are incident on the lens, emerge mutually parallel from the lens. As lens 310 is not a real lens, this is no longer strictly true: however well-known lens design techniques can be applied to make it true over the required spatial window.

Hence, the beams 301a, 301b, 301c that were incident upon the lens 310 from the same point on the focal plane, but at different angular orientations, emerge mutually parallel from the routing lens 310, but spatially separate. Thus, the lens refracts each beam to a different transverse position 320a, 320b, 320c on the SLM 320. At each position the SLM 320 displays a pixellated hologram and/or has a tip-tilt device for processing the relevant wavelength component of the beam. In the preferred embodiment, the SIM 320 is a continuous pixel array of phase-modulating elements and is polarisation independent. The width of each hologram or tip/tilt device compared to the spot size of the incident beam incident is sufficient to avoid clipping effects. Instead, or additionally, beam shaping may be used. The device may be controlled to deflect or attenuate the beam as described earlier, and provides output processed beams 302a, 302b, 302c. Beams 302a and 302b have moderate channel equalisation applied by a power control hologram and routing towards the output port 305 applied by a routing hologram. As explained previously it is advantageous to use a routing hologram as it deflects the beams from their specular output direction and hence increases the available depth of attenuation. Beam 302c has strong attenuation applied in order to "block" the channel: this is achieved by selecting holograms that direct the light well away from the output port 305 towards, for example, an optical absorber 306. The processed beams are reflected back from the SLM 320 towards the main lens 310 and then refracted back by the main lens towards the diffraction grating 300. Assuming the SLM 320 is flat, all beams subjected to the same deflection at the SLM 320 and entering the system in the same common input beam emerge mutually parallel from the diffraction grating. Curvature of the SLM 320 is compensated by small changes in the deflection angle achieved due to the holograms displayed on the SLM 320. As the light beams 302a, 302b emerge parallel from the SLM 320 they are refracted by the lens 310 to beams 303a, 303b propagating towards a common point in the grating 300, which (having the same grating equation across the whole area of concern) diffracts the beams to provide a single output beam 302. Note that due to the action of the lens, beam 303a is parallel (but in the opposite direction) to beam 301a and beam 303b is parallel (but in the opposite direction) to beam 301b. Therefore all beams subjected to the same eventual output angle from the SLM 320 are collected into the same output port 305. Hence a system may be constructed with a single input port 304 and a single output port 305 that produces independent attenuation or level equalisation for each wavelength channel. Note that to obtain the same deflection angle for all wavelength channels, as required, the effective length of the hologram phase ramp, $\Omega/m$, where m is the mode number of the excited diffraction order and $\Omega$ is the hologram period, should be adjusted in proportion to the channel wavelength. That is the wavelength dependence of the beam deflection should be suppressed.

As described later the channel equalisation can be uniform across each channel so as to provide the required compensation as measured at the centre of each channel Alternatively the channel equalisation can vary across each channel, so as to compensate for effects such as amplifier gain tilt that become important at higher bit rates such as 40 Gb/s. Channels may be blocked as described earlier so as to apply policing to remote transmitters that renege on their access agreements or whose lasing wavelength has drifted too far. Furthermore the noise between selected channels may be partially or completely filtered out, as described later. Hence in a second application the multiwavelength optical processor acts as a channel controller.

Although such processing can be applied using conventional optics the multiwavelength optical processor has a number of advantages. Compared to a series of reconfigurable optical filters the multiwavelength processor has the advantage that the channels are processed by independent blocks of pixels. Hence reconfiguration of the processing applied to one or more selected channels does not cause transient effects on the other channels. Compared to a parallel optical architecture that separates the channels onto individual waveguides/fibres before delivery to a processing device (and hence avoids the transient effects) the multiwavelength optical processor has a number of advantages. Firstly it can process the whole spectrum entering the processor (subject to the grating spectral response). Secondly the filter passband width is reconfigurable and can be as much as the entire spectrum, reducing concatenation effects that occur when filtering apart sets of channels routed in the same direction. Thirdly the filter centre frequencies are reconfigurable. Further advantages are discussed later in this application.

By having a choice of two or more deflection angles at the SLM every input channel may be routed independently to one of two or more output ports. There may also be two or more input ports. It may be shown that for one or more parallel input beams, the action of the grating and main routing lens is such that all channels at the same wavelength but from different input ports are incident at the same transverse position at the SLM. Again this is because "parallel rays converge to the same point". Hence these channels at the same wavelength are incident on the same channel processing hologram and/or tip-tilt device. As every wavelength channel is incident on a different device, the device response may be optimised for that particular wavelength. For example if a pixellated SLM is used the deflection angle is proportional to the wavelength. Hence small adjustments in the phase ramp can be used to adjust the deflection angle to suit the wavelength to be routed. All channels incident on a particular transverse position on the SLM must be reflected from that same position. As this position is in the focal plane of the lens beams from said position will emerge parallel from the lens and travelling towards the grating. After the grating the beams will be diffracted (according to their wavelength). It may be shown that all beams entering the system in a parallel direction will emerge from the system in exactly the opposite direction. It may also be shown that all beams subject to the same output angle from the SLM will emerge coincident from the system and may therefore be collected into the same port.

Analysis of the beams at the diffraction grating in this architecture shows that the spot size required for a given wavelength channel separation and beam clipping factor C at the hologram depends on the grating dispersion but does not depend on the routing lens focal length nor the number of output ports. The beam centres must be far enough apart to provide adequate crosstalk suppression. Hence the greater the number of output beams the further the beam must be steered by the SLM and lens. As an example consider just routing in 1-D, into the m'th diffraction order with a hologram period, $\Omega$ and a routing lens of focal length f. The output beam at the diffraction grating will be offset from its zero order reflection by a distance given approximately by $f \cdot m \cdot \lambda/\Omega$, where $\lambda$, is the optical wavelength and $\Omega/m$ is the effective length of the phase ramp on the hologram (as explained previously). To increase this offset distance the length of the phase ramp can be reduced, which tends to require smaller pixels, or the lens focal length can be increased. In practice there is a lower limit to the pixel size set by the dead space losses and the size of the pixel drive circuits, while increasing the lens focal length makes the overall system longer. This can be a particular problem when there are many output ports, even when close-packing 2-D geometries are used for the output beams.

Figure 14:
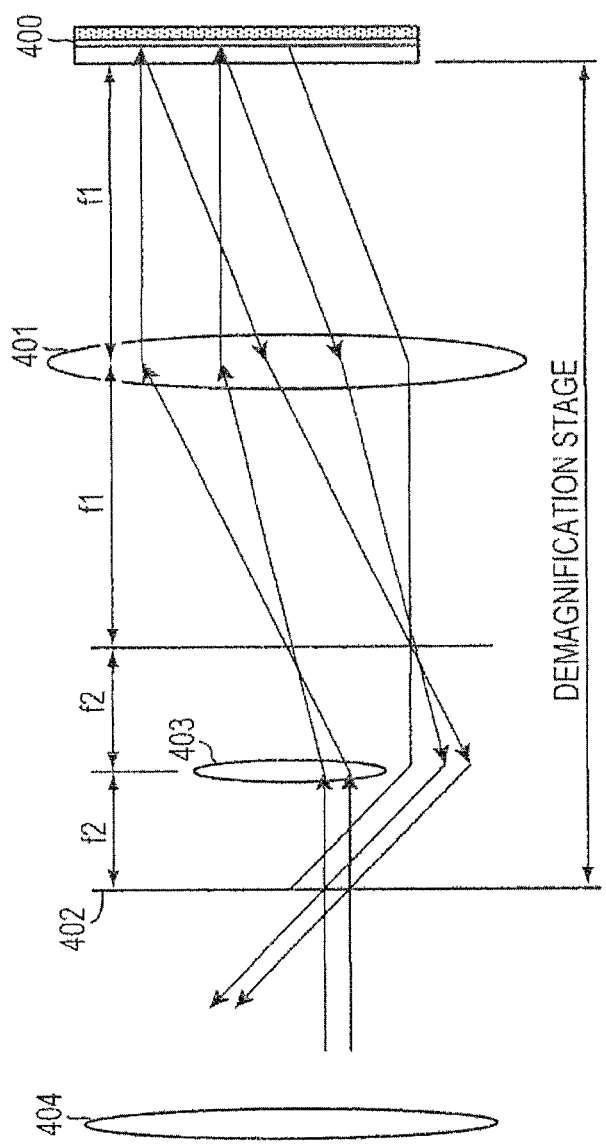
FIG. 14 is a diagram similar to FIG. 12 but showing a magnification stage for increasing the effective beam deflection angle.

Referring to FIG. 14, another method is to put a demagnification stage between the SLM 400 and a routing lens 404. This is positioned so that the SLM 400 is in the object plane of the demagnification stage while the image plane of the demagnification stage 402 is where the SLM would otherwise be, that is in the focal plane of the routing lens 404. What appears in this image plane is a demagnified image of the SLM 400, which therefore acts like a virtual SLM 402 with pixels smaller than those of the real SLM 400 and hence a shorter effective phase ramp length. As an example consider the two lens confocal magnification stage shown in FIG. 14. In FIG. 14 f1 is the focal length of the first lens 401 and f2 is the focal length of the second lens 403 (closer to the virtual SLM). The demagnification is f2/f1 while the beam-steering deflection angle is magnified by f1/f2.

While this method for increasing the effective beam deflection angle has been described and illustrated in the context of one particular routing architecture it could also be applied to other optical architectures using SLMs to process an optical beam, for routing and other applications. The operating principle is that the virtual SLM 402 has an effective pixel size and hence an effective phase distribution that is smaller in spatial extent than that of the real SLM 400, by an amount equal to the demagnification ratio of the optics. The off-axis aberrations that occur in demagnification stages can be compensated using any of the methods described in this application or known to those skilled in the art.

In an alternative embodiment the input beam or input beams contain bands of channels, each incident on their own device. In this and the previous embodiment for the channel equaliser the beam deflection or channel equalisation may vary discontinuously with wavelength.

In a third embodiment the input beam could contain one or more signals spread almost continuously across the wavelength range. The light at a particular wavelength will be incident over a small transverse region of the SLM, with, typically a Gaussian type spatial distribution of energy against position. The position of the peak in the spatial distribution is wavelength dependent and may be calculated from the grating and lens properties. For such a system the beam deflection or channel equalisation varies continuously with wavelength. The pixellated SLM is divided into blocks, each characterised by a 'central wavelength', defined by the wavelength whose spatial peak lands in the middle of the block. A particular channel equalisation or beam deflection is applied uniformly across this block. Light of a wavelength with a spatial peak landing in between the centres of two blocks will see a system response averaged across the two blocks. As the spatial peak moves towards the centre of one block the system response will become closer to that of the central wavelength for the block. Hence a continuous wavelength response is obtained. The block size is selected with respect to the spatial width of each beam in order to optimise the system response. This method is particularly attractive for increasing the wavelength range of a 1 to N switch.

To achieve this aim the multi-wavelength architecture described earlier, should be configured so as to allow reconfigurable routing from a single input port to one of a set of multiple output ports. The length of the phase ramp used to route the beam to each output port should vary slowly across the SLM such that the wavelength variation in the deflection angle is minimised, or certainly reduced considerably compared to the case for which the phase ramp length is uniform across the SLM. Hence the transverse position of each output beam will vary considerably less with wavelength, with a consequent reduction in the wavelength dependence of the coupling efficiency at the system output. Alternatively, the length of the phase ramp can be varied spatially so as to obtain some desired wavelength dependence in the coupling efficiency.

The efficiency of a blazed diffraction grating is usually different for light polarised parallel or perpendicular to the grating fringes. In the multi-wavelength systems described above the effect of the quarter-wave plate inside the SLM is such that light initially polarised parallel to the grating fringes before the first reflection from the blazed grating is polarised perpendicular to the grating fringes on the second reflection from the blazed grating. Similarly the light initially polarised perpendicular to the grating fringes before the first reflection from the blazed grating is polarised parallel to the grating fringes on the second reflection from the blazed grating. Hence, in this architecture, the quarter-wave plate substantially removes the polarisation dependence of the double pass from the blazed grating, as well as that of the phase modulation. As is clear to those skilled in the art, this polarisation independence requires the fast and slow axes of the integrated quarter-wave plate to have a particular orientation with respect to the grating fringes. This required orientation is such that the integrated quarter-wave plate exchanges the polarisation components originally parallel and perpendicular to the grating fringes.

Figure 28:
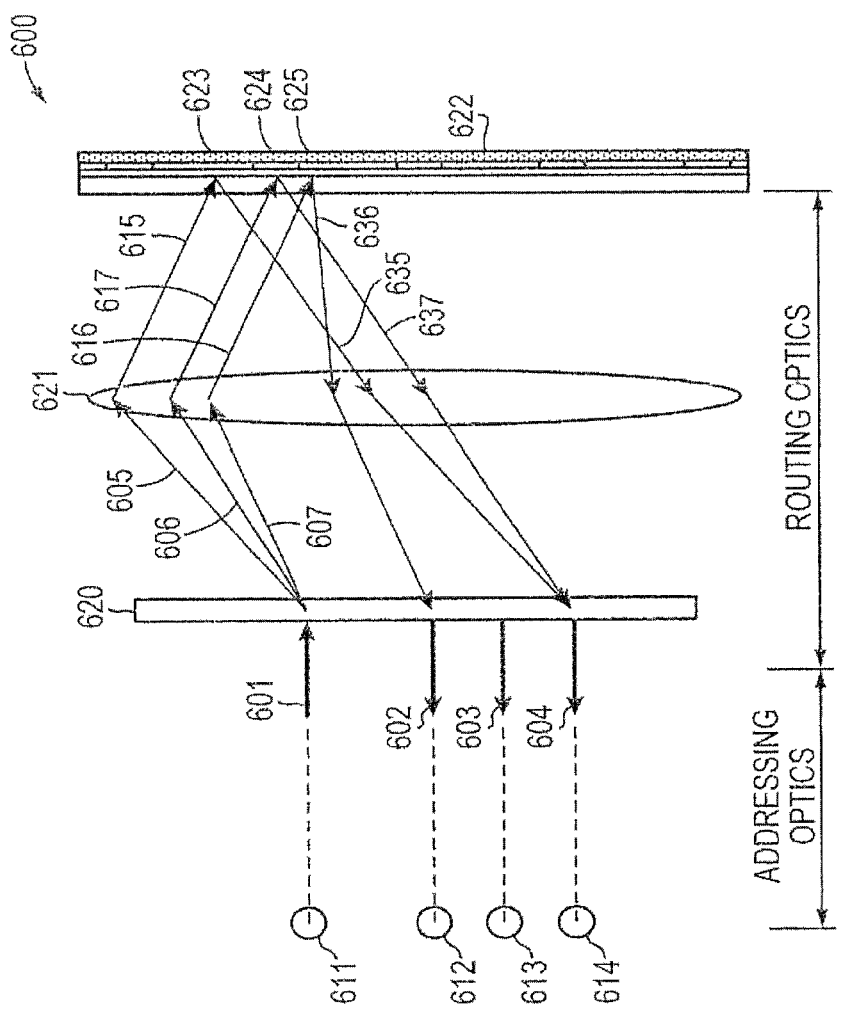
FIG. 28 shows a schematic layout of a wavelength filter device.

Referring to FIG. 28 a wavelength routing and selection device 600 is shown. This device has a multiwavelength input 601 from an input port 611, and provides three outputs 602, 603, 604 at output ports 612-614.

The device 600, similar to the device of FIG. 12, has a grating 620, a lens 621 and an SLM 622, with the disposition of the devices being such that the grating 620 and SLM 622 are in respective focal planes of the lens 621. Again the grating is shown as transmissive, although a reflective grating 620, such as a blazed grating, would be possible. Equally, the SLM 622 is shown as reflective and instead a transmissive SLM 622 could be used where appropriate.

The grating 620 splits the incoming beam 601 to provide three single wavelength emergent beams 605, 606, 607 each angularly offset by a different amount, and incident on the lens 621. The lens refracts the beams so that they emerge from the lens mutually parallel as beams 615, 616, 617. Each of the beams 615, 616, 617 is incident upon a respective group of pixels 623, 624, 625 on the SLM 622. The groups of pixels display respective holograms which each provide a different deviation from the specular direction to provide reflected beams 635, 636 and 637. The beams 635, 636, 637 are incident upon the lens 621 and routed back to the grating 620.

In the embodiment shown, the beams 605 and 606 are finally routed together to output port 614 and the beam 607 is routed to output port 612. No light is routed to port 613.

However it will be understood that by careful selection of the holograms, the light can be routed and combined as required. It would be possible to route light of a selected frequency right out of the system if needed so as to extinguish or "block" that wavelength channel. It is also envisaged that holograms be provided which provide only a reduced amount of light to a given output port, the remaining light being "grounded", and that holograms may be provided to multicast particular frequencies into two or more output ports.

Although the number of output ports shown is three, additional output ports can be included: with appropriate lens design the insertion loss varies weakly with the number of output ports. Although the output ports are shown in the same plane as the input it will be clear to those skilled in the art that a 2-D distribution of output ports is possible.

Hence the device 600 provides the functions of wavelength demultiplexing, routing, multiplexing, channel equalisation and channel blocking in a single subsystem or module. These operations are carried out independently and in parallel on all channels. Reconfiguration of one channel may be performed without significant long-term or transient effects on other channels, as occurs in serial filter architectures. With most conventional optics (including parallel architectures) separate modules would be required for demultiplexing, routing, multiplexing and the power control functions. This adds the overheads of fibre interconnection between each module, separate power supplies, and a yield that decreases with the number of modules. The device 600 has no internal fibre connections, and a single active element requiring power—the SLM. Each active processing operation (routing, power control, monitoring etc) requires an associated hologram pattern to be applied by the controller but may be carried out by the same SLM, hence the yield does not decrease with increased functionality. Although integrated optical circuits can be made that combine different functions, in general they require a separate device inside the optical chip to perform each function. Again the power (dissipation) and the yield worsen with increased functionality.

Further applications of the multiwavelength optical processor are as an optical performance monitor, and as a programmable multifunction optical test set. In both applications the SLM may perform two or more different but concurrent monitoring or testing functions on two or more portions of the wavelength spectrum. This may be achieved by applying routing holograms to the pixel block associated with said portions of the wavelength spectrum that connect optically a selected input fibre or input optical source to a selected output fibre or output detector. The routing hologram applied to each portion of the spectrum may be reconfigured as required in order to perform different testing or monitoring functions on said portion of the spectrum. To each output photo detector or to each input optical source is applied control circuitry for carrying out the required tests.

Considering firstly the performance monitor, the method described later to measure the centre wavelength of a channel may be applied to a selected channel in order to monitor the lasing wavelength. Earlier in this application there is a description of how to measure the second order moments of a beam. Consider orthogonal axes u and v at the SLM. Choose the orientation of these axes such that all wavelength channels entering the system and incident on the grating in the defined parallel direction have the centres of their associated beams along a line of constant v. Hence the position along the u axis increases with wavelength. The second order moment in the v direction is related to the spot size of a monochromatic beam. The second order moment in the u direction is related to this spot size and also the wavelength distribution of the energy in each channel. Hence by measuring second order moments, as described previously, an estimate of the channel bandwidth may be obtained. The noise power between a selected pair of channels may be measured by routing that part of the spectrum between the channels towards a photo detector. Similarly the power of a selected channel may be measured by routing towards a photo detector. One or more photo detectors may be assigned to each type of measurement is allowing many parallel tests to proceed independently on different portions of the spectrum. Alternatively the control circuitry associated with each photo detector output may be designed to be able to perform two or more of the required monitor functions.

Hence the multiwavelength optical processor acts as an optical spectrum analyser with integrated parallel data processing. Conventional methods for achieving this use either a grating that is rotated mechanically to measure different portions of the spectrum with a photo detector in a fixed position, or a fixed grating with a linear photodiode array. In both cases data acquisition hardware and software and data processing are used to extract the required information from the measured spectrum. Both systems are expensive and require stabilisation against the effects of thermal expansion. The multiwavelength optical processor has no moving parts, can use as few as a single photodiode, and can adapt the holograms to compensate for temperature changes, ageing, aberrations as described previously in this application. The multiwavelength processor also carries out the data processing to measure centre wavelength and channel bandwidth in the optical domain. When used in a communications network the optical performance monitor would pass the processed data from the measurements to a channel controller, such as the one described previously, and also to a network management system. The signal for monitoring would be tapped out from a monitor port at the channel controller or from a routing system or from elsewhere in the network. The monitor processing could be implemented with the same or a different SLM to the channel controller. Monitor processing can also be implemented with the same or different SLMs used to route beams in the add drop routers and routing modules described later in this application. The control electronics for the monitor processing can be integrated with the control electronics for the pixel array.

Figure 30:
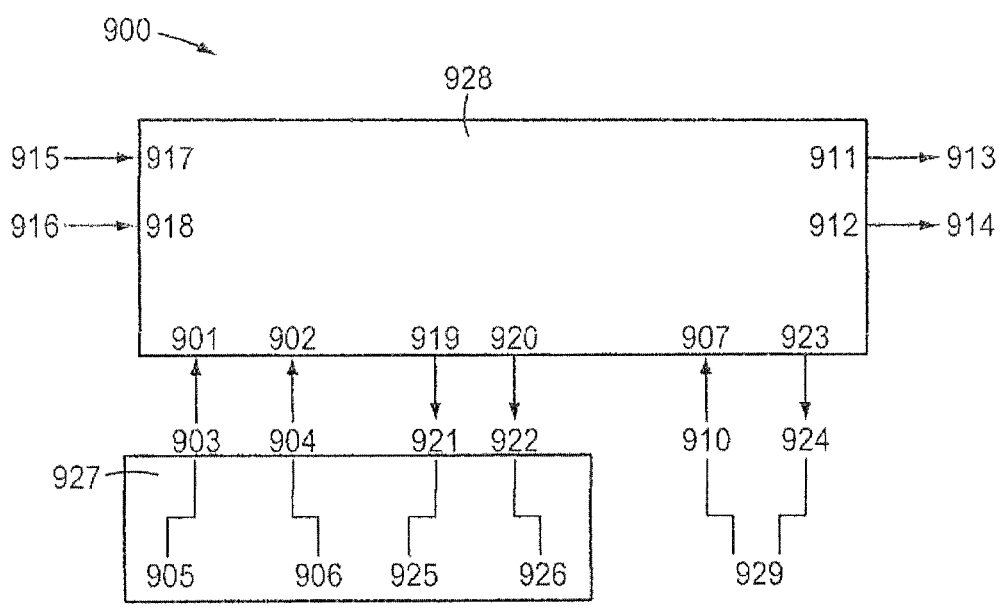
FIG. 30 shows a block diagram of an optical test set.

With reference to FIG. 30, the programmable multifunction optical test set 900 has a multiwavelength optical processor 928 with one or more inputs 901, 902 from optical sources, 903, 904 each with control circuitry 905, 906 for performing one or more tests of optical performance. The channel equalisation and blocking functions described earlier may be used to adapt the spectrum of the selected source to suit a particular test. The channel filtering functions described later may be used to synthesise a comb or some other complex wavelength spectrum from a selected broadband optical source. A further input 907 from an optical source 910 may be used to exchange data and control information from control and communications software 929 with the same 900 or one or more other optical test sets, allowing remote operation over the fibre under test, or some other fibre. One or more outputs ports 911, 912 from the multiwavelength optical processor are connected to a set of optical fibre transmission systems (or other devices) 913, 914 to be tested. Routing holograms are applied to the pixels associated with the selected parts of the spectrum to direct said parts of the spectrum or said data and control information to the selected output port. A further or the same multiwavelength optical processor has input ports 917, 918 connected to the set of optical fibre transmission systems (or other devices) 915, 916 under test and output ports 919, 920 connected to a set of one or more photo detectors, 921, 922 each with associated control circuitry 925, 926 for carrying out testing functions. A further photo detector 924 connected to a further output port 923 is used to receive data and control information from one or more other test sets. Routing holograms are applied to direct the signals from the selected input port to the required photo detector. The optical monitor functions described above can be applied to the signals. The frequency shaping of the source or spectrum can take place at the transmitting test set or the receiving test set. The control electronics for the test set 927 and control and communications software 929 can be integrated with the control electronics for the pixel array.

Conventionally, different optical sources would be used to perform different types of test on the wavelength and transmission properties of fibres or devices under test; a separate optical switch would be used to poll the devices under test, and an external communications link would be used for communication of data and control information with a remote test set. However, the multiwavelength optical processor may be used to provide a multifunction programmable optical test set that is capable of remote operation. The test set may include as few as a single source and a single photo detector and performs a wide range of tests on fibres or devices selected from a group of fibres or devices attached to the test ports of the multiwavelength processor.

A multiwavelength system with two inputs and two outputs can work as an add/drop multiplexer. Add-drop multiplexers are usually used in ring topologies, with the 'main' traffic travelling between the ring nodes, and 'local' traffic being added and dropped at each node. Considering each node, one input (main in) is for the ensemble of channels that has travelled from the 'previous' routing node. The second input (add) is for the ensemble of channels to be added into the ring network at the add/drop node. One output (main out) is for the ensemble of channels travelling to the 'next' routing node while the second output (drop) is for the ensemble of channels to be dropped out of the ring network at the node. If a particular incoming wavelength channel is not to be 'dropped' at the node, then the channel-dedicated device at the SLM should be configured to route the incoming wavelength from the main input to the main output. However, if a particular incoming wavelength channel is to be dropped, then the channel-dedicated device at the SLM should be configured to route the incoming wavelength from the main input to the drop output. In this case the main output now has available capacity for an added channel at that same wavelength. Therefore the channel-dedicated device at the SLM should also be configured to route the incoming wavelength from the add input to the main output.

The multiwavelength optical processor described in this application distributes wavelength channels across and collects the wavelength channels from a single SLM, allowing the SLM to provide a set of one or more processing operations to each of the channels. However, in most conventional reconfigurable add drop multiplexers, the routing has to be carried out in two successive stages. Usually a first 1*2 switching stage either drops the channel or routes the channel through, while a second 2*1 switching stage either receives the through channel from the first stage or receives an added channel. Fortunately, careful choice of the deflection angles applied by the SLM, and the sharing of the same hologram by input signals at the same wavelength, allows add drop routing to be carried out in a single stage. Hence add drop routing may be conveniently applied in an independent and reconfigurable manner to every wavelength channel in the multiwavelength optical processor.

Figure 13A:
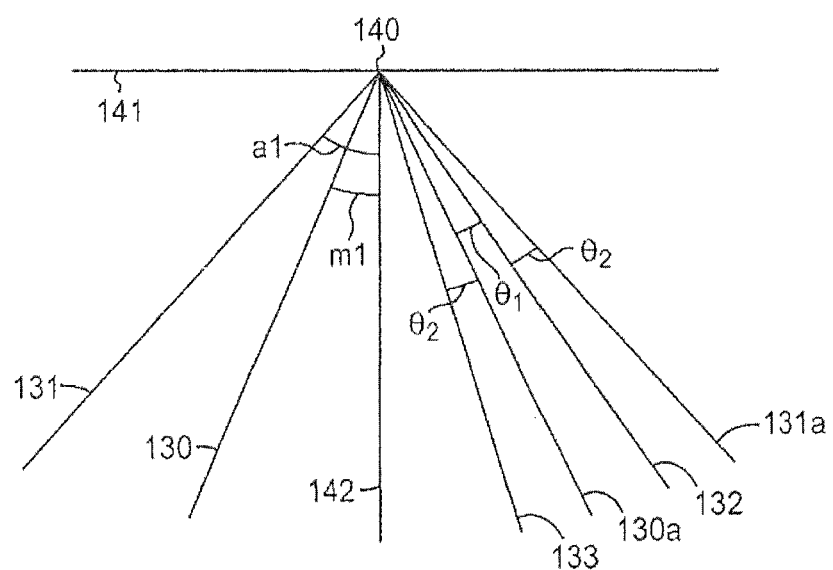
FIGS. 13a and 13b show schematic diagrams of an add/drop multiplexer using an SLM assuming 1-D routing.

An explanatory diagram is shown in FIG. 13a.

Referring now to FIG. 13a, an SLM 141, used in the context of the multi-wavelength architecture, has a pixel block 140 and/or tip-tilt device upon which a main input beam 130 is incident, at an angle m1 to the normal 142. The main beam has a zero order or specular reflection 130a. Holograms are made available that will cause deflections at $+\theta_1$ to the specular direction and $-\theta_2$ to the specular direction. Due to the display of a first hologram on the pixel block 140, the main output is deflected by $+\theta_1$ from the specular direction to a main output beam 132. An add input 131 is incident at an angle a1 on the block 140, and produces a zero order reflection 131a. The device also has a drop output beam direction 133.

When the hologram applying the deflection of $+\theta_1$ is displayed, light at the relevant wavelength entering in the add direction 131 is not steered into either of the main output beam direction 132 or the drop output beam direction 133. Effectively it is 'grounded'. This feature may be used to help to stop crosstalk passing between and around rings.

When the hologram applying the alternative deflection of $+\theta_2$ is applied, the add input is routed to the main output beam direction 132 while the main input is routed to the drop output beam direction 133.

Figure 13B:
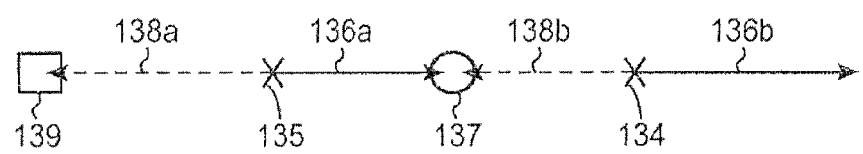

In the interests of clarity, a simplified diagram may be used to explain an add-drop using 1-D routing. This is shown in FIG. 13b in which the point 134 represents the output position of the specular reflection from the add input while the point 135 represents the output position of the specular reflection from the main input. When a first routing hologram is applied the main output beam is deflected by an angle of $+\theta_1$ and therefore the output position of the main beam is deflected by an offset of $f \cdot \theta_1$, compared to the output position 135 of its specular reflection. Here f is the focal length of the routing lens. In FIG. 13b this deflection is represented as a vector 136a and the output beam is routed to the main output 137. The beam from the add input is subject to the same angular deflection with respect to its specular reflection and is thus deflected by a vector of equal length and the same direction 136b with no output port to receive it this beam is "grounded".

When a second routing hologram is applied the main output beam is deflected in the opposite direction by a vector 138a to arrive at a drop output 139. The beam from the add input is deflected by an identical vector 138b to arrive at the main output 137.

Figure 15:
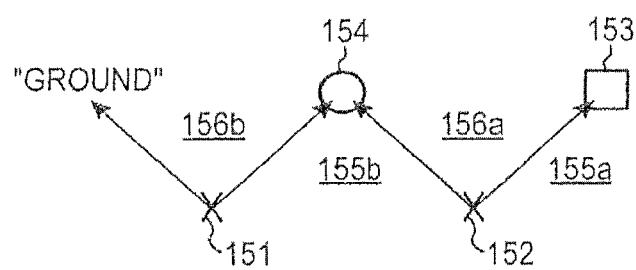
FIG. 15 shows a vector diagram of the operation of an add/drop multiplexer.

The example in FIG. 13a assumes 1-D routing due to the hologram. Given an ability to route in 2-D, either with two orthogonal tip-tilt electrodes or a 2-D pixel array (as described previously) the arrangement of the four ports can be generalised, as shown in FIG. 15. The use of 2-D routing allows closer packing of the input and output beams reducing off-axis aberrations. In FIG. 15 the output positions are shown in 2-D. The point 151 represents the output position of the zero order (specular) reflection from the add input while the point 152 represents the output position of the zero-order reflection from the main input. The hologram deflections are represented as vectors 155a, 155b, 156a and 156b. Vector 155b has the same length and direction as vector 155a and vector 156b has the same length and direction as vector 156a. When a first routing hologram is applied the add input beam is deflected from its specular output position 151 by the vector 155b to the main output 154 while the main input is deflected from its specular output position 152 by the identical vector 155a to the drop output 153. When the alternate routing hologram is applied the main input is deflected from its specular output position 152 by the vector 156a to the main output 154 while the add input is again 'grounded' due to deflection by the identical vector 156b.

In this general configuration there are six variables. These are the output positions of the main output and drop output, the positions of the zero order reflections from the main input and add input, and the two hologram deflections. Of these six variables only three are mutually independent.

For example, selection of the input position for the main input with respect to the routing lens axis defines the output position of the zero order reflection, 152. If this is followed by selection of the output positions for the main and drop outputs with respect to the routing lens axis then all three independent variables have been defined. Hence the required hologram deflections are determined as is the input position for the add input with respect to the routing lens axis (which then defines 151).

Figure 29:
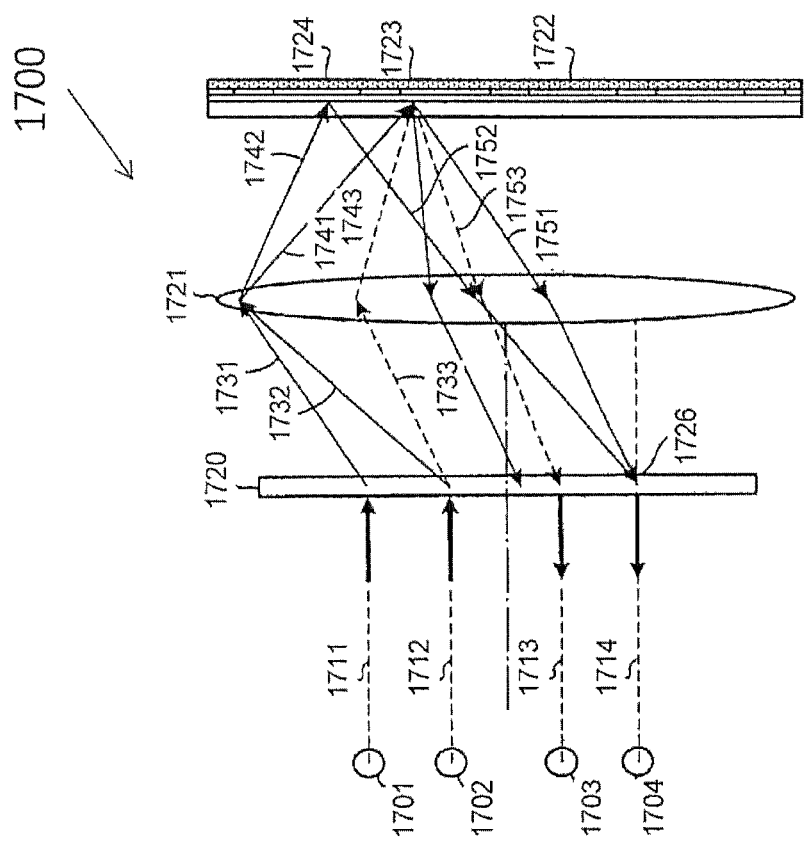
FIG. 29 shows a schematic layout of an add/drop device.

FIGS. 13a, 13b and 15 show the hologram deflections required to provide add-drop routing: FIGS. 13a and 13b assume 1-D routing while FIG. 15 assumes 2-D routing. A multiwavelength add-drop architecture using such hologram deflections is shown in FIG. 29. Compared to other methods for achieving add-drop functionality, the advantages are as described previously for FIG. 28.

Turning now to FIG. 29, an add/drop multiplexer device 1700 has two input ports 1701, 1702 and two output ports 1703,1704. The first input port 1701 is for an input beam 1711 termed "add" and the second input port 1702 is for a second input beam 1712 termed "main in" having two frequencies in this embodiment. The first output port 1703 is for a first output beam 1713 termed "drop" and the second output port 1704 is for a second output beam 1714 termed "main out".

The input beams 1711, 1712 are incident upon a grating 1720 that deflects the beams according to wavelength to provide emergent beams 1731, 1732 and 1733. The emergent beams 1731, 1732 and 1733 are incident upon a lens 1722 having its focal plane at the grating 1720, and the beams emerge from the lens respectively as beams 1741, 1742, and 1743 to be incident upon an SLM 1722 in the other focal plane of the lens 1721. As the beams 1741, 1742 do not originate on the grating 1720 from the same location, they are not mutually parallel when emerging from the lens 1721. The beam 1743 is from a point on the grating 1720 common to the origin on the grating 1720 of beam 1742, and hence these beams are mutually parallel. Although the grating is drawn as transmissive and the SLM as reflective, these types are arbitrary.

The first beam 1731 and the third beam 1733 are at the same wavelength, hence they emerge parallel from the grating 1720 and are refracted by the lens 1721 propagating as beams 1741 and 1743 respectively to a first group or block of pixels 1723 on the SLM 1722. This pixel block 1723 applies the required hologram pattern that routes a channel entering the add port 1701 to the main output 1704, and also routes a channel entering the main input 1702 to the drop port 1703. Hence the first group of pixels 1723 deflects the first beam 1741 to provide first reflected beam 1751, and deflects the third beam 1743 to provide third reflected beam 1753.

The second beam 1732 is at a different wavelength to the first and third beams 1731 and 1733 and therefore emerges at a different angle from the grating 1720. This third beam is refracted by the lens 1721 and propagates as beam 1742 to a second group of pixels or pixel block 1724 on the SLM 1722. This second group of pixels applies the hologram pattern that routes a channel entering the main input port 1702 to the main output port 1704 and "grounds" a channel entering the add port 1701. The second group of pixels 1724 deflects the second beam 1742 to provide the second reflected beam 1752. The holograms on the first and second groups of pixels are selected, (examples were described for FIGS. 13a, 13b and 15), so that the first and second reflected beams 1751, 1752 are mutually parallel; the third beam 1753 is routed in a different direction. The consequence of this is that the first and second beams 1751, 1752, after passing again through the lens 1721 become incident at a common point 1726 on the grating 1720, and emerge as main out beam 1714. The third beam 1753 is incident upon a different point on the grating 1720 and emerges into as the drop beam 1713.

Figure 16:
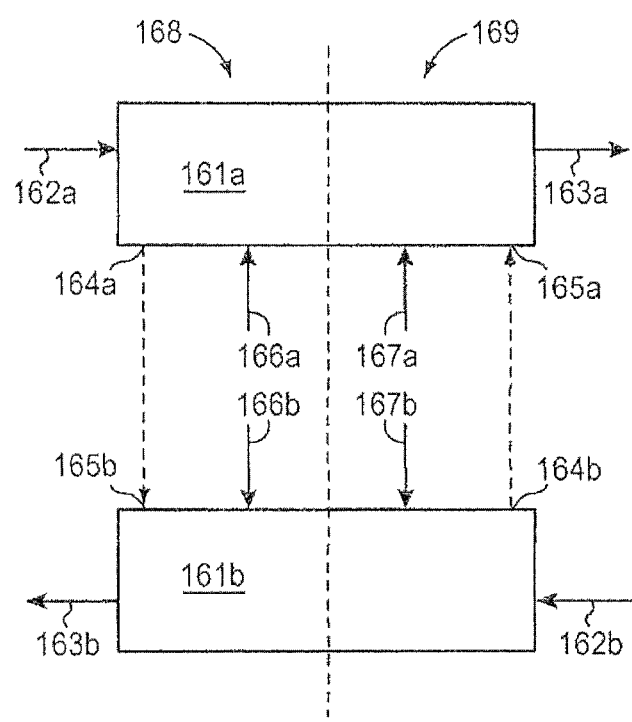
FIG. 16 shows a block diagram showing how loop back may be effected.

In most cases ring networks are bi-directional, with separate add/drop nodes for each direction of travel. In some networks a loopback function is required. This allows isolation of one segment of the ring in case of link failure, for example. It also allows the transmission systems for both directions of a link between two nodes to be tested from a single node. This latter function is useful to confirm that a failed link has been repaired. Loop back requires the main input on each add/drop node to be routed to the main output on the other add/drop node, as shown in FIG. 16.

The figure shows a first module 161a and a second module 161b. The first module 161a has a main input 162a, an add input 166a, a loop back input 165a, a main output 163a, a drop output 167a and a loop back output 164a. The second module 161b has a main input 162b, an add input 166b, a loop back input 165b, a main output 163b, a drop output 167b and a loop back output 164b.

The node is divided into two sides: a west side 168 and an east side 169. Loop back may be required for one or for both sides of the node. Channels coming from the ring enter the first module 161a on a main input 162a and enter the second module 161b on a main input 162b. In normal operation through channels will be routed from the main input 162a to the main output 163a and from the main input 162b to the main output 163b.

In loop back operation for the west side 168 the through channels entering the input 162a on the first module 161a are routed to the loop back output 164a. This output 164a is connected to the loop back input 165b of the second module 161b. In loop back operation for the west side all channels entering the input 165b are routed to the main output 163b of the second module 161b.

In loop back operation for the east side 169 the through channels entering the second module 161b on the main input 162b are routed to the loop back output 164b. This output 164b is connected to the loop back input 165a of the first module 161a. In loop back operation for the east side 169 all channels entering the input 165a are routed to the main output 163a of the first module 161a.

Figure 17:
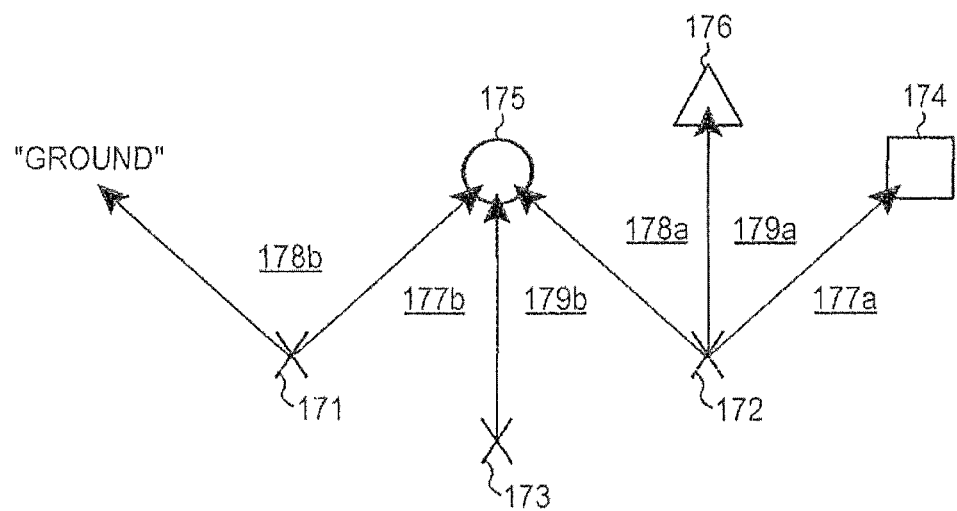
FIG. 17 is a vector diagram illustrating the operation of part of FIG. 16.

The function can be implemented in the four port add drop node (explained in FIGS. 13a, 13b, 15 and 29) by selecting a further hologram deflection 179a and 179b, as shown in FIG. 17. In the four port architecture both sides of the node loop back at the same time. This is due to the sharing of the same hologram by input signals at the same wavelength. In FIG. 17 the vector 179a deflects the main input from its specular output position 172 to the loop back output 176. The identical vector 179b is applied by the shared hologram to the loop back input such that it is deflected from its specular output position 173 by the identical vector 179b to the main output 175. The other vectors 177a, 177b, 178a and 178b are used for normal add-drop operation: 174 is the drop output and 171 is the specular output position for the add input.

When such a hologram is applied the main input is routed to the loopback output and the loop back input is routed to the main output. The two add/drop nodes are then connected as in FIG. 16.

The loop back function can be implemented in other add drop architectures (described later) by reserving drop ports for loop back out and add ports for loop back in. In these other architectures the loop back may be applied to just one side of the node, as well as to both sides.

Figure 18:
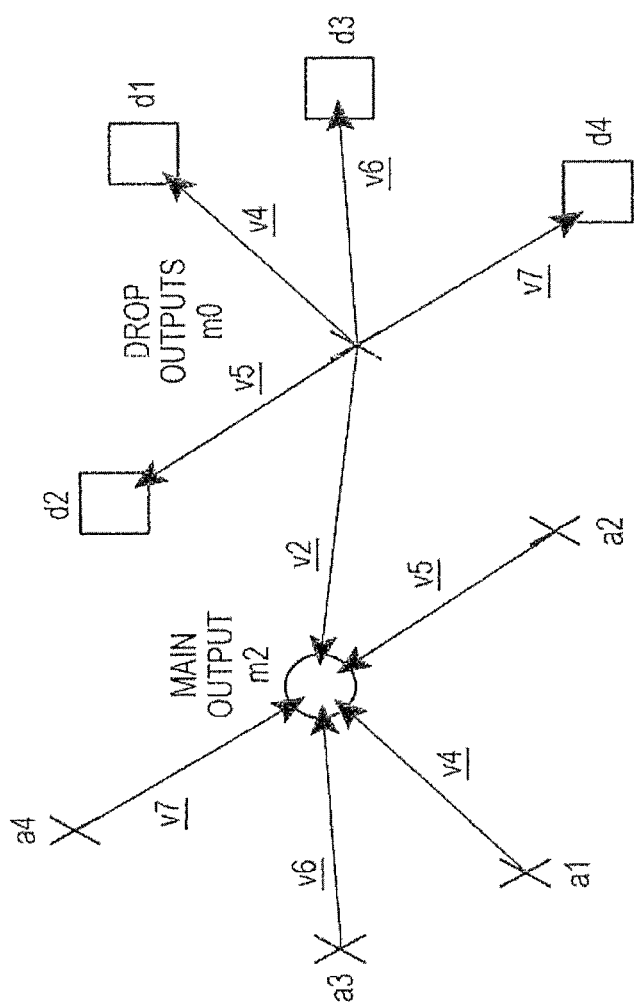
FIG. 18 is a vector diagram of a multi-input/multi-output architecture.

The method used to provide loop back ports may also be applied to the multiport add drop (FIG. 18). This method may be used to provide cross connection ports to exchange channels between adjacent add drop nodes.

It is also possible to devise holograms for multicast, i.e. forwarding an incident light beam to each of several outputs. Such a hologram can be applied to route the main input to two outputs, with vectors 177a and 178a (in FIG. 17). In this case the device is performing a drop and continue function. This is required to provide a duplicated path at nodes connecting two touching ring networks.

Alternatively, or additionally, additional inputs and outputs can be provided so as to have a separate input for each added channel and a separate output for each dropped channel. This saves the expense and space taken up by additional filtering and/or wavelength multiplexing components that would otherwise be used to combine all added channels onto a common add port, and to separate all dropped channels to individual receivers. An example layout is shown in FIG. 18. In such an implementation care must be taken that sufficient distance is provided between the zero order reflections from each input, and the output positions for each output, so as to control the crosstalk. In FIG. 18 deflection v2 is used to deflect channels entering the main input from the specular output position m0 to the main output position m2. Deflections v4 to v7 are used to route from the four add inputs (with specular output positions a1, a2, a3 and a4) to the main output m2. Identical deflections v4 to v7 are applied by the shared holograms to deflect the main input from its specular output position m0 to the four drop outputs d1 to d4. For example if wavelength channels $\lambda 5$ and $\lambda 7$ enter on add input 2 which has its zero order (specular) reflection at a2, the holograms associated with these wavelength channels are configured to produce deflection v5. Hence these two channels will exit from the main output m2. Any channels entering the main input on these two wavelengths will experience the same hologram deflection, and will then exit from output d2.

In one implementation of the multiwavelength architecture the optics between any input fibre and the corresponding input beam that arrives at the diffraction grating, is such that the beam spot that arrives at the SLM is an image of the beam spot that leaves the input fibre. Similarly the optics between any output beam and the corresponding output fibre is such that the beam spot that arrives at the output fibre is an image of the beam spot that leaves the SLM. An example embodiment that would achieve this behaviour is to have an individual collimating lens associated with and aligned to every optical fibre.

Figure 27:
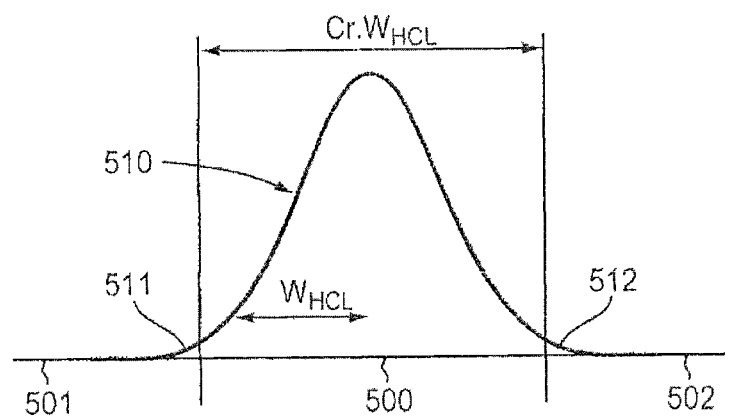
FIG. 27 is a graph showing the effect of finite hologram size of the field of a beam incident on a hologram.

Referring to FIG. 27, it is assumed that two adjacent channels are being routed in a different direction to the channel under consideration. Thus the beam under consideration has a first hologram 500, and the two adjacent beams have contiguous holograms 501 and 502 respectively. The beam under consideration has an intensity distribution shown as 510. Hence the energy incident from the beam under consideration on the two adjacent holograms, shown as 511 and 512, is lost. Given a perfect optical system what arrives at the selected output fibre is a demagnified image of the truncated beam. Due to the way that the optical system works, the centre line of the beam incident at the output fibre will be lined up with the centre of the output fibre (indeed the beam deflection angle at the SLM should be adjusted so this is the case).

To each wavelength channel there is assigned a block of pixels applying the same routing hologram. Preferably this block of pixels should be chosen such that an input light beam exactly at the centre wavelength for the channel arrives at the SLM such that the centre of the beam is within a half pixel's width of the centre of the assigned pixel block. In the presence of thermal expansion of the optomechanical assembly the centre of said beam may arrive at a different point on the pixel block resulting in partial loss of signal as more of the beam tails are lost. This problem can be avoided either by expensive thermally stable optomechanics or by dynamic reassignment of pixels to the blocks associated with each channel. For this to be achievable the pixel array should be continuous. This continuity of the pixel array is advantageous for thermal stability whether or not the imaging criterion used to calculate the filter response is satisfied.

The way that the architecture behaves is that for all parallel beams incident on the grating, the position at which the beam at a particular wavelength reaches the SLM is independent of the input port. Hence a reference signal of known wavelength will be incident at the same particular point on the SLM, whether it comes in with any of the signals to be routed, or on a separate input. The method to measure the position of the beam centre can be used on one or a pair of such reference signals. Given this information, an interpolation method can be used to measure the wavelength of some other signal entering the system on one of its input ports, given the measurement of the position of the centre of the beam associated with said other signal. This information can be used to monitor the behaviour of the original transmitter lasers, and also to inform the controller for the routing system.

Furthermore, given the position of said reference beams as they reach the SLM, and also the centre wavelength(s) of (an)other signal(s) entering the system, the position of the beam(s) at said centre wavelength(s) upon the SLM may also be calculated. This information can be used to control the adjustment of the pixel blocks and/or holograms used to route and control said other signal(s). Conversely the position of said reference beams may be used to select a pixel block that provides a given required centre wavelength for a filter. Hence reconfigurable assignment of pixel blocks may be used to tune the centre wavelength of one or more filter pass bands.

Figure 31:
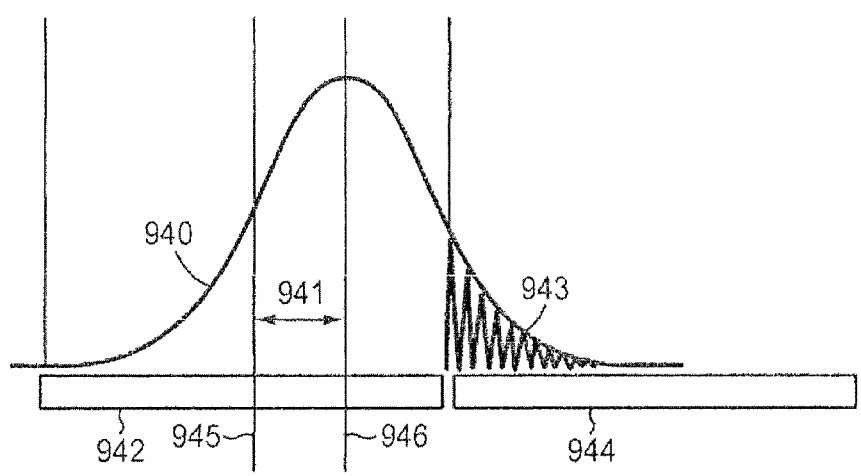
FIG. 31 is a diagram showing the effect of finite hologram size on a beam at a wavelength different to the centre wavelength associated with the hologram.

For the purpose of calculating the wavelength filtering response it is assumed that the centre of the beam at the centre wavelength of the channel (shown as 500 in FIG. 27) arrives exactly at the centre of the associated pixel block. With reference to FIG. 31, as the wavelength is increased above the centre wavelength of the channel the centre line 946 of the beam 940 lands at a distance 941 away from the centre 945 of the pixel block or hologram 942. As a result of the offset 941 due to wavelength difference, the beam loses more energy 943 to the adjacent hologram 944. Assuming perfect imaging, what arrives at the output fibre is a demagnified image of this truncated beam.

An important difference for the multi-wavelength architecture, compared to conventional wavelength demultiplexers, is that a wavelength difference from the centre of a wavelength channel does not (to first order) result in an offset error of the beam at the output. This is because of the way the second pass from the grating 'undoes' the dispersion of the (fixed) diffraction grating, as was shown, for example, in FIG. 12. Hence the original centre line of the truncated beam should be aligned with the peak of the fundamental mode in the output fibre, or, equivalently, aligned with the optical axis of the output fibre. Standard methods for the calculation of coupling efficiency into single-mode fibres have been used to calculate the filter characteristics. Example results are in FIGS. 19 and 20.

Figure 19:
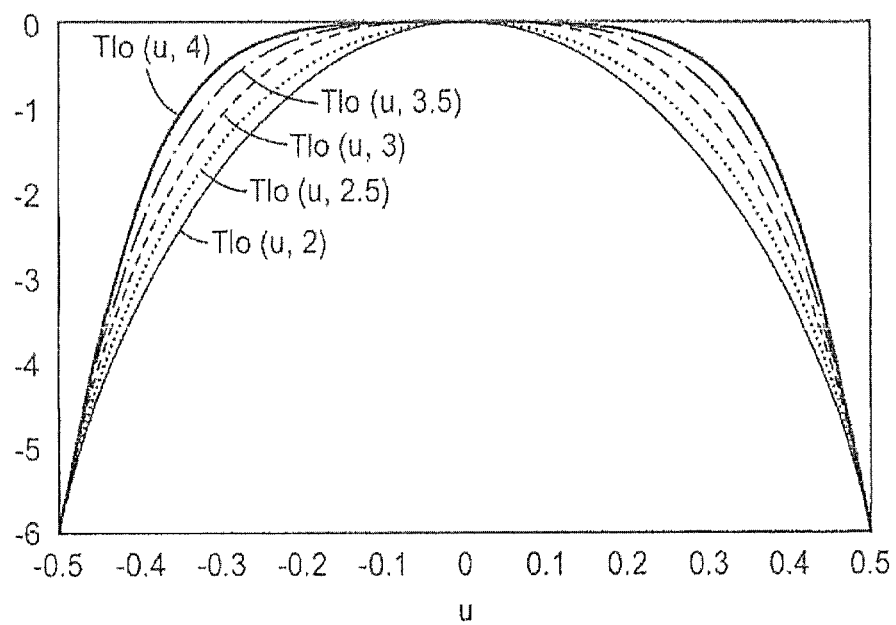
FIG. 19 is a graph showing the relative transmission Tlo for in-band wavelengths as a function of the ratio of the wavelength offset u to centre of the wavelength channel separation.

FIG. 19 shows the relative transmission Tlo for in-band wavelengths as a function of the ratio of the wavelength offset u to centre of the wavelength channel separation. Each curve in the Figure is for a different value of the hologram clipping factor (CR) in the range 2 to 4: this factor is defined as the ratio of the hologram width to the beam spot size at the hologram.

Figure 20:
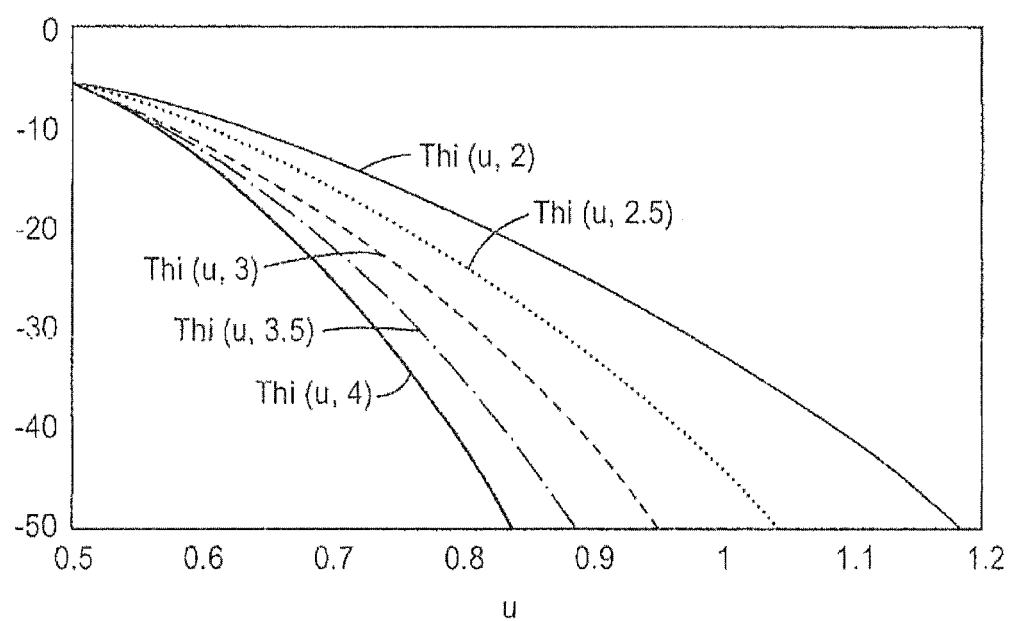
FIG. 20 is a graph showing the relative transmission Thi inside adjacent channels.

FIG. 20 shows the relative transmission Thi inside the adjacent channel, with u=1 at the centre of the adjacent channel while u–0.5 is at the boundary with the adjacent channel. Again, each curve in the Figure is for a different value of the hologram clipping factor (CR) in the range 2 to 4. FIGS. 19 and 20 also show that a change in the width of the pixel block assigned to the filter passband (that is a change in CR) will change the passband width and extinction rate at the edges of the passband. Hence reconfigurable assignment of pixel blocks may be used to tune the shape and width of the filter pass bands.

Independently of the clipping factor, the suppression at the edges of the wavelength channel is 6 dB and the full width half maximum (FWHM) filter bandwidth is approximately 80% of the channel separation. Comparison of the different curves in FIG. 19 shows that the flatter the filter passband the steeper the skirts at the edges, leading to greater extinction of the adjacent channel, as shown in FIG. 20.

This behaviour is advantageous as it avoids the usual tradeoff between adjacent channel extinction and centre flatness. Good centre flatness means that the filters concatenate better, so more routing nodes using such filters can be traversed by a signal before the signal spectrum and hence fidelity starts to deteriorate. Good adjacent channel extinction is also important as it prevents excessive accumulation of crosstalk corrupting the signal.

For example, in a known conventional wavelength demultiplexer the filter pass bands are Gaussian and the 1 dB and 3 dB filter bandwidths are inversely proportional to the square root of the adjacent channel extinction (in dB), such that the greater the extinction, the narrower the filter passband. For the same FWHM filter bandwidth of 80% a Gaussian filter would have an adjacent channel extinction weaker than 20 dB, leading to crosstalk problems. However for the SLM multi-wavelength architecture the adjacent channel extinction is better than 30 dB, avoiding such problems in most known networks.

As is well-known to those skilled in the art, an arbitrary beam incident on an optical fibre couples partially into the fundamental mode of the fibre with the rest of the beam energy coupling into a superposition of the higher order modes of the fibre. The higher order modes may be stripped out with a fibre mode stripper. The coupling efficiency into the fundamental mode is given by the modulus squared of the ratio of an overlap integral divided by a normalisation integral. The overlap integrand is the product of the incident field and the fundamental mode. The normalisation integrand is the product of the fundamental mode with itself.

Figure 32:
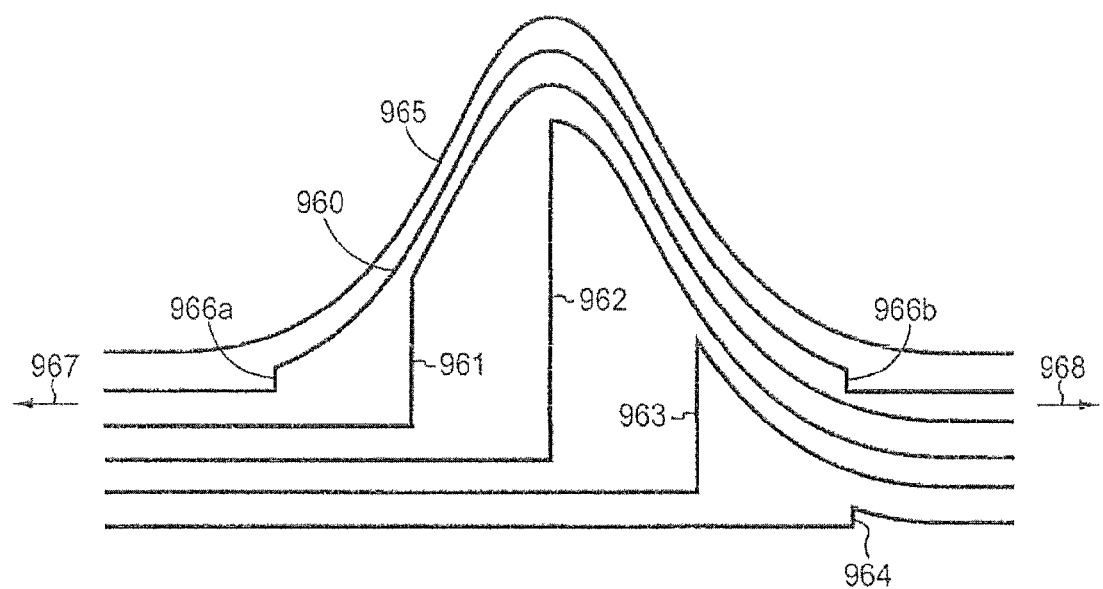
FIG. 32 shows the truncated beam shapes for wavelengths at various wavelength differences from the centre of the wavelength channel dropped in isolation.
Figure 33:
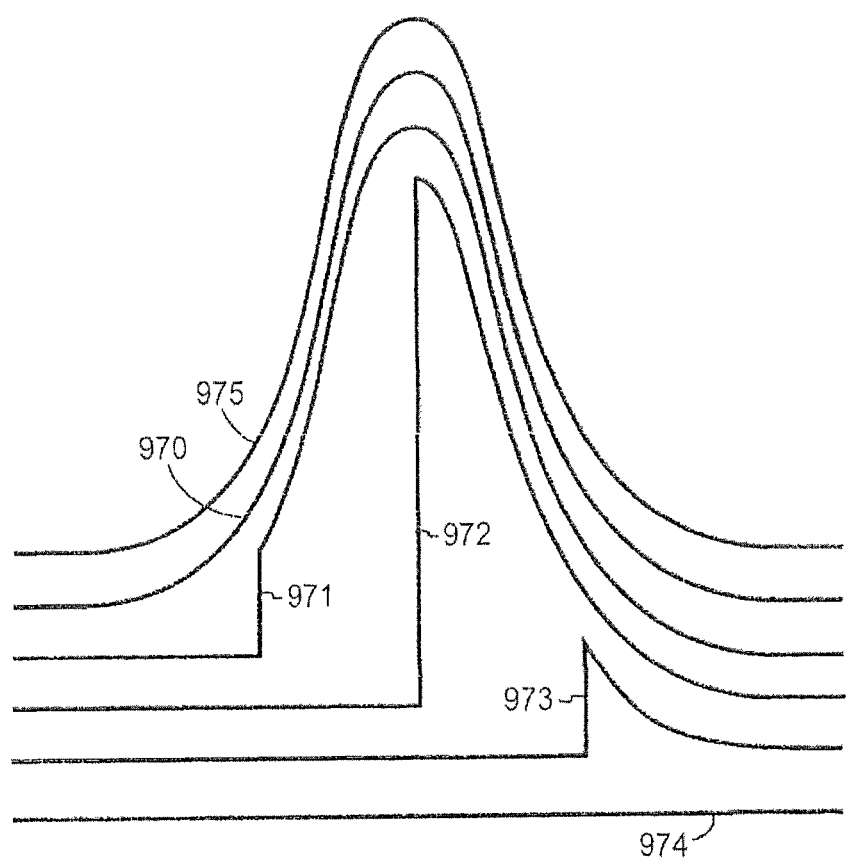
FIG. 33 shows the overlap integrands of the beams of FIG. 32 with the fundamental mode of the fibre.
Figure 34:
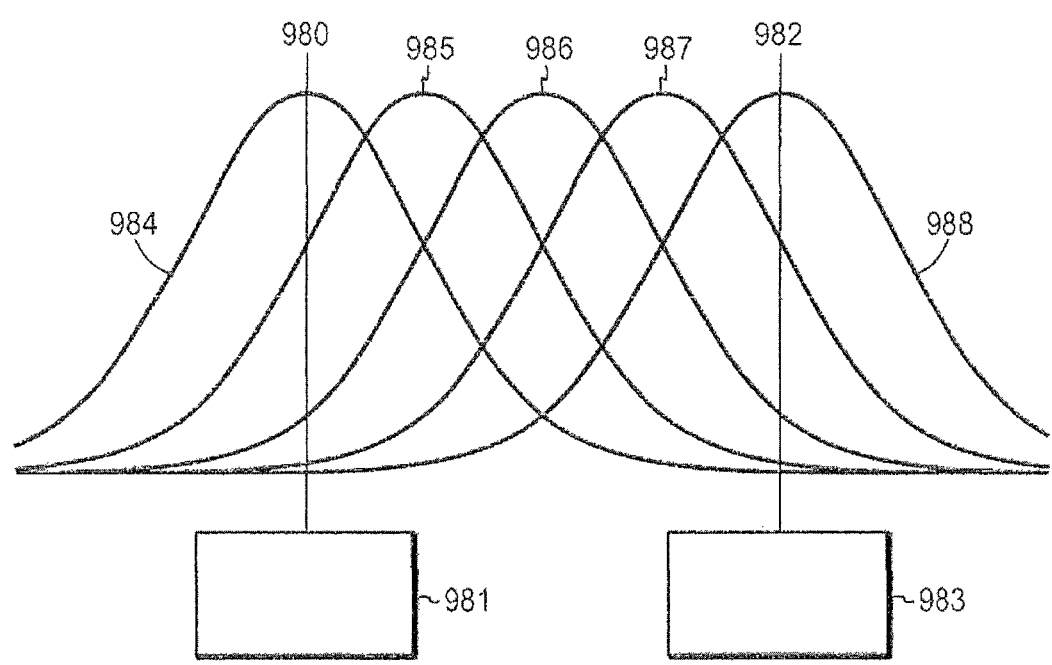
FIG. 34 shows beam output positions for different wavelengths with respect to two optical fibres.

FIGS. 33 and 34 are included with the aim of explaining the behaviour of the 'imaging filter' as described above. FIG. 32 shows the truncated incident beam profiles 960-964 as the wavelength is increased from the centre of the channel under consideration, 960, to the centre of the adjacent channel, 964. Truncated beams 961, 962 and 963 are for wavelength differences of a quarter, a half and three-quarters, respectively, of the channel separation. In the diagram the truncated beam profiles are offset vertically for clarity. The beam profiles are aligned horizontally as they would be physically at the output fibre; the original centre of each truncated beam is aligned with the centre of the fibre fundamental mode. This is because, as explained above, a wavelength difference from the centre of a wavelength channel does not (to first order) result in an offset error at the output. Beam 965 is the fundamental mode of the fibre. FIG. 33 shows the overlap integrands 970-974 of the truncated incident beams with the fundamental mode of the fibre, as the wavelength is increased from the centre of the channel under consideration, 970, to the centre of the adjacent channel, 974. The normalisation integrand, 975, is also shown. The results in the figures show that the overlap integrand 974 has almost vanished explaining why the adjacent channel extinction is very strong. Overlap integrands 971 and 972 are for wavelength differences of a quarter and a half, respectively, of the channel separation.

* These results explain why the overlap integrand decreases slowly with wavelength difference in this range leading to a flat passband centre. In particular for the halfway case, 972, the overlap integral is exactly half of the normalisation integral (from integrating 975). Hence the amplitude transmission coefficient at this wavelength difference is a half with a power extinction of 6 dB, as was shown in FIG. 19. Therefore two factors are responsible for the excellent filter characteristics. The first factor is that the field incident on the fibre is an image of the field reflected from the SLM. The second factor is that the second pass from the grating undoes the dispersion applied by the first pass from the grating, such that whatever the wavelength offset inside the collected channel, (to first order), the peak of the reflected truncated beam is aligned with the peak of the fundamental mode of the fibre.

Figure 35:
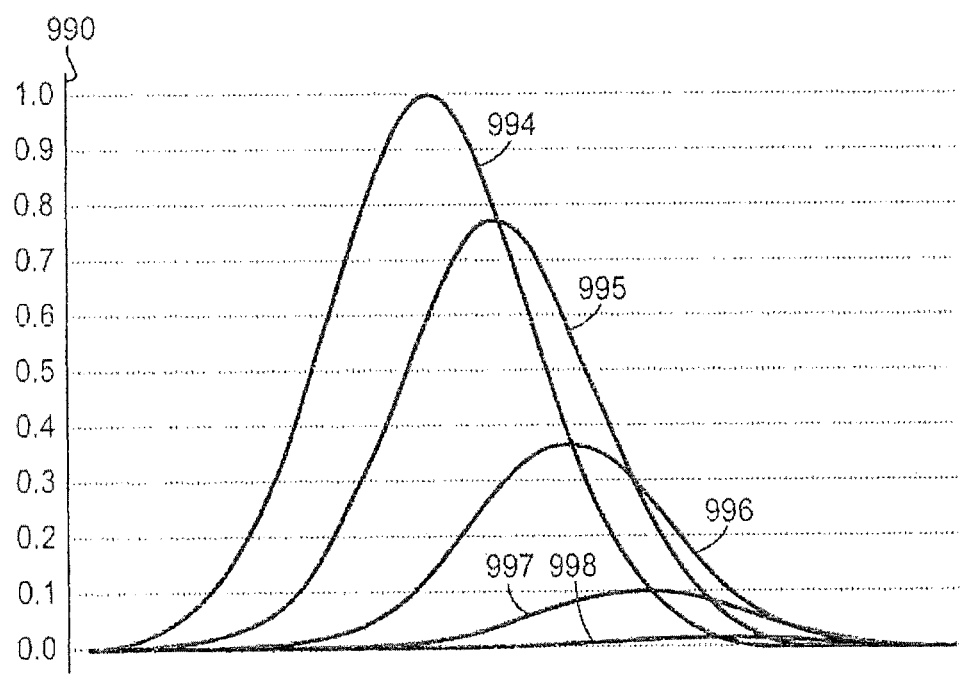
FIG. 35 shows the overlap integrand between the beams of FIG. 34 and the fundamental mode of one of the optical fibres.

By way of comparison, FIGS. 34 and 35 illustrate the filtering process for a conventional wavelength demultiplexer. In FIG. 34 the centre of a first beam 984 is aligned with the optical axis 980 of the centre of a first optical fibre or optical waveguide 981. Hence the first beam 984 is at the centre wavelength of the channel collected by the first optical fibre 981. A second optical fibre 9B3, adjacent to the first fibre 981, has an optical axis 982. A second beam 988 is aligned with the optical axis 982 of this second optical fibre. Hence the second beam is at the centre wavelength of the channel collected by the second optical fibre, that is at the centre of the adjacent optical channel to that collected by the first fibre. Beams 985 to 987 are at wavelength differences from the first beam 984 of a quarter, a half, and three-quarters, respectively, of the wavelength separation between the two adjacent channels. The coupling efficiency of each of the beams 985 to 988 into the first optical fibre 981 again depends on the overlap integral of the respective beam with the fundamental mode of the fibre 981. This is mathematically identical to the overlap integral of the respective beam with the first beam 984.

FIG. 35 shows the overlap integrands 994 to 998 plotted against a vertical axis 990. The spatial width and shape of each curve is identical, as may be shown analytically. Hence the overlap integrand is proportional to the amplitude of the curve, as may be read from the axis 990. Curve 994 is the overlap integrand at the centre of the channel, and is the product of the distribution 984 of FIG. 34 with itself. This curve has an amplitude of 1.0 and hence maximal coupling efficiency. Curves 995 to 997 are the overlap integrands at wavelength differences from the channel centre of a quarter, a half, and three-quarters, respectively, of the wavelength separation between the two adjacent channels. Curve 998 is the overlap integrand at the centre of the adjacent wavelength channel. The coupling efficiency is given by the square of the amplitude of the overlap integrand. The results in FIG. 35 show that the coupling efficiency for the conventional wavelength demultiplexer decreases more quickly around the centre of the filter passband than for the 'imaging' filter discussed in this application. The results also show that the adjacent channel extinction is weaker for the conventional demultiplexer.

FIGS. 34 and 35 also explain why there is a performance tradeoff for the conventional multiplexer between filter passband flatness and adjacent channel extinction: to increase the width of the filter passband the beams 9B5-986 must be incident closer to the first optical fibre 981. Necessarily the beams 987-988 will also be closer to the first optical fibre, reducing the extinction of the adjacent channel, and requiring the second optical fibre 983 to be moved closer to the first fibre 981.

FIGS. 32 and 33 explain why the imaging filter behaves in a different way, such that a broader filter passband is associated with a greater extinction of the adjacent channel. Beam 960 in FIG. 32 shows the truncated reflected beam at the centre of the filter passband. The first and second amplitude discontinuities 966a, 966b are due to the two edges of the hologram. An increase in the hologram width relative to the spot size moves these two discontinuities outwards. The significant amplitude discontinuity in the middle beam 962 is exactly at the centre of said beam, whatever the hologram width. This is because said middle beam is associated with a wavelength halfway between the centres of adjacent channels. Hence the coupling efficiency for this halfway point is 6 dB, independently of the hologram width. The significant amplitude discontinuity in the quarterway beam, 961, is exactly halfway between the first amplitude discontinuity, 966a of the centre beam 960 and the significant amplitude discontinuity in the halfway beam, 962. As the first discontinuity 966a moves outwards due to an increased hologram width (in the direction of arrow 967) the significant discontinuity in the quarterway beam must move in the same direction, increasing the overlap integral and improving the filter passband centre flatness. Similarly as the second discontinuity 966b moves outwards (in the direction of arrow 968) the significant discontinuities in the three-quarter way beam 963 and adjacent beam 964 must move in the direction of arrow 968, decreasing the overlap integral and improving the adjacent channel extinction. This explanation reinforces the argument that the two factors described above (imaging and the second 'undoing' pass from the grating) are responsible for the excellent filter characteristics. This explanation also explains how the selection of the width of the block of pixels assigned to a channel may control the filter passband characteristics.

Analytically it can be shown that the filter response for dropping or adding an isolated channel is purely real. Hence there are no phase distortions with this type of dropping filter. This is advantageous because in many 'flat-top' filters the phase distortions associated with the steep skirts may distort the pulses, particularly in higher bit-rate transmission systems for which the signal bandwidth is broader.

In these calculations it was assumed that the blocks of pixels assigned to each wavelength channel are contiguous. That is there are no 'guard bands' of pixels between each block. Further analysis showed that introducing such guard bands has the effect of decreasing the channel bandwidth for a given channel separation. Hence, preferably the pixel blocks assigned to each wavelength channel should be contiguous. Alternatively guard bands can be used to route in a third direction to deliberately narrow a channel bandwidth, if required.

While the above discussion is for the case of an isolated channel, in which both adjacent channels are routed in a different direction to the channel under consideration, there are also filtering effects that can occur when one or both adjacent channels are routed in the same direction. These effects are caused by 'stitching errors' at the adjacent edges of a pair of holograms routing in the same direction. For example a stitching error of pi causes (in theory) complete extinction of a light beam at a wavelength exactly halfway between the centres of two adjacent channels, while for an absence of stitching error at either side of a hologram, the transmission is uniform right across the entire channel. Intermediate stitching errors cause intermediate extinction. This acts as an additional programmable filtering mechanism and can be used to advantage to partially or completely filter out amplifier noise between selected channels, if required. Alternatively when maximally flat passbands are required the stitching error should be minimised.

As described previously, all channels entering the architecture at the same wavelength are incident on the same hologram. This is because the input beams are arranged to be parallel as they arrive at the diffraction grating, such that all channels at the same wavelength emerge parallel from the diffraction grating. As the diffraction grating is at the focal plane of the lens the beams therefore converge towards the same point in the other focal plane of the routing lens (or equivalent mirror) at which point the SLM is placed.

Hence for the four port and multiport add/drop devices the channels entering on the main beam (from the main input fibre) share a hologram with those channels at the same wavelength entering on an add port. When configured with one particular routing hologram the channel entering the main input is routed to the (selected) drop port while the channel entering the add port is routed to the main output. Therefore any channel equalisation applied to an added channel will also be unavoidably applied to the dropped channel. Hence it is not possible to carry out independent channel equalisation on added and dropped channels.

This problem does not occur, however, for the devices with a single input and/or with a single output. This is because in these devices there is no sharing of individual holograms between channels entering or leaving on different ports. Nor does the problem occur for the devices with multiple inputs and multiple outputs, for channels routed from the main input to the main output.

Another configuration of the multi-wavelength architecture is to have a single input port and a separate output port for every wavelength channel and SLM devices for each channel capable of providing a set of many deflections. When configured so that a single channel leaves on each output port, the device acts as a reconfigurable demultiplexer such that the assignment of a particular wavelength to each output port can be changed dynamically.

Conventional wavelength demultiplexers are not reconfigurable and are therefore less flexible as a routing component. They also have a Gaussian filtering characteristic, which is inferior to the filter characteristic of the SLM multiwavelength optical processor, as described earlier. A further advantage of the invention, compared to a conventional free-space wavelength demultiplexer, is that the channel filter bandwidth is independent of the physical separation between the output fibres and also independent of the spot size of the output fibre. In contrast, for the conventional demultiplexer, the channel bandwidth is proportional to the ratio of the output waveguide spot size to the physical separation of the output waveguides. Consequently, and in order to obtain sufficient channel bandwidth, microlens arrays are required to increase the effective spot size or waveguide concentrators are used to decrease the waveguide separation.

When used in reverse the device acts as a reconfigurable multiplexer, allowing the use of, for example, tuneable lasers at each input. In contrast, for a conventional wavelength multiplexer, fixed-tuned lasers must be used at each input.

Figure 21:
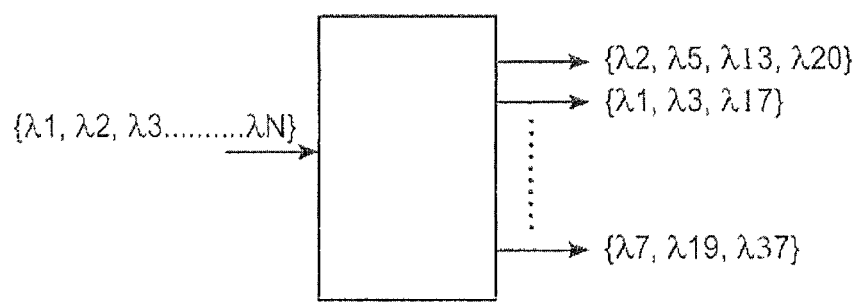
FIG. 21 shows a logical diagram of the sorting function.

A system with a single input port and many output ports can act as a module to form part of a modular routing node. If the system has M output ports and a single input port, then each routing device produces M different deflections, with small adjustments to compensate for wavelength differences and alignment tolerances. All devices (i.e. holograms) producing the same eventual deflection will cause the associated wavelength channel to be routed out of the same output port. Hence such a system can send none, one or many (up to the number of channels entering the input port) channels out from the same output port. The logical function of the module is to sort the incoming channels on the input port according to their required output port, as also illustrated in FIG. 21. Considering firstly the case of the routing architecture shown in FIG. 12. As there is a single input port, every wavelength channel has its own hologram. Hence independent channel equalisation may be applied for all the signals flowing through the module.

Figure 22:
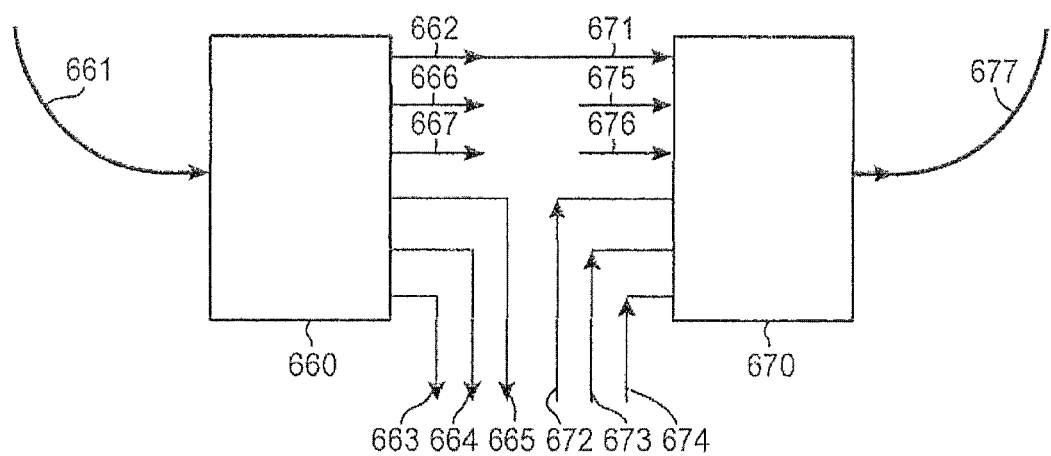
FIG. 22 shows a block diagram of an add/drop node using two routing modules.

One application of these modules is to use two of them to make an add/drop node, as shown in FIG. 22. FIG. 22 shows a first routing module 660 having one input 661 from a previous node, a through output 662 and three drop outputs 663-5, as well as two spare outputs 666,667. A second routing module 670 has a first input 671 connected to the through output 662 of the first module, three add inputs 672-4 and two spare inputs 675,676. The second module 670 has an output 677 to the next node. The second (output) module can be physically identical to the first (input) module but it is used 'in reverse'.

The first module routes all the through traffic out on a common through port 662 while providing multiple drop ports: one for each dropped channel. Any single wavelength or any set of wavelengths can be sent to any drop port. Hence each of the drop ports may connect to a local optoelectronic receiver in a local electronic switch, or to a remote customer requiring one or more channels for remote demultiplexing. The reconfigurability of the wavelength assignment means that the module acts like a wavelength demultiplexer combined with a matrix switching function, so may reduce the switching demands placed on the electronics servicing the drop ports. The ability to send a selectable set of wavelengths to the same port reduces the need for additional fibre/multiplexing components and increases flexibility. Furthermore the routing applied to each wavelength channel may be multicast, as well as unicast. Hence drop and continue operation may be provided in which the signal is routed to a drop port and also to the through port. If a transparent optical connection is required through to access and distribution networks this multicasting may also be applied to broadcast signals to a number of drop fibres. In this multicasting operation one or more of the previously described power control methods may be applied to equalise the channels on the through and drop fibres, as required for the transmission systems and receivers to function correctly.

The first module provides any channel equalisation and monitoring required for the drop ports. Channel equalisation and monitoring for the through channels may take place in the first module, or the second module, or both.

The second module provides multiple add ports: one for each added channel. Any single wavelength or any set of wavelengths can be received at any of the input ports. This allows each of the add inputs to be a tuneable laser, which would not be possible with a conventional non-reconfigurable wavelength multiplexer. In the conventional case there are two options for providing the added channels. A first option is to use conventional non-reconfigurable wavelength multiplexing to combine the added channels, because this is much more efficient in terms of insertion loss than a non-wavelength-specific multiplexer (such as a 1:N fibre splitter used in reverse, that is a N:1 combiner). However this requires each input port of the wavelength multiplexer to have a transmitter laser at a fixed wavelength. When a particular wavelength channel is added at the node the associated transmitter is in use. However when the network reconfigures its wavelength assignment that laser may no longer be in use. To allow complete reconfigurability a complete set of transmitter lasers must be provided, one for each system wavelength. This makes reconfigurable add drop nodes uneconomic when adding small numbers of channels, due to the large overhead of idle transmitter lasers. A second option is to use tuneable lasers, one for each added channel. With conventional optics this requires a non-wavelength-specific multiplexer, which imposes insertion loss penalties. The multi-wavelength architecture described provides a reconfigurable wavelength multiplexer with lower insertion loss than a N:1 combiner. Furthermore the routing applied to each wavelength channel can be reconfigured without transient effects on other wavelength channels, as occurs in 'serial' multiplexing architectures that have a reconfiguration capability.

Any add port can receive a reconfigurable set of wavelength channels from a remote customer. The second module also provides any channel equalisation required for the added signals. Finally the second module routes the through channels entering on the port 671 to the output 677.

Figure 23:
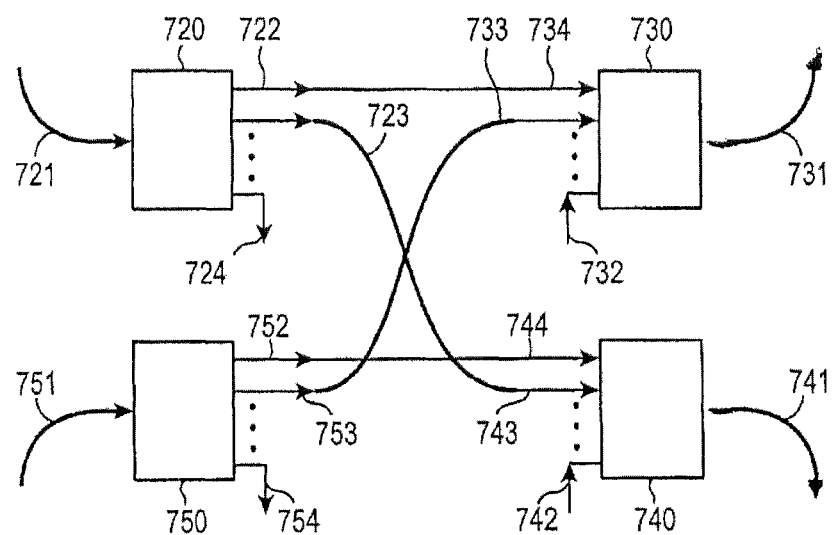
FIG. 23 shows a block diagram of modules used to cross-connect two rings.
Figure 24:
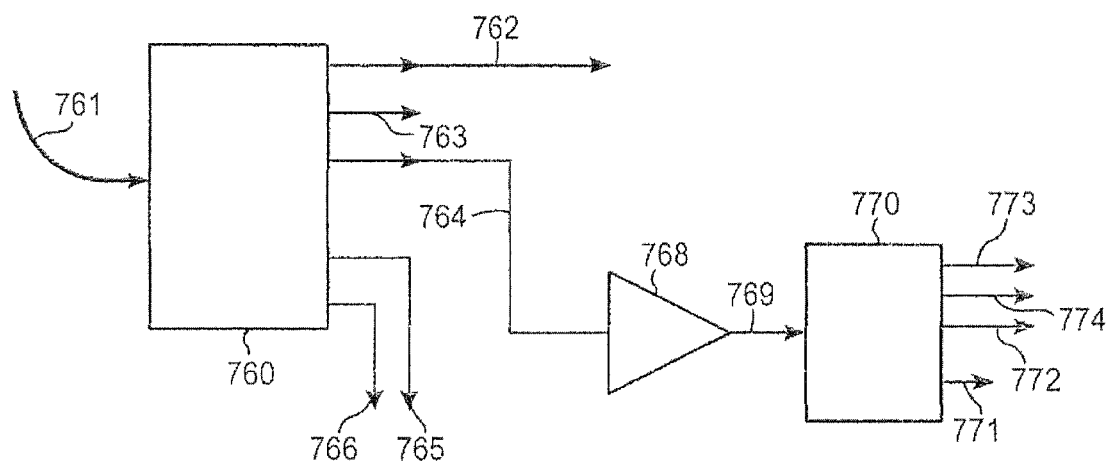
FIG. 24 shows a block diagram of routing modules connected to provide expansion.

The spare ports 666,667,675,676 can be used for routing selected channels to optical regenerators if the signal quality demands it; to wavelength converters to avoid wavelength blocking; to another add/drop node to allow cross-connection between rings, as shown in FIG. 23, or to further modules to allow expansion, as shown in FIG. 24.

FIG. 23 shows a first to fourth routing modules 720, 730, 740 and 750. The first and fourth modules each have one input 721, 751, a through output 722, 752, a cross-connect output 723,753 and a number of drop outputs 724, 754. The second and third modules 730,740 each have respective single output 731,741, a number of add inputs 732,742 a cross-connect input 733,743 and a through input 734, 744. The through output 722 of the first module 720 is connected to the through input 734 of the second module 730, and the through output 752 of the fourth module 750 is connected to the through input 744 of the third module 740. The cross-connect output 723 of the first module 720 is connected to the cross-connect input 743 of the third module 740, and the cross-connect output 753 of the fourth module 750 is connected to the cross-connect input 733 of the second module 730.

The first and second modules 720, 730 are on one ring and the third and fourth 740, 750 on a second ring. This cross connection capability allows a new ring network to be overlaid on an original ring network when the original ring capacity is becoming exhausted Channels may be exchanged between the two rings at each node as required. Hence the ring network acts like a ring with two fibres per link (in each direction around the ring). The concept may be extended to three or more overlaid rings, and hence three or more fibres per link (in each direction around the ring). As is well known from many traffic studies, increasing the number of fibres per link reduces significantly a phenomenon known as wavelength blocking, such that more efficient use is made of the capacity of each fibre. Hence cross connection between rings makes better use of the available capacity, allowing more traffic to be carried for the same investment in infrastructure. Cross connection may also be used to exchange signals between diverging rings.

FIG. 24 shows expansion of a first (input) module 760 having a single input 761, and five outputs 762-6, via an optical amplifier 768 and an intermediate module 770 having four outputs 771-4. The first output 762 of the first module 760 is a through path, the third output 764 is an expansion port and provides an input to the optical amplifier 768, and the output 769 of the optical amplifier is to the intermediate module 770. The intermediate module 770 has an expansion port 771 and three new ports 772-4. Fourth and fifth outputs 765, 766 of the input module 760 form drop outputs. The same principle can also be applied to expansion of a second (output) module. The use of such modules allows extra add and drop ports to be provided without service interruption to the channels flowing through the add drop node. It also allows network operators to apply just in time provisioning, delaying investment in infrastructure until the demand is there to use it. Furthermore it is only the channels dropped or added through the expansion module(s) that are subject to an additional amplification stage. If every node in the ring were upgraded in this manner, the channels should only pass through an additional two amplification stages. This could be reduced to one additional stage by suitable assignment of the added and dropped channels to the original and expansion module.

Returning to the basic routing module shown in FIG. 21. This type of connectivity would be useful in mesh networks where each node is connected by a multi-fibre link to, typically, each of between two and five nearest neighbour nodes. Each link carries traffic to and from one of the nearest neighbour nodes. Usually individual fibres in the link carry traffic in just one direction but some are bi-directional. For an example where a link has an average of six pairs of external fibres and a node has five links, then there would be thirty external incoming fibres and thirty external outgoing fibres. The function of the node is to route any wavelength channel from any incoming fibre to any outgoing fibre. Each fibre may carry many wavelength channels. Currently up to 160 channel systems are being installed although 40 or 80 channel systems are more usual.

An ideal node architecture allows the network operator to start with one or more add/drop nodes connected to one or more rings and then allow the individual add/drop nodes to be connected so that the network topology can evolve towards a mesh. The node architecture should also allow extra fibres to be added to each link as required to meet the demand, with the extra parts or modules of the node being installed as and when required. Fibre management and installation between subcomponents inside the routing node is also expensive.

A known architecture for such a routing node uses a separate wavelength demultiplexer for every input fibre. The separated wavelength channels are then carried over optical fibres to N*N optical switches. To avoid internal wavelength blocking then all channels at a particular wavelength must be connected to the same N*N switch. Hence the switch will receive channels at the same wavelength from every single input fibre. The channels leaving the switch are carried over optical fibres to a separate wavelength multiplexer for every output fibre. Hence the switch will route channels at the same wavelength towards every single output fibre.

These switches have a sufficient number of ports for added and dropped channels, and channels passing to and from wavelength conversion and optical regeneration. This sufficient number is estimated based on traffic analysis as it depends on the instantaneous mapping of channels between nodes and the wavelength and fibre allocation. Each switch may service one or more wavelength channels. In one device, the number of fibres is around b 3000 resulting in significant fibre management and installation costs. Even grouping together different fibres to or from the same link and grouping together the add fibres and regenerator fibres only reduces the number of separate entities to be managed to 560.

With such a large number of fibres it is not economic to provide optical amplifiers inside the routing node to compensate for insertion losses. Another problem with this architecture is how to add in extra external fibres once the switch capacity has been exhausted with the current number of external fibres. This cannot be done without replacing every single switch. In advance it is difficult to know how large to provision the switch to avoid or delay this problem.

An alternative node architecture uses one of the multiwavelength architectures described to provide a separate module for every input fibre and a separate module for every output fibre. Consider first an input module. This should be designed so that none, one, many or all of the input channels may leave any of the output ports (as shown in FIG. 21). These output ports are used to carry channels towards output modules and towards other parts of the node providing wavelength conversion, regeneration and ports to electronic switches, for example. A connection between an input module and an output module carries every wavelength channel mapped between the corresponding input and output fibre. Hence the logical function of an input module is to sort the incoming channels according to their destination output fibre. This logical functionality was illustrated in FIG. 21.

A particular input module does not have connections to every output module. It does not have connections to output modules going back to the same neighbouring node from which the input channels have travelled, except perhaps for network monitoring and management functions. It might not need to have separate connections to every output module for the output fibres to the other neighbouring nodes. It is however provided with sufficient connectivity to the output channels on every output link to avoid unacceptable levels of wavelength blocking. For example each input module could be connected to a subset of the output modules, with an overflow system used to provide a connection to the other output modules, when required. An output module is designed like an input module but works in the opposite direction. Hence the logical function of the output module is to collect the channels coming from each input module and direct them to a common output port.

In this architecture, the dropped channels and channels needing wavelength conversion may exit from each module on a common port or a pair of ports. As a result of using the modules it can be shown that satisfactory performance is achieved using fewer than 1000 fibres and fewer than 50 fibre groups.

Hence the total number of fibres inside the node is reduced by a factor of over 3 while the total number of fibre entities to be installed and managed is reduced by a factor of 10 or more. This represents a significant reduction in cost and complexity.

Figure 25:
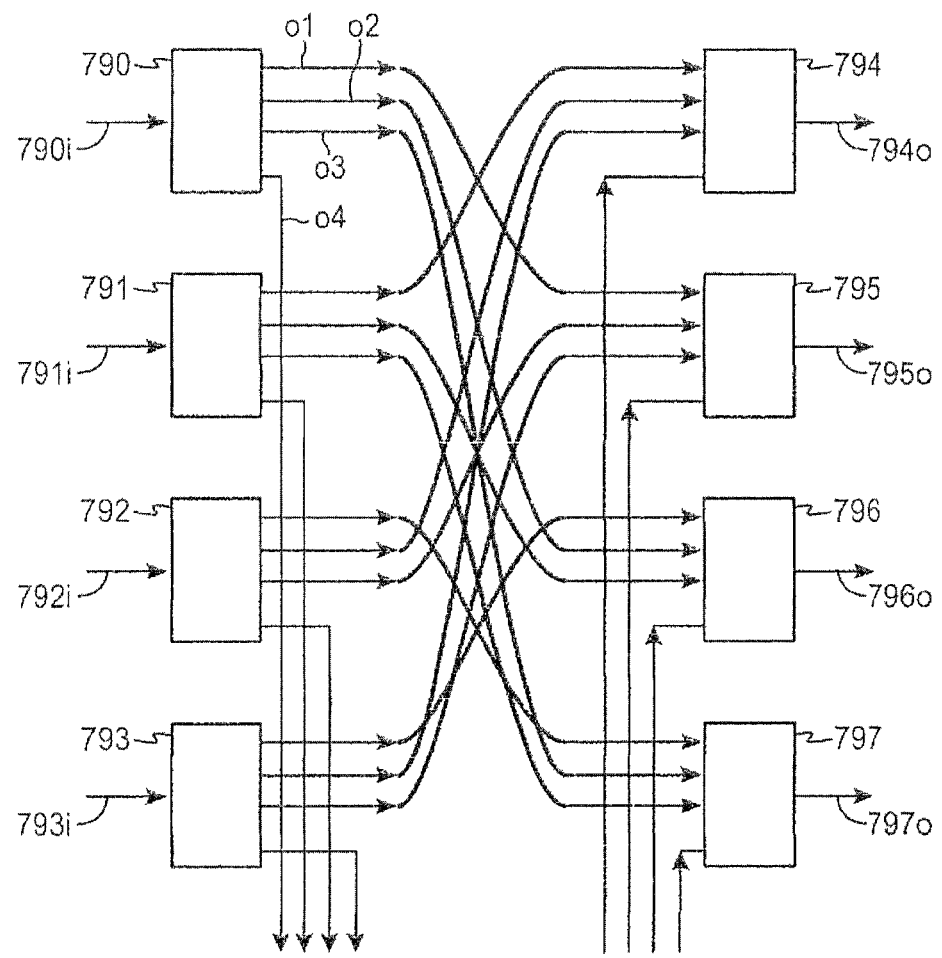
FIG. 25 shows a block diagram of an optical cross-connect.

An example wavelength-routing crossconnect using the modules is shown in FIG. 25. FIG. 25 shows four input routing modules 790-3, each with a respective input 790$i$-793$i$ and four outputs 79001-79003 etc. and four output routing modules 794-7 each with four inputs and a respective single output 794$o$-797$o$ to a respective output fibre. One output of each input module 790-3 forms a drop output. The input and output modules are associated together with input module 790 associated with output module 794, input module 791 associated with output module 795, input module 792 associated with output module 796 and input module 793 associated with output module 797. The remaining three outputs of each input module are cross-connected to the non associated output modules, so that for example the three non-drop outputs of input module 790 are coupled to respective inputs of output modules 795, 796 and 797. Specifically, output 79001 is connected to output module 795. Of the inputs to the four output modules, one per module is an add input and the remainder are connected to outputs of the input modules 790-3.

In the example the routing function carried out by each input module 790-3 is to sort the incoming channels with respect to the selected output fibre 794$o$-797$o$ for example, and with reference to the figure, all wavelength channels entering the cross-connect on input 790$i$ that need to leave the cross-connect on 795$o$ are routed by the input module 790 to the output 79001. This output carries these channels to the output module 795 which is collecting frequency channels for output 795$o$. The output module combines all incoming channels onto a respective single. output.

In this architecture channel equalisation may be carried out independently for all channels routed through the cross connect.

The cross connect architecture of FIG. 25 is modular in that it can be used to build a range of nodes of different connectivity and dimension. The modules can be used to assemble a node like that described above, starting with only 1 or 2 fibre pairs per link and adding in extra modules to allow more fibres per link. Extra modules can be added in and connected up as and when required, allowing the network operator to delay investment in infrastructure for as long as possible. When the node has reached, for example, 6 fibre pairs per link and the capacity begins to be exhausted there are three ways to upgrade the node. The first way is to upgrade the numbers of wavelength channels on particular fibres in each link. This requires replacing the associated modules with modules processing more channels. However the other modules (and the fibre interconnections) can remain in service. In contrast for the conventional architecture as well as upgrading the demultiplexers and multiplexers associated with the particular fibres to be upgraded, a whole set of N*N switches must be installed, one for every new system wavelength. These switches will remain under-utilised until all the fibre systems have been upgraded.

A second way to upgrade the node is to replace selected modules with models providing an increased number of fibre choices per output link allowing more fibres per link. This requires the installation of more fibre groups inside the node. In contrast for the conventional architecture every N*N switch must be replaced meaning the associated system wavelengths would be out of service on every fibre entering or leaving the node.

Figure 26:
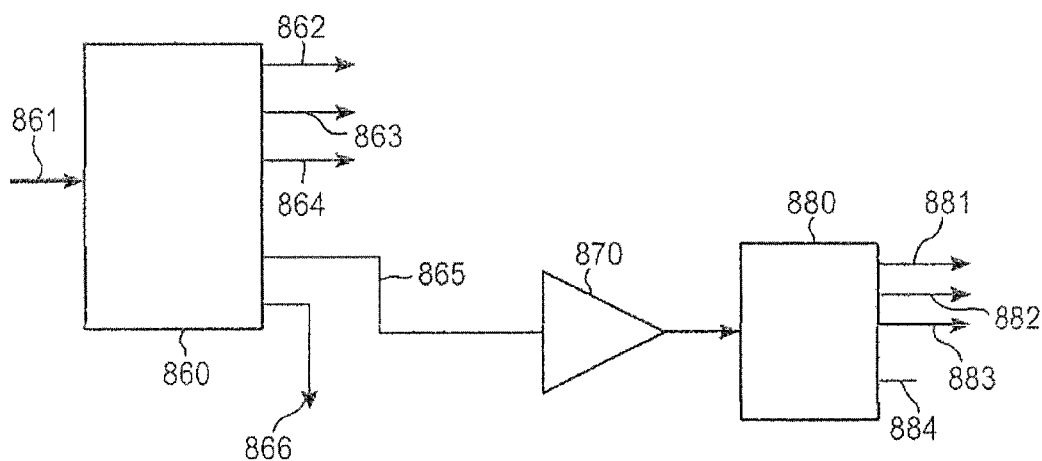
FIG. 26 shows a block diagram of an upgrades node having a cascaded module at an expansion output port.

A third way to upgrade the node is to upgrade selected modules by cascading another module from a spare, or expansion output port, as shown in FIG. 26.

FIG. 26 shows a somewhat similar arrangement to FIG. 24, and has an input module 860, with an input 861, five outputs 862-6, an optical amplifier 870 and an intermediate module 880 receiving the output of the optical amplifier 870 and providing four outputs 881-4. The input module has three outputs 862-4 to existing output modules, fourth output 865 to the optical amplifier 870 and fifth output as a drop output. The first to third outputs 881-3 of the intermediate module 880 connect to new or later output modules.

The advantage of this third way is that service interruption is not required during installation.

The smallest node can have as few as two modules, which would act as an add/drop node. Several pairs of such modules can service a stacked set of rings, allowing interconnection between different rings. Adjacent rings can also be interconnected. A hybrid ring/mesh network can be created. Hence the same modular system can be used for ring networks, mesh networks and mixes of the two. It can also allow re-use of existing plant and allow an add/drop node to grow and evolve into a wavelength-routing cross-connect.

It will be clear to those skilled in the art that the use of reflective SLMs may allow optical folding to be accomplished and provide a compact system. Thus folding mirrors which may be found in some systems are replaced by SLMs that serve the dual function of folding and performance management for the system. The performance management may include managing direction change, focus correction, correction of non-focus aberration, power control and sampling. When taken together with the controller and sensors, the SLM can then act as an intelligent mirror.

As an example, this application of SLMs would be attractive in the context of free-space wavelength demultiplexers as it would help to suppress the problems associated with long path lengths.

Another example is to provide correction for alignment tolerances and manufacturing tolerances in systems requiring alignment between fibre arrays and lens arrays. In particular focal length errors in the lenses (due to chromatic aberration or manufacturing tolerance) can be compensated by focus correction at the SLM or SLMs, while transverse misalignment between a fibre and lens which leads to an error in the beam direction after the lens, can be compensated by beam deflection at the SLM or SLMs.

It will also be clear to those skilled in the art that although the described embodiments refer to routing in the context of one-to-one, it would also be possible to devise holograms for multicast and broadcast, i.e. one-to-many and one-to-all, if desired.

Although the invention has been described with reference to a number of embodiments, it will be understood that the invention is not limited to the described details. The skilled artisan will be aware that many alternatives may be employed within the general concepts of the invention as defined in the appended claims.

What is claimed is:

1. An optical processor, the optical processor comprising:
a reflective SLM,
a dispersion device, and
a focusing device disposed between the reflective SLM and the dispersion device,
wherein the SLM has a two-dimensional array of controllable phase-modulating elements,
wherein the SLM is configured for selection of controllable phase-modulating elements whereby two-dimensional groups of controllable phase-modulating elements are formed at chosen locations of the SLM;
wherein the optical processor is configured such that, using the focusing device, light from the dispersion device is spatially distributed by wavelength across the SLM and within each of the two-dimensional groups, and
wherein the optical processor is configured such that the two-dimensional groups of controllable phase-modulating elements display different holograms at the chosen locations of the SLM where said light is incident, for independently processing different wavelengths of said light corresponding to a central wavelength of said light for each of the two-dimensional groups.

2. The optical processor of claim 1, wherein the SLM is an LCOS SLM.

3. The optical processor of claim 2, wherein the LCOS SLM is substantially polarization independent.

4. The optical processor of claim 2, further comprising a wave plate disposed such that successive passes of a beam through the liquid crystal of the LCOS SLM subject each orthogonally polarized component to a substantially similar electrically-set phase change.

5. The optical processor of claim 1, configured such that light from the dispersion device and focusing device that is specularly reflected by the SLM is not reflected back to the dispersion device.

6. The optical processor of claim 1, having a control circuit and sensor devices, the sensor devices being arranged to detect light emergent from the SLM, the control circuit being responsive to signals from the sensor devices to vary assignment of the controllable phase-modulating elements to the groups of controllable phase-modulating elements.

7. The optical processor of claim 1, having a control circuit and sensor devices, the sensor devices being arranged to detect light emergent from the SLM, the control circuit being responsive to signals from the sensor devices to vary the selection of control data for generating the different holograms.

8. The optical processor of claim 1, having a control circuit and sensor devices, the sensor device being arranged to detect light emergent from the SLM, the control circuit being responsive to signals from the sensor devices to vary assignment of the controllable elements to the groups of controllable phase-modulating elements and the selection of control data for generating the different holograms.

9. The optical processor of claim 1, further comprising an input and plural outputs, wherein the input is configured to receive a light beam having plural wavelengths, the optical processor being adapted to select wavelengths of the input beam to appear in respective outputs.

10. The optical processor of claim 9, wherein the input and outputs are disposed so that light from the input that is reflected specularly by the SLM is not incident upon any of said outputs, whereby each hologram provides routing to incident light.

11. The optical processor of claim 10, wherein the SLM comprises a continuous array of controllable elements.

12. The optical processor of claim 1, further comprising plural inputs and an output, the output delivering an optical beam having plural wavelengths, the processor being adapted to select the wavelengths from the plural inputs to appear in the output.

13. The optical processor of claim 12, wherein the inputs and output are disposed so that light from said inputs reflected specularly by the SLM is not incident upon said output, whereby each hologram provides routing to incident light.

14. A routing node comprising a first optical processor of claim 1 in combination with a second optical processor of claim 1, the first optical processor further comprising an input and plural outputs, wherein the input is configured to receive a light beam having plural wavelengths, the optical processor being adapted to select wavelengths of the input beam to appear in respective outputs, the second optical processor, further comprising plural inputs and an output, the output delivering an optical beam having plural wavelengths, the processor being adapted to select the wavelengths from the plural inputs to appear in the output, wherein an output of the first optical processor forms an input to the second optical processor, the first optical processor constituting an input processor, the second optical processor constituting an output processor.

15. The optical processor of claim 1, wherein the optical processor is configured to display the different holograms at the same time to independently process the different wavelengths of said light.

16. The optical processor of claim 1, wherein the focusing device is configured to focus said light for each of the central wavelengths onto the corresponding group of controllable phase-modulating elements.

17. The optical processor of claim 1, wherein the SLM is a device that modifies a property of light as a function of time and position across it.

18. A method of operating an optical device, the optical device comprising a reflective SLM having a two-dimensional array of controllable phase-modulating elements, a dispersion device and a focusing device disposed between the reflective SLM and the dispersion device, the method comprising:
  spatially distributing, by wavelength, light having plural wavelengths across the reflective SLM via the dispersion device and the focusing device;
  assigning groups of individual controllable phase-modulating elements by wavelength, whereby said light is spatially distributed by wavelength within each group and each group has a corresponding central wavelength;
  selecting, from stored control data, control data for at least some groups of controllable phase-modulating elements;
  generating, from the respective selected control data, a respective hologram at the at least some groups of controllable phase-modulating elements; and
  varying the assignment of the groups and the selection of control data whereby upon illumination of said at least some groups by respective light beams at different wavelengths, respective emergent light beams from the groups are controllable independently of each other.

19. The method of claim 18, further comprising adjusting at least one hologram to compensate for one of the list comprising component misalignments, curvature of a substrate of the SLM and wavelength of light.

20. The method of claim 18, wherein the SLM comprises a liquid crystal material and the optical device comprises a wave plate disposed such that successive passes of a beam through the liquid crystal material subject each orthogonally polarized component of the beam to a substantially similar electrically-set phase change.

21. The method of claim 18, further comprising varying the assignment of the groups and the selection of control data in response to temperature change.

22. The method of claim 18, wherein sensor devices are arranged to detect light emergent from the SLM, the method comprising varying the assignment of the groups in response to outputs of the sensor devices.

23. The method of claim 18, further comprising assigning groups having one of differing shapes, differing sizes and differing position.

24. The method of claim 18, further comprising, for at least one group of phase modulating elements, providing control data indicative of two holograms to be displayed by said group and generating a combined hologram.

25. The method of claim 18, having a set-up phase, the method further comprising both causing the SLM to route a beam and causing the SLM to emulate a corrective element to correct for errors, whereby the SLM receives a discrete approximation of the combination of both a linear phase modulation applied to it to route the beam and a non-linear phase modulation for correction of said errors.

26. The method of claim 18, wherein the generating step comprises displaying multiple holograms on the SLM at the same time.

27. The method of claim 18, wherein the focusing device focuses said light for each of the central wavelengths onto the corresponding group of controllable phase-modulating elements.

28. The method of claim 18, wherein the SLM is a device that modifies a property of light as a function of time and position across it.

29. A method of operating an optical device comprising a reflective SLM having a two-dimensional array of controllable phase-modulating elements, a dispersion device and a focusing device disposed between the reflective SLM and the dispersion device, the method comprising:
  spatially distributing, by wavelength, light having plural wavelengths across the reflective SLM via the dispersion device and the focusing device;
  assigning groups of individual controllable phase-modulating elements by wavelength, whereby said light is spatially distributed by wavelength within each group and each group has a corresponding central wavelength;
  selecting, from stored control data, control data for each group of controllable phase-modulating elements;
  generating, from the respective selected control data, a respective hologram at each group of controllable phase-modulating elements; and
  varying the assignment of the groups whereby upon illumination of said groups by respective light beams at different wavelengths, respective emergent light beams from the groups are controllable independently of each other.

30. The method of claim 29, further comprising creating a desired filter response for light of a given wavelength by assigning controllable elements of said SLM to a group for light of said wavelength.

31. The method of claim 29, wherein the generating step comprises displaying multiple holograms on the SLM at the same time.

32. The method of claim 29, wherein the focusing device focuses said light for each of the central wavelengths onto the corresponding group of controllable phase-modulating elements.

33. The method of claim 29, wherein the SLM is a device that modifies a property of light as a function of time and position across it.

34. A method of operating an optical device, the optical device comprising a reflective SLM having a two-dimensional array of controllable phase-modulating elements, a dispersion device and a focusing device disposed between the reflective SLM and the dispersion device, the method comprising:

spatially distributing, by wavelength, light having plural wavelengths across the reflective SLM via the dispersion device and the focusing device;

assigning groups of individual controllable phase-modulating elements by wavelengths, whereby said light is spatially distributed by wavelength within each group and each group has a corresponding central wavelength;

selecting, from stored control data, control data for at least some groups of controllable phase-modulating elements;

generating, from the respective selected control data, a respective hologram at the at least some groups of controllable phase-modulating elements; and varying the selection of control data whereby upon illumination of said groups by respective light beams at different wavelengths, respective emergent light beams from the groups are controllable independently of each other.

35. The method of claim 34, wherein the generating step comprises displaying multiple holograms on the SLM at the same time.

36. The method of claim 34, wherein the focusing device focuses said light for each of the central wavelengths onto the corresponding group of controllable phase-modulating elements.

37. The method of claim 34, wherein the SLM is a device that modifies a property of light as a function of time and position across it.

38. A method of training an optical device, the optical device comprising a reflective SLM having a two-dimensional array of controllable phase-modulating elements, a dispersion device and a focusing device disposed between the reflective SLM and the dispersion device, the method comprising:

spatially distributing, by wavelength, light having plural wavelengths across the reflective SLM via the dispersion device and the focusing device;

assigning groups of individual controllable phase-modulating elements by wavelength, whereby said light is spatially distributed by wavelength within each group and each group has a corresponding central wavelength;

selecting, from stored control data, control data for each group of controllable phase-modulating elements;

generating, from the respective selected control data, a respective hologram at each group of controllable phase-modulating elements;

measuring the performance of the device, comparing the measured performance with a desired performance; and in response thereto, varying the assignment of the groups to improve the measured performance.

39. The method of claim 38, wherein the focusing device focuses said light for each of the central wavelengths onto the corresponding group of controllable phase-modulating elements.

40. The method of claim 38, wherein the SLM is a device that modifies a property of light as a function of time and position across it.

* * * * *

UNITED STATES PATENT AND TRADEMARK OFFICE
CERTIFICATE OF CORRECTION

PATENT NO. : 8,937,759 B2  Page 1 of 1
APPLICATION NO. : 13/677926
DATED : January 20, 2015
INVENTOR(S) : Melanie Holmes It is certified that error appears in the above-identified patent and that said Letters Patent is hereby corrected as shown below:

In the Claims

In Column 60, Claim 8, line 50, please delete "device" and insert -- devices --.

In Column 61, Claim 14, lines 10 through 11, please delete "of claim 1 in combination with a second optical processor of" and insert -- and a second optical processor each being the type claimed in --.

In Column 62, Claim 23, line 13, please delete "position" and insert -- positions --.

Signed and Sealed this
Twenty-third Day of June, 2015

Michelle K. Lee
*Director of the United States Patent and Trademark Office*